United States Patent
Takeda

(10) Patent No.: US 7,910,654 B2
(45) Date of Patent: Mar. 22, 2011

(54) POLYMER BLEND FILM CONTAINING CYCLIC POLYOLEFIN

(75) Inventor: Jun Takeda, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 16 days.

(21) Appl. No.: 12/360,133

(22) Filed: Jan. 27, 2009

(65) Prior Publication Data
US 2009/0192256 A1 Jul. 30, 2009

(30) Foreign Application Priority Data
Jan. 29, 2008 (JP) .................................. 2008-017563

(51) Int. Cl.
*C04B 24/38* (2006.01)

(52) U.S. Cl. ...................................................... 525/54.23

(58) Field of Classification Search ................ 525/54.23
See application file for complete search history.

(56) References Cited

U.S. PATENT DOCUMENTS
2006/0134400 A1 * 6/2006 Takada et al. .............. 428/313.9

FOREIGN PATENT DOCUMENTS
| JP | 8-050206 A | 2/1996 |
| JP | 2002-114827 A | 4/2002 |
| JP | 2003-212927 A | 7/2003 |
| JP | 2007-009010 A | 1/2007 |

* cited by examiner

*Primary Examiner* — Ling-Siu Choi
*Assistant Examiner* — Sonya Wright
(74) *Attorney, Agent, or Firm* — Buchanan Ingersoll & Rooney PC

(57) ABSTRACT

A polymer blend film contains a film forming material containing at least a polymer having an absolute value of an intrinsic birefringence of 0.02 or less, and a cyclic olefin resin, wherein the film has a haze of 5% or less.

8 Claims, No Drawings

POLYMER BLEND FILM CONTAINING CYCLIC POLYOLEFIN

BACKGROUND OF THE INVENTION

1. Field of the Invention

The present invention relates to a polymer blend film obtained using a cyclic olefin resin.

2. Description of the Related Art

A polarizing plate is manufactured by laminating a protective film on both sides of a polarizing film obtained by oriented adsorption of iodine or a dichroic dye to polyvinyl alcohol. As the protective film, that composed mainly of cellulose triacetate is popularly used because of its characteristics such as toughness, flame retardancy and high optical isotropy (low retardation value). A liquid-crystal display device is made of a polarizing plate, a liquid crystal cell, etc. A liquid-crystal device having a high display quality is achieved by inserting an optical compensation sheet (which may also be called "optical compensation film) between the polarizing plate and liquid crystal cell of the device as described in JP-A-8-50206 (the term "JP-A" as used herein means an "unexamined published Japanese patent application").

The cellulose triacetate film is very hygroscopic and therefore has poor dimensional stability. It is likely to undergo changes in optical compensation performance or separate from the polarizing film. In addition to these problems, the cellulose triacetate film hardly exhibits optical characteristics even by stretching.

A cyclic olefin film has attracted attentions as a film capable of overcoming the shortcomings of the cellulose triacetate film in hygroscopicity or moisture permeability and development of it as a protective film for a polarizing plate is now performed utilizing a heat melting or solution casting film formation method. The cyclic olefin film exhibits high optical characteristics and moreover, a change in the optical characteristics due to temperature or humidity is small so that it is now developed as a phase difference film (JP-A-2003-212927, JP-A-2002-114827 and JP-A-2007-9010)

The cyclic olefin resin film however has drawbacks such as low surface hardness, low elastic modulus, and brittleness. Another drawback of the cyclic olefin resin is that it achieves an adequate Re or Rth value by stretching but the value cannot be controlled easily and orientation of molecules becomes uneven only by slight stretching, which may lead to unevenness when the film is arranged in crossed nicols.

SUMMARY OF THE INVENTION

An object of the invention is to provide a polymer blend film having low hygroscopicity or moisture permeability, has an adequate hardness, and having easily conrollable optical characteristics.

That is, the present invention is as follows:

(1) A polymer blend film comprising:
a film forming material including at least a polymer having an absolute value of an intrinsic birefringence of 0.02 or less, and a cyclic olefin resin, wherein
the film has a haze of 5% or less.

(2) The polymer blend film as described in item (1), wherein the cyclic olefin resin has a solubility parameter value of 19.5 or greater but not greater than 23.0.

(3) The polymer blend film as described in item (1) or (2), wherein the film forming material satisfies following formula:

$$0 \leq |\Delta SP| \leq 4.5$$

wherein $\Delta SP$ represents an absolute value of a difference in the solubility parameter value between the cyclic olefin resin and the polymer.

(4) The polymer blend film as described in any of item (1) to (4), wherein the cyclic olefin resin contains at least one repeating unit represented by following formula:

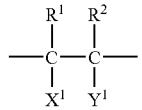

wherein, $R^1$ and $R^2$ represents a hydrogen atom or a hydrocarbon group having from 1 to 10 carbon atoms, $X^1$ and $Y^1$ each represents a hydrogen atom, a hydrocarbon group having from 1 to 10 carbon atoms, a halogen atom, a halogen-substituted hydrocarbon group having from 1 to 10 carbon atoms, $-(CH_2)_n COOR^{11}$, $-(CH_2)_n OCOR^{12}$, $-(CH_2)_n NCO$, $-(CH_2)_n NO_2$, $-(CH_2)_n CN$, $-(CH_2)_n CONR^{13}R^{14}$, $-(CH_2)_n NR^{13}R^{14}$, $-(CH_2)_n OZ$, or $-(CH_2)_n W$; or $X^1$ and $Y^1$ are taken together to form $(-CO)_2O$ or $(-CO)_2NR^{15}$. $R^{11}$, $R^{12}$, $R^{13}$, $R^{14}$, and $R^{15}$ each represents a hydrogen atom or a hydrocarbon group having from 1 to 20 carbon atoms; Z represents a hydrocarbon group or a halogen-substituted hydrocarbon group; W represents $SiR^{16}_p D_{3-p}$ (in which $R^{16}$ represents a hydrocarbon group having from 1 to 10 carbon atoms, D represents a halogen atom, $-OCOR^{15}$ or $-OR^{16}$, and p stands for an integer of 0 to 3); and n represents an integer of from 0 to 10.

(5) The polymer blend film as described in any of item (1) to (4), wherein the polymer is cellulose triacetate, cellulose acetate propionate or cellulose acetate butylate.

(6) The polymer blend film as described in any of item (1) to (5), wherein the polymer blend film is formed from a film forming material solution obtained by dissolving the polymer and the cyclic olefin resin in a solvent and the solvent has a vapor pressure at 25° C. of 250 mmHg or greater.

DETAILED DESCRIPTION OF THE INVENTION

The term "from (Numeral 1) to (Numeral 2)" means "(Numeral 1) or greater but not greater than (Numeral 2)".

The "cyclic olefin resin" may also be called "cyclic polyolefin resin" or "cyclic polyolefin".

The polymer blend film (hereinafter also referred to as a film) of the invention is available using a film forming material containing a polymer A having at least an absolute value of an intrinsic birefringence of 0.02 or less and a cyclic olefin resin B.

(Polymer A)

The polymer A has an intrinsic birefringence falling within a range of from −0.02 to 0.02.

The term "intrinsic birefringence" ($\Delta n0$) as used herein can be represented by Re=P2*d*$\Delta n0$, wherein Re is an in-plane retardation as measured by "KOBRA 21ADH" (trade name; product of Oji Scientific Instruments), P2 is a degree of orientation as measured by wide-angle X-ray, and d is a film thickness.

Intrinsic birefringence less than −0.02 is not preferred because it negates the optical characteristics produced by the cyclic olefin resin. The intrinsic birefringence exceeding 0.02, on the other hand, is not preferred because optical unevenness at the time of stretching becomes severer than that of a stretched film composed only of the polymer A. The intrinsic birefringence of the polymer A is preferably from −0.01 to 0.02, more preferably from 0 to 0.02, even more preferably from 0.01 to 0.02.

A degree of orientation P2 can be determined as a parameter showing the orientation of the polymer A by using X-ray diffraction. In the X-ray diffraction, X-rays were emitted at 40 kV-36 mA by "RAPID R-AXIS" (trade name; product of Rigaku Corporation) while using CuKα rays as an X-ray source. A collimator having a diameter of 0.8 mm was used, and a polymer A film used as a sample was fixed on a transmission sample table. The measurement was performed at 22° C. and 60% RH. From the X-ray pattern thus detected, the degree of orientation P2 of the polymer A defined by P2=<3 $\cos^2 \beta$−1>/2 is preferably from 0.05 to 0.30, more preferably from 0.06 to 0.30, still more preferably from 0.08 to 0.30. The upper limit of the degree of orientation P2 is 1.0. In the above equation, <$\cos^2 \beta$> is $\int(0,\pi) \cos^2 \beta I(\beta) \sin \beta d\beta / \int(0,\pi) I(\beta) \sin \beta d\beta$.

In the above equation, β is an angle between an incident plane of X-ray and a direction in the plane of the transparent support (polymer A film); I is a diffraction strength at 2θ=8° in the X-ray diffraction chart as measured at an angle β. In the polymer A film after stretching at a high temperature, X-ray diffraction peaks which are presumed to derive from crystallization appear so that crystallization of the polymer A film is effective for appearance of a desired Re.

Cellulose acylates are particularly preferred as the polymer A. Such cellulose acylates have, for example, a degree of acyl substitution within a range of from 2.50 to 2.98. The acyl group is at least one selected from acetyl group, propionyl group, and butyryl group. Specific examples of the cellulose acylate include cellulose triacetate, cellulose acetate propionate, cellulose acetate butylate, cellulose propionate, cellulose butylate, and cellulose acetate propionate butylate. In the invention, cellulose triacetate, cellulose acetate propionate, and cellulose acetate butylate are preferred. The degree of acetyl substitution is preferably 1.40 or greater. No particular limitation is imposed on the cellulose which is a raw material of the cellulose acylate and examples of it include cotton linter, wood pulp, and kenaf. They may be used as a mixture. A percentage of the cellulose acylate synthesized from cotton linter is preferably 60 mass % or greater, more preferably 85 mass % or greater, even more preferably 100 mass % or greater. Although no particular limitation is imposed on the synthesis process of the cellulose acelate, it can be synthesized, for example, by the process described in JP-A-1998-45804. The degree of acyl substitution can be measured in accordance with ASTM-D817-96. The number-average molecular weight of the cellulose acylate is preferably from 70,000 to 300,000, more preferably from 80,000 to 200,000 in order to achieve mechanical strength suited for a protective film for polarizing plate.

(Cyclic Olefin Resin B)

The term "cyclic olefin resin B" means a polymer resin having a cyclic polyolefin structure.

Examples of the polymer resin to be used in the invention and having a cyclic olefin structure include (1) norbornene polymers, (2) polymers of a monocyclic olefin, (3) polymers of a cyclic conjugated diene, (4) vinyl alicyclic hydrocarbon polymers, and hydrides of the polymers (1) to (4). Polymer resins preferably used are addition (co)polymer cyclic polyolefins containing at least one repeating unit represented by the formula (7) shown below and, if necessary, addition (co) polymer cyclic polyolefins containing at least one repeating unit represented by the formula (6) shown below. Further, ring-opened (co)polymers containing at least one cyclic repeating unit represented by the formula (8) shown below are also preferred.

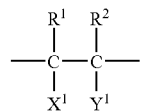

(6)

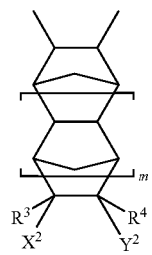

(7)

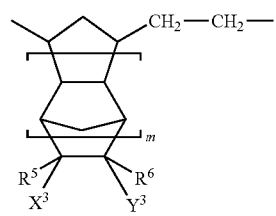

(8)

In the above formulas, m represents an integer from 0 to 4, $R^1$ to $R^6$ represents a hydrogen atom or a hydrocarbon group having from 1 to 10 carbon atoms, $X^1$ to $X^3$ and $Y^1$ to $Y^3$ each represents a hydrogen atom, a hydrocarbon group having from 1 to 10 carbon atoms, a halogen atom, a halogen-substituted hydrocarbon group having from 1 to 10 carbon atoms, —$(CH_2)_n COOR^{11}$, —$(CH_2)_n OCOR^{12}$, —$(CH_2)_n NCO$, —$(CH_2)_n NO_2$, —$(CH_2)_n CN$, —$(CH_2)_n CONR^{13}R^{14}$, —$(CH_2)_n NR^{13}R^{14}$, —$(CH_2)_n OZ$, or —$(CH_2)_n W$; or $X^1$ and $Y^1$, $X^2$ and $Y^2$, or $X^3$ and $Y^3$ are taken together to form (—$CO)_2O$ or (—$CO)_2NR^{15}$. $R^{11}$, $R^{12}$, $R^{13}$, $R^{14}$, and $R^{15}$ each represents a hydrogen atom or a hydrocarbon group having from 1 to 20 carbon atoms; Z represents a hydrocarbon group or a halogen-substituted hydrocarbon group; W represents $SiR^{16}{}_p D_{3-p}$ (in which $R^{16}$ represents a hydrocarbon group having from 1 to 10 carbon atoms, D represents a halogen atom, —$OCOR^{15}$ or —$OR^{16}$, and p stands for an integer of 0 to 3); and n represents an integer of from 0 to 10.

Introduction of a functional group having large polarity to any of the substituents $X^1$, $X^2$, $X^3$, $Y^1$, $Y^2$, and $Y^3$ increases thickness-direction retardation (Rth) and enhances development of in-plane retardation (Re). When the development Re is enhanced, the resulting film can have an increased Re value by stretching during a film formation procedure.

As the norbornene addition (co)polymer, those disclosed in JP-A-1998-7732, International Patent Publication No. 2002-504184, US 2004229157A1 and WO 2004/070463A1 are usable. They are availble by addition polymerization of norbornene polycyclic unsaturated compounds. They are also available, if necessary, by addition polymerization of a norbornene polycyclic unsaturated compound with ethylene, propylene, butene, a conjugated diene such as butadiene or isoprene, a non-conjugated diene such as ethylidenenorbornene, or a chain diene compound such as acrylonitrile, acrylic acid, methacrylic acid, maleic anhydride, an acrylic ester, a methacrylic ester, maleimide, vinyl acetate, or vinyl chloride. Commercially available norbornene addition (co)

polymers are also usable. They are, for example, put on the market under the name of Apel from Mitsui Chemicals, Inc. It has different grades such as "APL 8008T" (Tg: 70° C.), "APL 6013T" (Tg: 125° C.), and "APL 6015T" (Tg: 145° C.) which are different from each other in a glass transition temperature (Tg). Pellets "TOPAS 8007", "TOPAS 6013", and "TOPAS 6015" are put on the market by Polyplastics Co., Ltd. while "Appear 3000" (Appear 3K) is put on the market by Ferrania Technologies S.p.A.

As the hydrides of the norbornene polymers, usable are those prepared by addition polymerization or ring-opening metathesis polymerization of a polycyclic unsaturated compound, followed by hydrogenation as disclosed in JP-A-1-240517, JP-A-7-196736, JP-A-60-26024, JP-A-62-19801, JP-A-2003-1159767, and JP-A-2004-309979. In the norbornene polymers to be used in the invention, $R^5$ and $R^6$ each represents preferably a hydrogen atom or —$CH_3$; $X^3$ and $Y^3$ each represents preferably a hydrogen atom, Cl, or —$COOCH_3$; and other substituents are selected as needed. Commercially available norbornene resins are also usable and they are put on the market, for example, under the name of "Arton G" and "Arton F" from JSR Corp. and "Zeonor ZF14", "Zeonor ZF16", "Zeonex 250", and "Zeonex 280" from Zeon Corp.

The cyclic polyolefin resin B preferably has a polystyrene-equivalent mass average molecular weight (Mw) of from 100,000 to 500,000, more preferably from 150,000 to 450,000, still more preferably from 200,000 to 400,000, as measured by gel-permeation chromatography (GPC). The molecular weight distribution (Mw/Mn wherein Mn is a number average molecular weight as measured by GPC) is preferably 10 or less, more preferably 5.0 or less, still more preferably 3.0 or less. The glass transition temperature (Tg; as measured by DSC) is preferably from 50 to 350° C., more preferably from 80 to 330° C., still more preferably from 100 to 300° C.

The cyclic olefin resin B has preferably an SP value of 19.5 or greater but not greater than 23.0. The SP value within the above range can improve the humidity dependence of optical characteristics upon mixing.

The SP value (solubility parameter) is a numerical value defined by the square root of the aggregation energy density and means an intermolecular force. The polarity of a polymer or a low molecular compound such as solvent can be quantified using this SP value and it can be determined either by the following calculation or actual measurement.

$$\text{SP value } (\delta) = (\Delta Ev/V)^{1/2}$$

In the above equation, $\Delta Ev$ represents a molar evaporation energy and V represents a molar volume.

As the $\Delta Ev$ and V, a sum ($\Delta Ev$) of molar evaporation heats ($\Delta ei$) of atomic groups and a sum (V) of molar volumes (vi) as described in Robert F. Fedors, *Polymer Engineering And Science*, February, 14(2), 151-153(1974) can also be used.

The SP value in the invention is a value calculated in accordance with the Hoy method.

In the invention, the absolute value of a difference of the SP value ($\Delta SP$) between the cyclic olefin resin B and the polymer A preferably satisfies the following range: $0 \leq |\Delta SP| \leq 4.5$. The $\Delta SP$ value falling within the above-described range does not easily cause phase separation when the two polymers are mixed. A more preferable range is $0 \leq |\Delta SP| \leq 3.5$, with $0 \leq |\Delta SP| \leq 2.5$ being even more preferred.

The film forming material in the invention contains at least both the polymer A and the cyclic olefin resin B. To 100 parts by mass of the polymer A, from 0.1 to 40 parts by mass, preferably from 2 to 30 parts by mass, still more preferably from 5 to 20 parts by mass of the cyclic olefin resin B is added.

(Additive)

The film forming material of the invention can contain an additive. It may contain, as the additive, at least one of the additives represented by the following formulas (1) to (5):

(1)

(2)

(3)

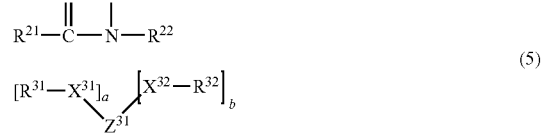

(4)

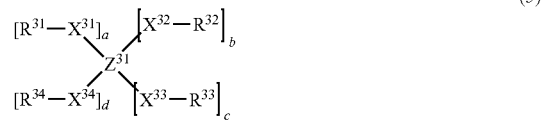

(5)

First, the additives of the formulas (1) and (2) are described.

In the formula (1), $R^1$ represents an alkyl group or an aryl group, and $R^2$ and $R^3$ each independently represents a hydrogen atom, an alkyl group, or an aryl group. The total number of the carbon atoms of $R^1$, $R^2$ and $R^3$ is particularly preferably 10 or greater. In the formula (2), $R^4$ and $R^5$ each independently represents an alkyl group or an aryl group. The total number of the carbon atoms of $R^4$ and $R^5$ is 10 or greater and the alkyl group or aryl group may each have a sustituent. As the substituent, a fluorine atom, an alkyl group, an aryl group, an alkoxy group, a sulfone group, and a sulfonamide group are preferred, with an alkyl group, an aryl group, an alkoxy group, a sulfone group, and a sulfonamide group being even more preferred. The alkyl group may be any of a straight-chain, branched or cyclic alkyl group. The alkyl group preferably have from 1 to 25 carbon atoms, more preferably have from 6 to 25 carbon atoms, even more preferably have from 6 to 20 carbon atoms (such as methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl, or didecyl). The aryl group preferably has from 6 to 30 carbon atoms, even more preferably from 6 to 24 carbon atoms (such as phenyl, biphenyl, terphenyl, naphthyl, binaphthyl, or triphenylphenyl). The following are preferred examples of the compounds represented by the formula (1) or (2) but the invention is not limited by these specific examples.

A-1

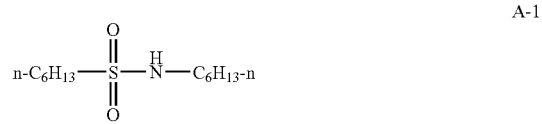

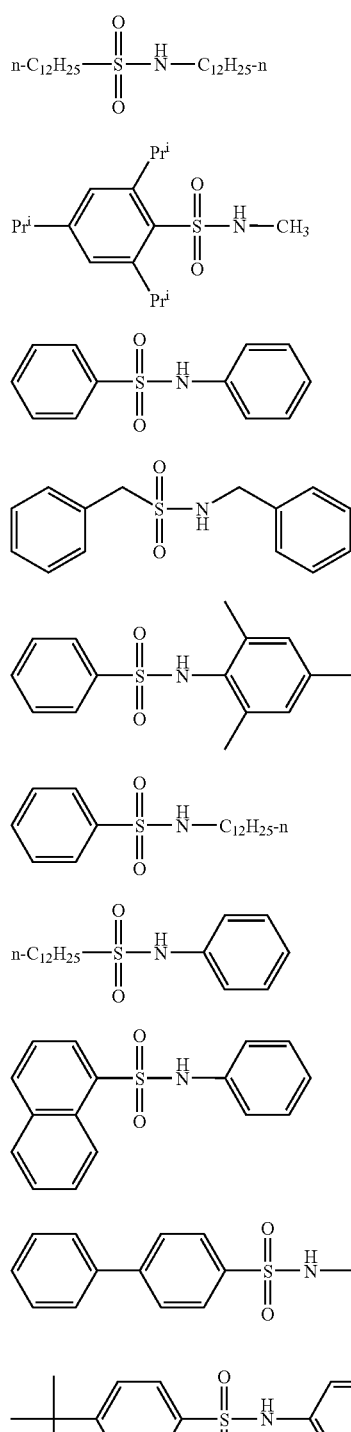
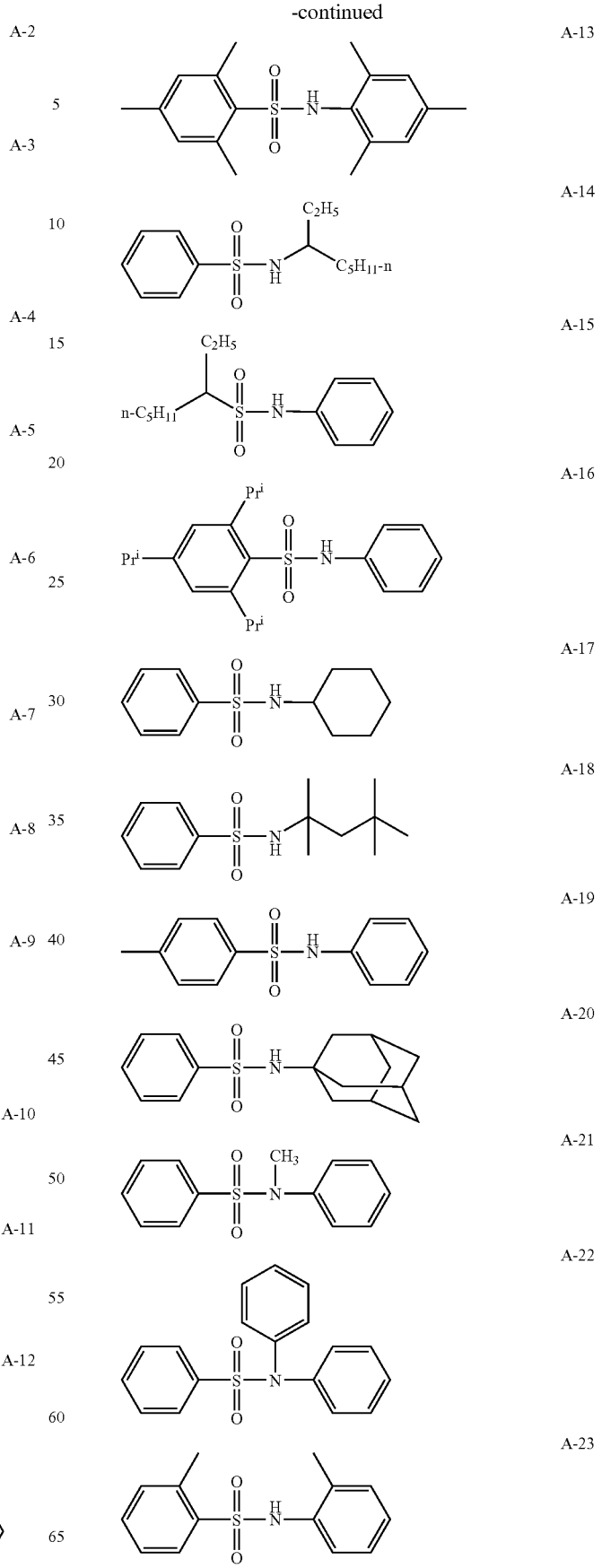

-continued
A-24
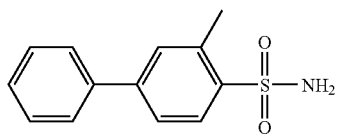
A-25
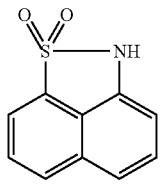
A-26
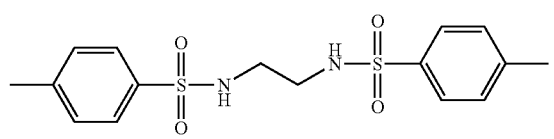
A-27
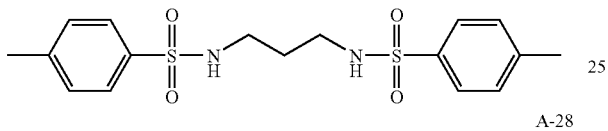
A-28
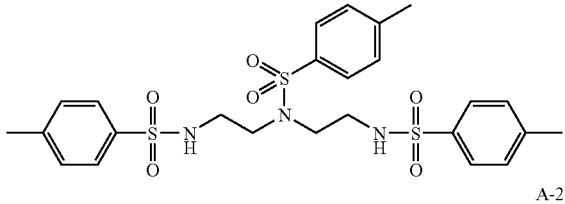
A-29
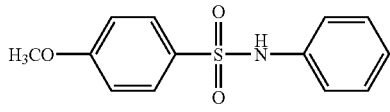
A-30
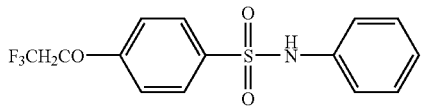
A-31
A-32
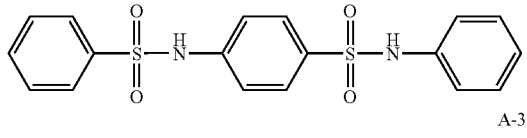
A-33
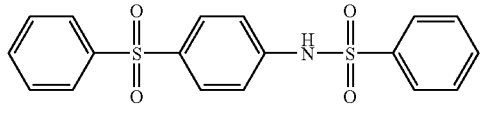
A-34
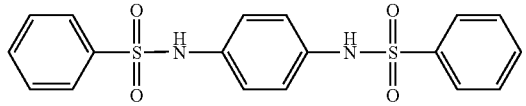
-continued
A-35
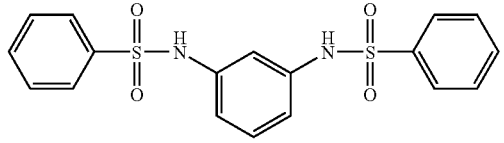
A-36
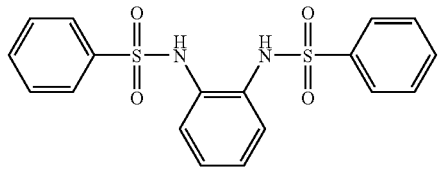
A-37
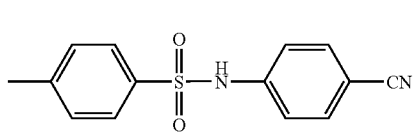
A-38
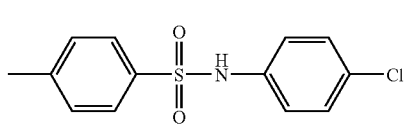
A-39
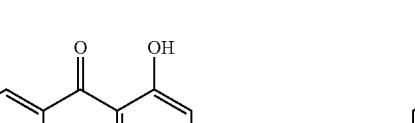
A-40
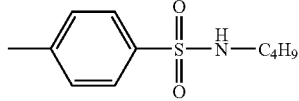
A-41
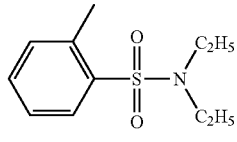
A-42
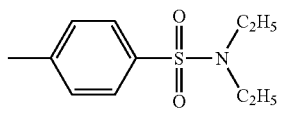
A-43
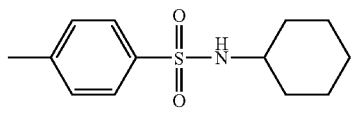
A-44
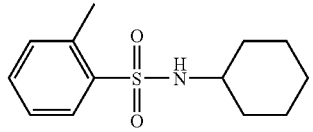
A-45

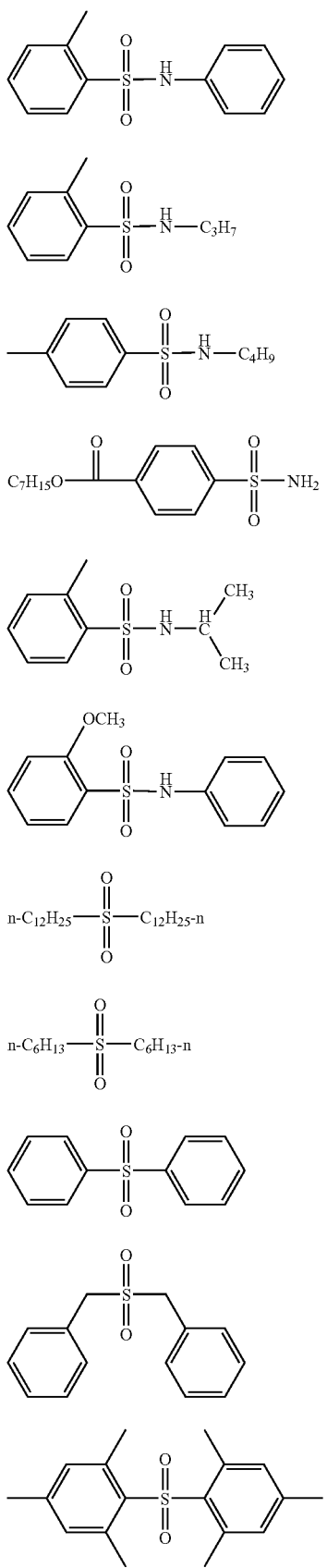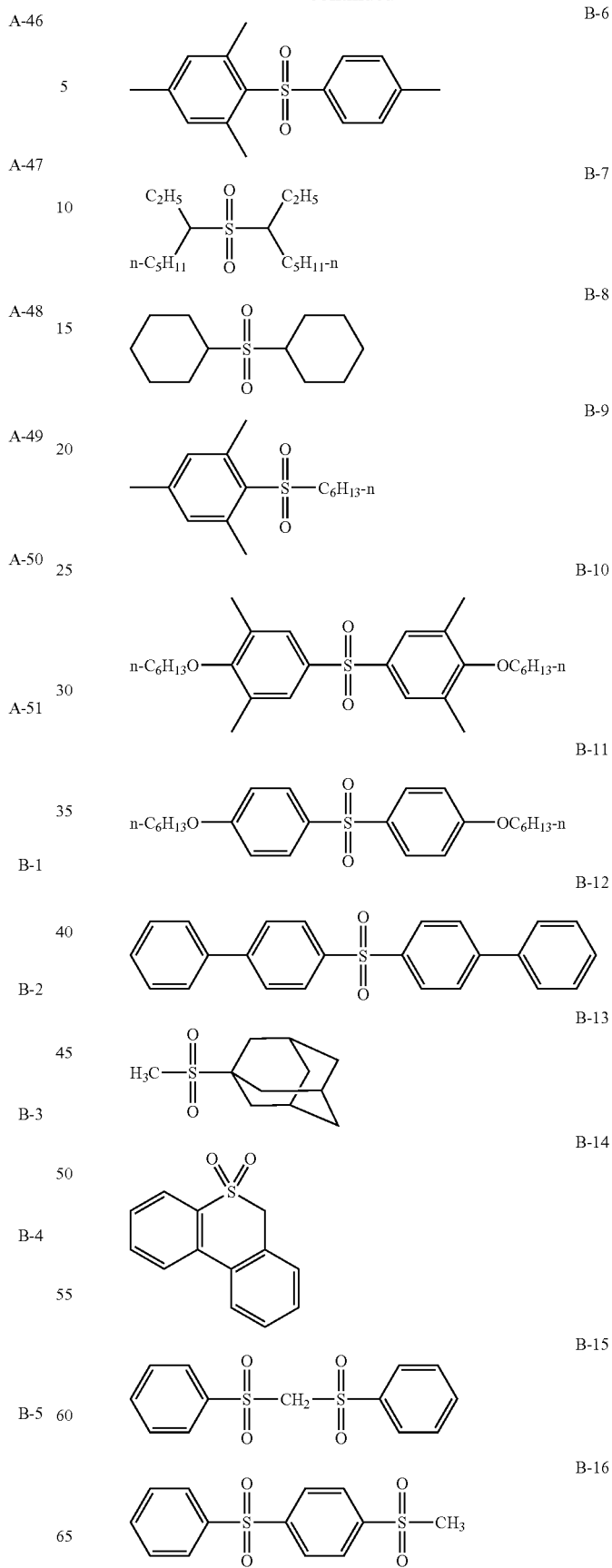

B-17
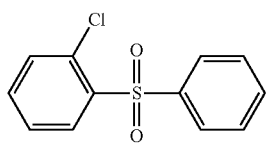
B-18
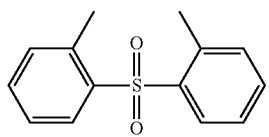
B-19
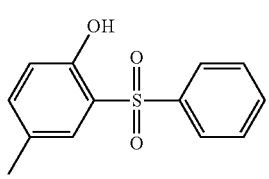
B-20
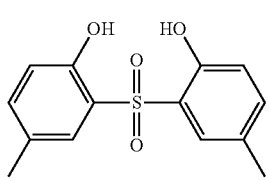
B-21
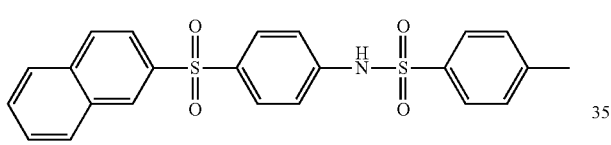
B-22
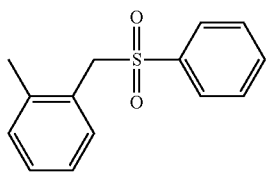
B-23
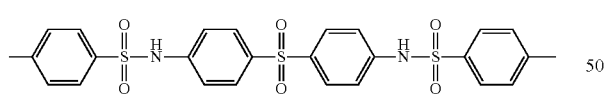
B-24
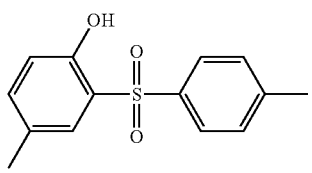
B-25
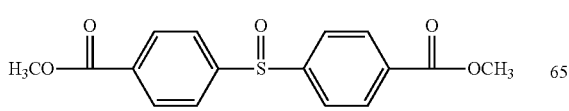
B-26
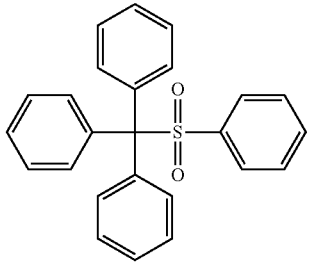
B-27
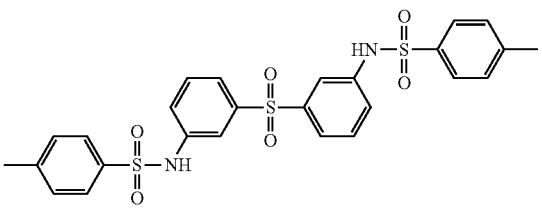
B-28
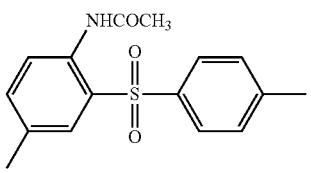
B-29
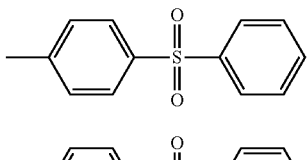
B-30
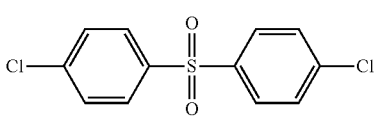
B-31
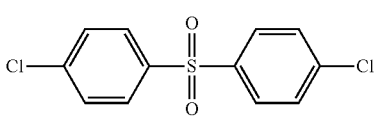
B-32
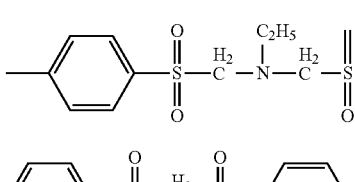
B-33
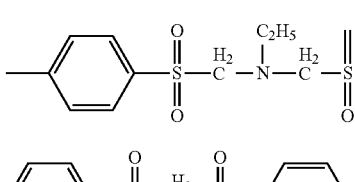
B-34
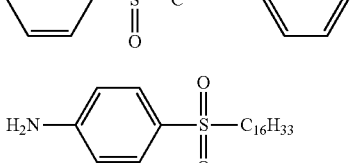
B-35
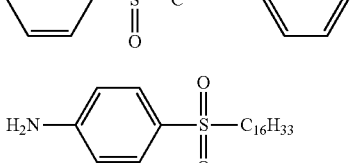
Next, the additives of the formula (3), (4), and (5) are described.

In the formula (3), $R^{11}$ represents an aryl group. $R^{12}$ and $R^{13}$ each independently represents an alkyl group or an aryl group and at least one of them represents an aryl group. The alkyl group or the aryl group may each contain a substituent.

In the formula (4), $R^{21}$, $R^{22}$, and $R^{23}$ each independently represents an alkyl group. The alkyl groups may each have a substituent.

In the formula (5), $R^{31}$, $R^{32}$, $R^{33}$, and $R^{34}$ each represents a hydrogen atom, a substituted or unsubstituted aliphatic group, or a substituted or unsubstituted aromatic group; $X^{31}$, $X^{32}$, $X^{33}$, and $X^{34}$ each represents a single bond or a divalent linking group composed of at least one group selected from the class consisting of —CO— and $NR^{35}$— (wherein $R^{35}$ represents a substituted or unsubstituted aliphatic group or a substituted or unsubstituted aromatic group); a, b, c, and d are each an integer of 0 or greater, and a+b+c+d is 2 or greater; and $Z^{31}$ represents an organic group (excluding a cyclic one) having a valence of (a+b+c+d).

In the formula (3), $R^{11}$ represents an aryl group. $R^{12}$ and $R^{13}$ each independently represents an alkyl group or an aryl group and at least one of them represents an aryl group. When $R^{12}$ represents an aryl group, $R^{13}$ may be either an alkyl group or an aryl group, but it is preferably an alkyl group. The alkyl group may be any of a straight-chain, branched or cyclic group. The alkyl group has preferably from 1 to 20, more preferably from 1 to 15, even more preferably form 1 to 12 carbon atoms. The aryl group has preferably from 6 to 36, more preferably from 6 to 24 carbon atoms.

In the formula (4), $R^{21}$, $R^{22}$, and $R^{23}$ each independently represents an alkyl group. The alkyl group may be any of a straight-chain, branched or cyclic alkyl group. It is preferred that $R^{21}$ represents a cyclic alkyl group and more preferred that at least one of $R^{22}$ and $R^{23}$ represents a cyclic alkyl group. The alkyl group has preferably from 1 to 20, more preferably from 1 to 15, even more preferably from 1 to 12 carbon atoms. As the cyclic alkyl group, a cyclohexyl group is particularly preferred.

The alkyl group and aryl group in the formulas (3) and (4) may each have a substituent. As the substituent, halogen atoms (such as chlorine, bromine, fluorine, and iodine), alkyl groups, aryl groups, alkoxy groups, aryloxy groups, acyl groups, alkoxycarbonyl groups, aryloxycarbonyl groups, acyloxy groups, sulfonylamino groups, hydroxy group, cyano group, amino group, and acylamino groups are preferred, with halogen atoms, alkyl groups, aryl groups, alkoxy groups, aryloxy groups, sulfonylamino group and acylamino groups being more preferred and alkyl groups, aryl groups, sulfonylamino group and acylamino groups being even more preferred.

Preferred examples of the compound represented by the formula (3) or (4) will next be shown, but the invention is not limited by these specific examples.

The compounds attached with (A-) are specific examples of the compound represented by the formula (3), while those attached with (B-) are specific examples of the compound represented by the formula (4).

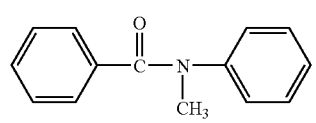
(A-1)

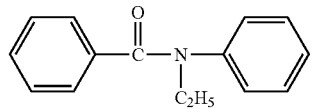
(A-2)

(A-3)

(A-4)

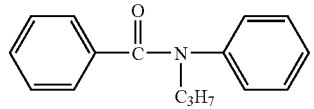
(A-5)

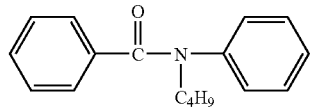
(A-6)

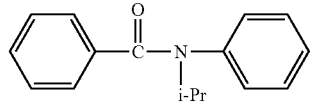
(A-7)

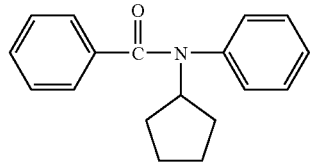
(A-8)

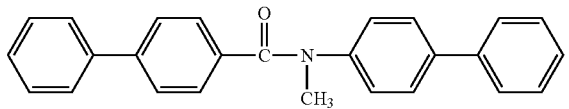
(A-9)

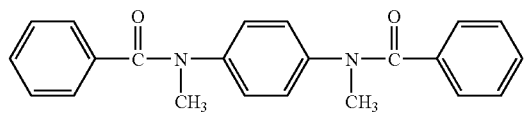
(A-10)

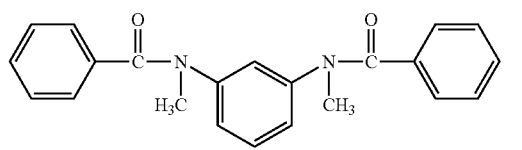
(A-11)

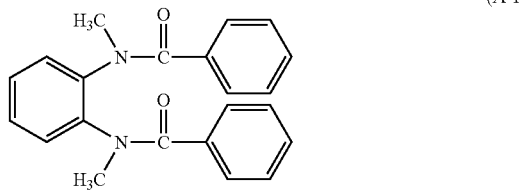
(A-12)

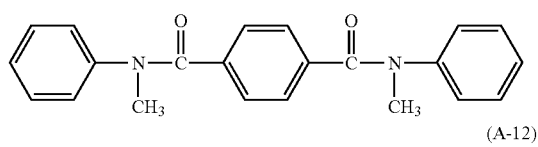

-continued
(A-13)
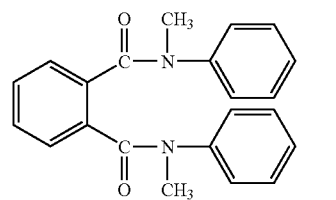
(A-14)
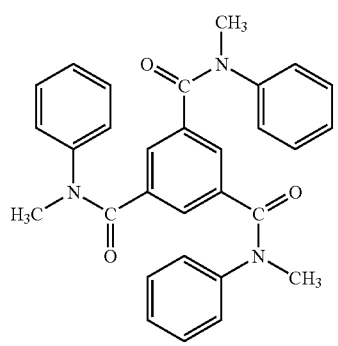
(A-15)
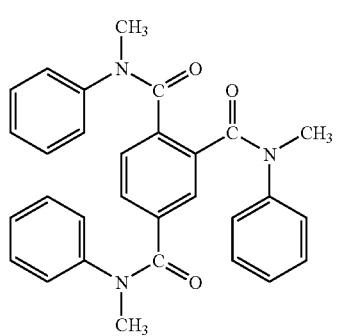
(A-16)
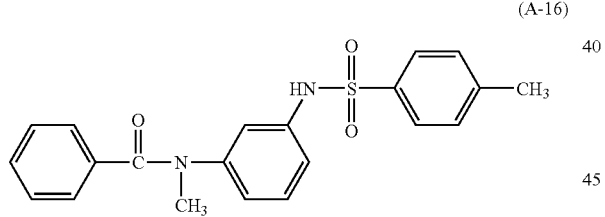
(A-17)
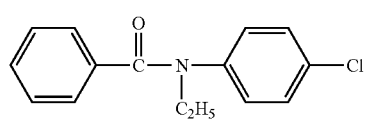
(A-18)
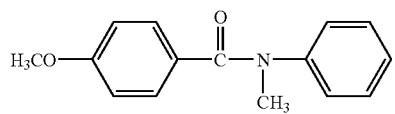
(A-19)
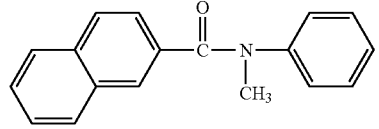
-continued
(A-20)
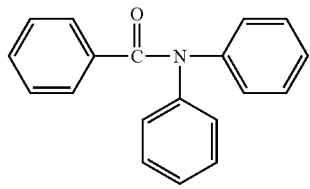
(A-21)
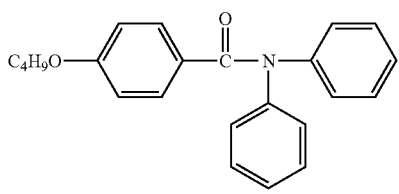
(A-22)
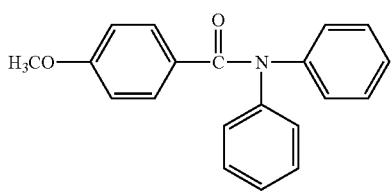
(A-23)
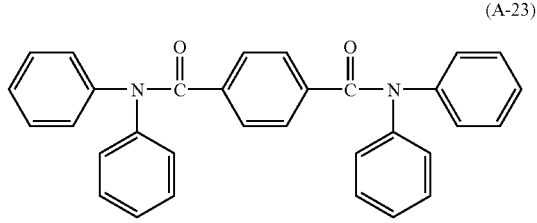
(A-24)
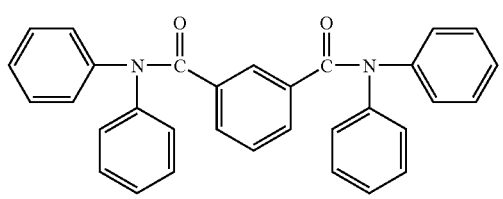
(A-25)
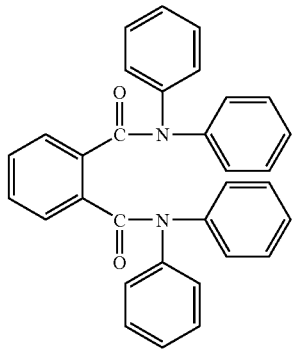

-continued
(A-26)
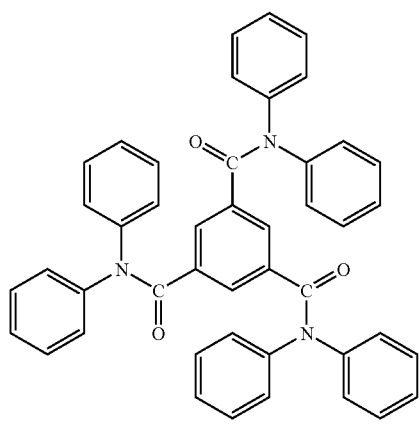
(A-27)
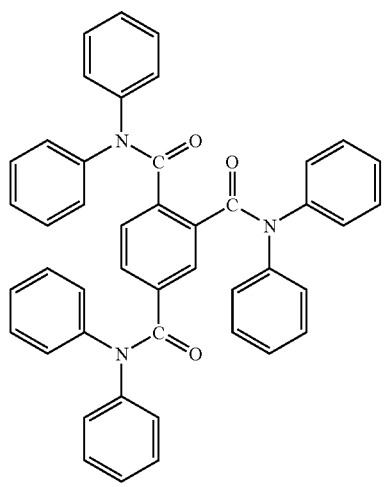
(A-28)
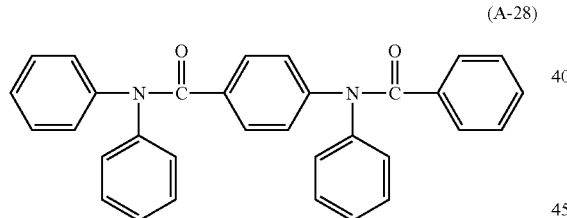
(B-1)
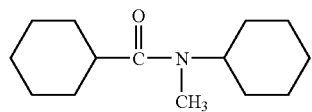
(B-2)
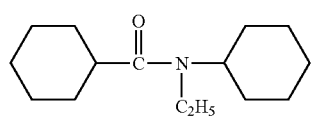
(B-3)
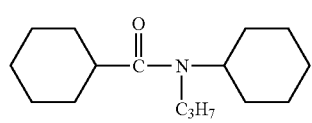
(B-4)
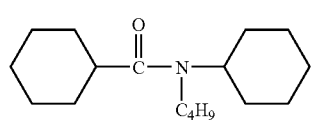
-continued
(B-5)
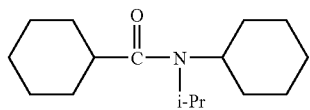
(B-6)
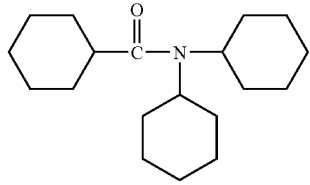
(B-7)
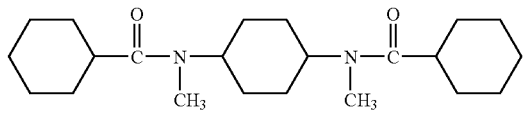
(B-8)
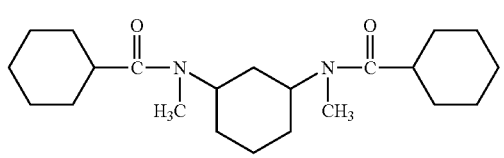
(B-9)
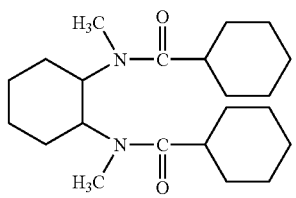
(B-10)
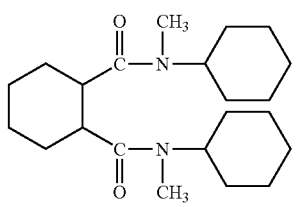
(B-11)
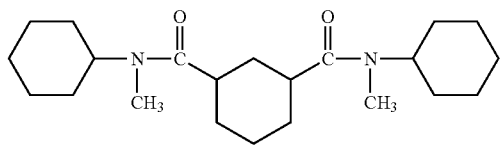
(B-12)
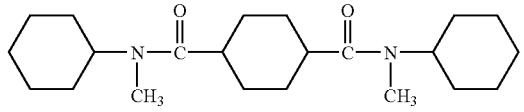

-continued (B-13)

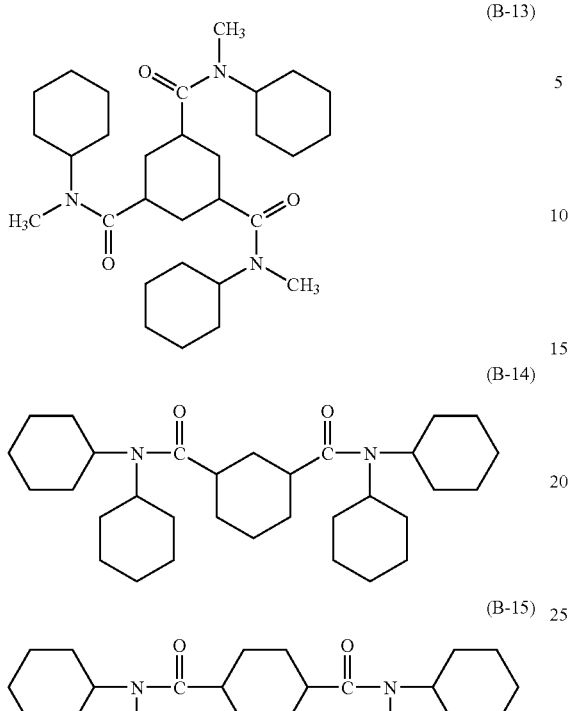

(B-14)

(B-15)

(B-16)

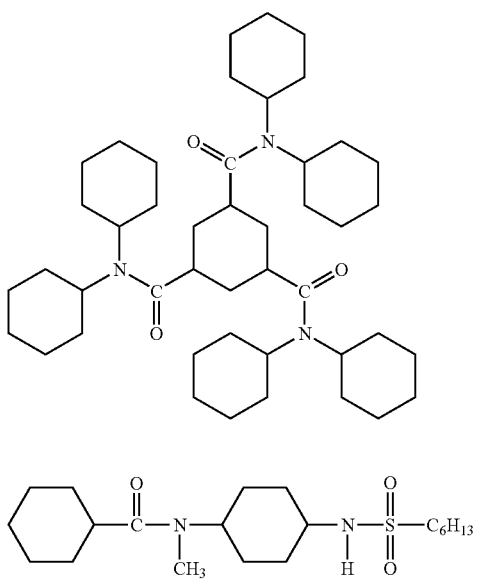

(B-17)

(B-18)

(B-19)

-continued (B-20)

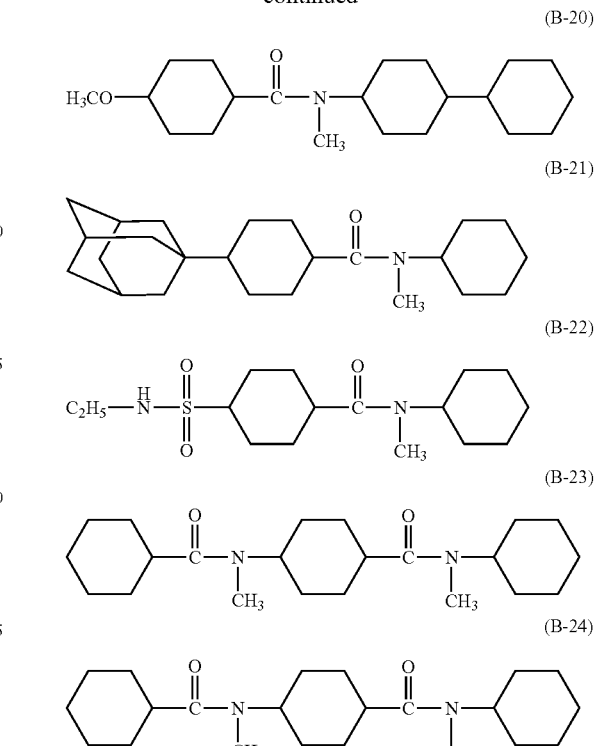

(B-21)

(B-22)

(B-23)

(B-24)

Any of the above-described compounds can be prepared in a known manner. Described specifically, they can be obtained by a dehydration condensation reaction between a carboxylic acid and an amine while using a condensing agent (such as dicyclohexylcarbodiimide (DCC), etc.) or a substitution reaction bewteen a carboxylic acid chloride derivative and an amine derivative.

Next, the compounds represented by the formula (5) are described in detail. In the formula (5), $R^{31}$, $R^{32}$, $R^{33}$, and $R^{34}$ each represents a hydrogen atom, a substituted or unsubstituted aliphatic group, or a substituted or unsubstituted aromatic group. An aliphatic group is preferred. The aliphatic group may be any of a straight-chain, branched or cyclic group and a cyclic aliphatic group is preferred. Examples of the substituent which the aliphatic group or the aromatic group may have include the substituent T which will be described later, but an unsubstituted group is preferred.

$X^{31}$, $X^{32}$, $X^{33}$, and $X^{34}$ each independently represents a single bond or a divalent linking group composed of at least one group selected from the class consisting of —CO— and $NR^{35}$— (wherein, $R^{35}$ represents a substituted or unsubstituted aliphatic group or a substituted or unsubstituted aromatic group, of which the unsubstituted group and/or the aliphatic group is more preferred). Although no particular limitation is imposed on the combination of $X^{31}$, $X^{32}$, $X^{33}$, and $X^{34}$, it is preferred to use groups selected from —CO— and $NR^{35}$— in combination. Each of a, b, c, and d stands for an integer of 0 or greater, of which 0 or 1 is preferred. In addition, a+b+c+d is 2 or greater, preferably from 2 to 8, more preferably from 2 to 6, even more preferably from 2 to 4. $Z^{31}$ represents an organic group (excluding a cyclic one) having a valence of (a+b+c+d). The valence of $Z^{31}$ is preferably from 2 to 8, more preferably from 2 to 6, even more preferably from 2 to 4, most preferably 2 or 3. The term "organic group" means a group composed of an organic compound.

The compound represented by the formula (5) is preferably a compound represented by the following formula (5-1).

$$R^{311}-X^{311}-Z^{311}-X^{312}-R^{312} \qquad \text{Formula (5-1)}$$

In the formula (5-1), $R^{311}$ and $R^{312}$ each represents a substituted or unsubstituted aliphatic group or a substituted or unsubstituted aromatic group, of which the aliphatic group is preferred. The aliphatic group may be any of a straight-chain, branched or cyclic aliphatic group, of which the cyclic aliphatic group is preferred. Examples of the substituent which the aliphatic group or the aromatic group may have include the substituent T which will be described later, but the unsubstituted group is preferred. $X^{311}$ and $X^{312}$ each independently represents —CONR$^{313}$— or —NR$^{314}$CO—. $R^{313}$ and $R^{314}$ each represents a substituted or unsubstituted aliphatic group or a substituted or unsubstituted aromatic group, of which the unsubstituted group and/or the aliphatic group is preferred. $Z^{311}$ represents a divalent organic group (excluding a cyclic one) composed of at least one group selected from —O—, —S—, —SO—, —SO$_2$—, —CO—, —NR$^{315}$— (wherein $R^{315}$ represents a substituted or unsubstituted aliphatic group or a substituted or unsubstituted aromatic group, of which the unsubstituted group and/or the aliphatic group is more preferred), alkylene groups and arylene groups. Although no particular limitation is imposed on the combination of $Z^{311}$s, it is preferred to use in combination groups selected from —O—, —S—, —NR$^{315}$— and alkylene groups, more preferably from —O—, —S— and alkylene groups.

The compound represented by the formula (5-1) is preferably a compound represented by any of the formulas from (5-2) to (5-4).

Formula (5-2)

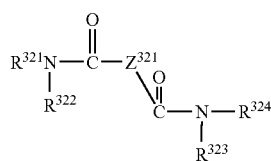

Formula (5-3)

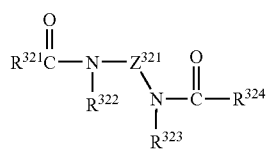

Formula (5-4)

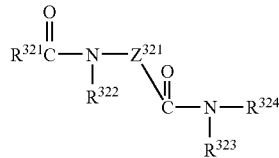

In the formulas from (5-2) to (5-4), $R^{321}$, $R^{322}$, $R^{323}$ and $R^{324}$ each represents a substituted or unsubstituted aliphatic group or a substituted or unsubstituted aromatic group, of which the aliphatic group is preferred. The aliphatic group may be any of a straight-chain, branched or cyclic aliphatic group, of which the cyclic aliphatic group is preferred. Examples of the substituent which the aliphatic group or the aromatic group may have include the substituent T which will be described later, but the unsubstituted group is preferred. $Z^{321}$ represents a divalent linking group composed of one or more groups selected from —O—, —S—, —SO—, —SO$_2$—, —CO—, —NR$^{325}$— (wherein $R^{325}$ represents a substituted or unsubstituted aliphatic group or a substituted or unsubstituted aromatic group, of which the unsubstituted group and/or the aliphatic group is preferred), alkylene groups and arylene groups. Although no particular limitation is imposed on the combination of $Z^{321}$s, it is preferred to use in combination groups selected from —O—, —S—, —NR$^{325}$— and alkylene groups, more preferably from —O—, —S— and alkylene groups.

Next, the substituted or unsubstituted aliphatic group will be described. The aliphatic group may be any of a straight-chain, branched or cyclic aliphatic group. It has preferably from 1 to 25, more preferably from 6 to 25, even more preferably from 6 to 20 carbon atoms. Specific examples of the aliphatic group include methyl, ethyl, n-propyl, isopropyl, cyclopropyl, n-butyl, isobutyl, t-butyl, amyl, isoamyl, t-amyl, n-hexyl, cyclohexyl, n-heptyl, n-octyl, bicyclooctyl, adamantyl, n-decyl, t-octyl, dodecyl, hexadecyl, octadecyl, and didecyl.

Next, the aromatic group will be described.

The aromatic group may be either an aromatic hydrocarbon group or an aromatic heterocyclic group, of which the aromatic hydrocarbon group is preferred. The aromatic hydrocarbon group has preferably from 6 to 24, more preferably from 6 to 12 carbon atoms. Specific examples of the ring of the aromatic hydrocarbon group include benzene, naphthalene, anthracene, biphenyl, and terphenyl. As the aromatic hydrocarbon group, benzene, naphthalene and biphenyl are even more preferred. The aromatic heterocyclic group contains preferably at least one of an oxygen atom, a nitrogen atom and a sulfur atom. Specific examples of the heterocycle include furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine, naphthylizine, quinoxaline, quinazoline, cinnoline, pteridine, acridine, phenanthroline, phenazine, tetrazole, benzimidazole, benzoxazole, benzthiazole, benztriazole, and tetrazaindene. As the aromatic heterocyclic group, pyridine, triazine, or quinoline is even more preferred.

Next, the substituent T will be described in detail.

Examples of the substituent T include alkyl groups (having preferably from 1 to 20, more preferably from 1 to 12, even more preferably from 1 to 8 carbon atoms, such as methyl, ethyl, isopropyl, t-butyl, n-octyl, n-decyl, n-hexadecyl, cyclopropyl, cyclopentyl, and cyclohexyl), alkenyl groups (having preferably from 2 to 20, more preferably from 2 to 12, even more preferably from 2 to 8, such as vinyl, allyl, 2-butenyl, and 3-pentenyl), alkynyl groups (having preferably from 2 to 20, more preferably from 2 to 12, even more preferably from 2 to 8 carbon atoms, such as propargyl and 3-pentynyl), aryl groups (having preferably from 6 to 30, more preferably from 6 to 20, even more preferably from 6 to 12, such as phenyl, biphenyl, and naphthyl), amino groups (having preferably from 0 to 20, more preferably from 0 to 10, even more preferably from 0 to 6 carbon atoms, such as amino, methylamino, dimethylamino, diethylamino, and dibenzylamino), alkoxy groups (having preferably from 1 to 20, more preferably from 1 to 12, even more preferably from 1 to 8 carbon atoms, such as methoxy, ethoxy, and butoxy), aryloxy groups (having preferably from 6 to 20, more preferably from 6 to 16, even more preferably from 6 to 12 carbon atoms, such as phenyloxy and 2-naphthyloxy), acyl groups (having preferably from 1 to 20, more preferably from 1 to 16, even more preferably from 1 to 12 carbon atoms, such as acetyl, benzoyl, formyl, and pivaloyl), alkoxycarbonyl groups (having preferably from 2 to 20, more preferably from 2 to 16, even more preferably from 2 to 12 carbon atoms, such as methoxycarbonyl and ethoxycarbonyl), aryloxycarbonyl groups (having preferably from 7 to 20, more preferably from 7 to 16, even more preferably from 7 to 10 carbon atoms, such as phenyloxycarbonyl), acyloxy groups (having preferably from 2 to 20, more preferably from 2 to 16, even more preferably from 2 to 10 carbon atom, such as acetoxy and benzoyloxy), acylamino groups (having preferably from 2 to 20, more preferably from 2 to 16, even more preferably from 2 to 10 carbon atoms, such as acetylamino and benzoylamino), alkoxycarbonylamino groups (having preferably from 2 to 20, more preferably from 2 to 16, even more preferably from 2 to 12 carbon atoms, such as methoxycarbonylamino), aryloxycarbonylamino groups (having preferably from 7 to 20, more preferably from 7 to 16, even more preferably from 7 to 12 carbon atoms, such as phenyloxycarbonylamino), sulfonylamino groups (having preferably from 1 to 20, more preferably from 1 to 16, even more preferably from 1 to 12 carbon atoms, such as methanesulfonylamino and benzenesulfonylamino), sulfamoyl groups (having preferably from 0 to 20, more preferably from 0 to 16, even more preferably from 0 to 12 carbon atoms, such as sulfamoyl, methylsulfamoyl, dimethylsulfamoyl, and phenylsulfamoyl), carbamoyl groups (having preferably from 1 to 20, more preferably from 1 to 16, even more preferably from 1 to 12 carbon atoms, such as carbamoyl, methylcarbamoyl, diethylcarbamoyl, and phenylcarbamoyl), alkylthio groups (having preferably from 1 to 20, more preferably from 1 to 16, even more preferably from 1 to 12 carbon atoms, such as methylthio and ethylthio), artylthio groups (having preferably from 6 to 20, more preferably from 6 to 16, even more preferably from 6 to 12 carbon atoms, such as phenylthio), sulfonyl groups (having preferably from 1 to 20, more preferably from 1 to 16, even more preferably from 1 to 12 carbon atoms, such as mesyl and tosyl), sulfinyl groups (having preferably from 1 to 20, more preferably from 1 to 16, even more preferably from 1 to 12 carbon atoms, such as methanesulfinyl and benzenesulfinyl), ureido groups (having preferably from 1 to 20, more preferably from 1 to 16, even more preferably from 1 to 12 carbon atoms, such as ureido, methylureido, and phenylureido), phosphoric acid amide groups (having preferably from 1 to 20, more preferably from 1 to 16, even more preferably from 1 to 12 carbon atoms, such as diethylphosphoric acid amide and phenylphosphoric acid amide), a hydroxyl group, a mercapto group, halogen atoms (for example, fluorine, chlorine, bromine, and iodine), a cyano group, a sulfo group, a carboxyl group, a nitro group, a hydroxamic acid group, a sulfino group, a hydrazino group, an imino group, heterocyclic groups (having preferably from 1 to 30, more preferably from 1 to 12 carbon atoms; and having, as the hetero atom, a nitrogen atom, an oxygen atom, or a sulfur atom; more specifically, imidazolyl, pyridyl, quinolyl, furyl, piperidyl, morpholino, benzoxazolyl, benzimidazolyl, and benzthiazolyl group), and silyl groups (having preferably from 3 to 40, more preferably from 3 to 30, even more preferably from 3 to 24 carbon atoms, such as trimethylsilyl and triphenylsilyl). These substituents may be substituted further. Furthermore, when two or more substituents are present, they may be the same or different. Moreover, if possible, they may be coupled together to form a ring.

Preferred examples of the compound represented by the formula (5) will be given below, but the invention is not limited by these specific examples.

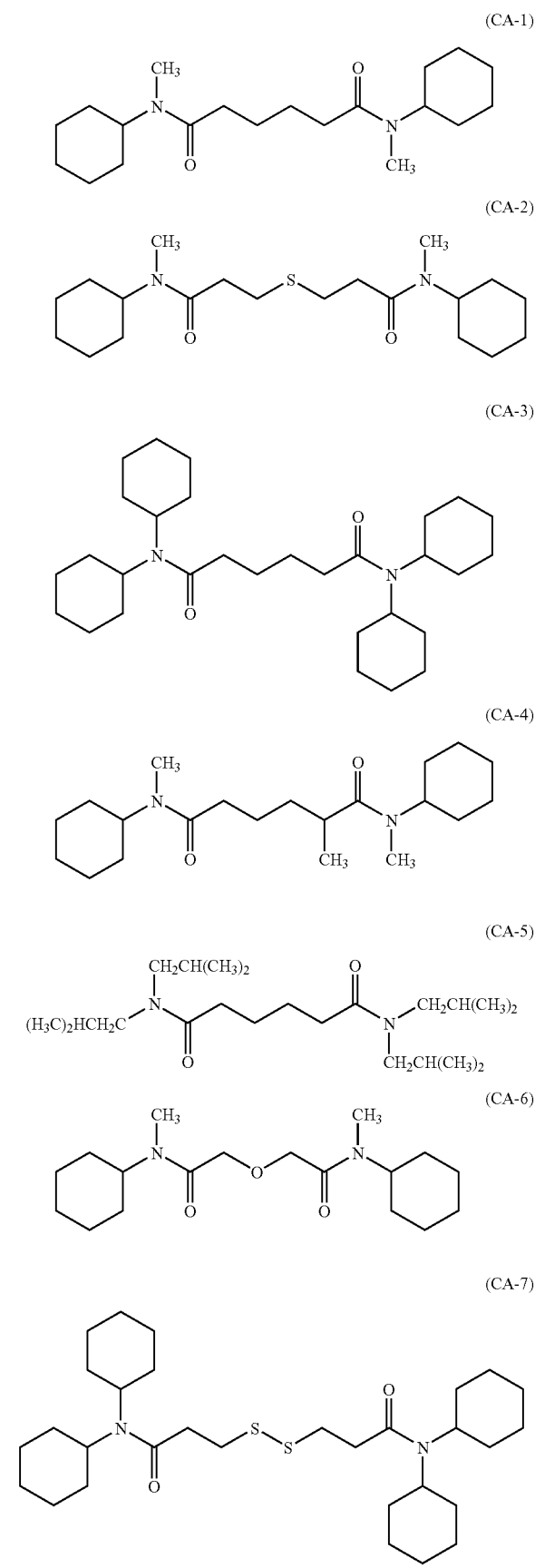

(CA-8)
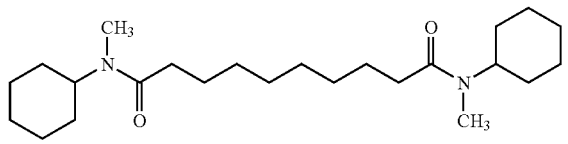

(CA-9)
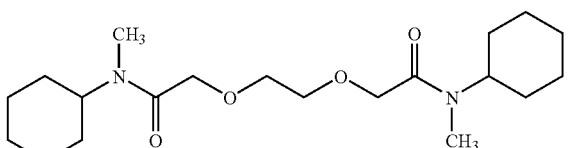

(CA-10)
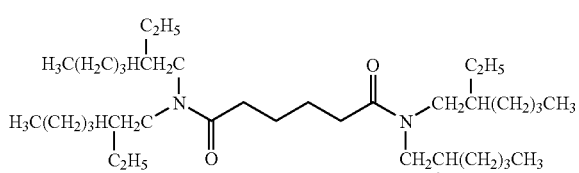

(CB-1)
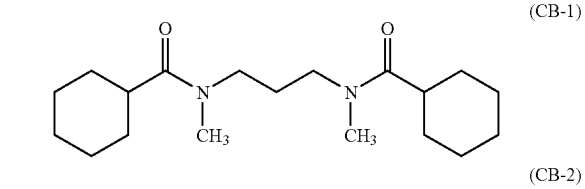

(CB-2)
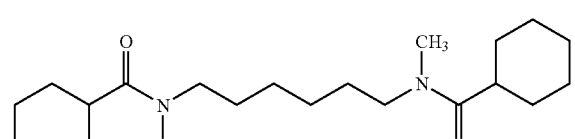

(CB-3)
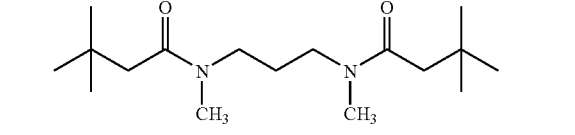

(CB-4)
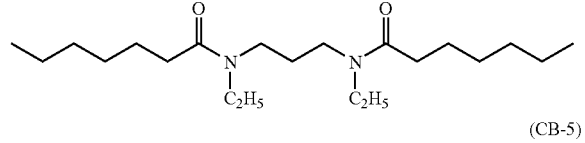

(CB-5)
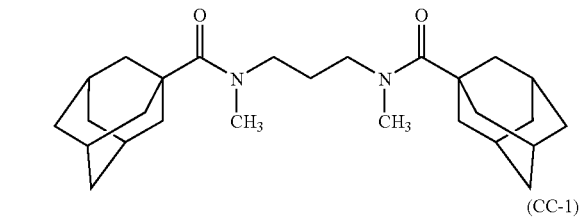

(CC-1)
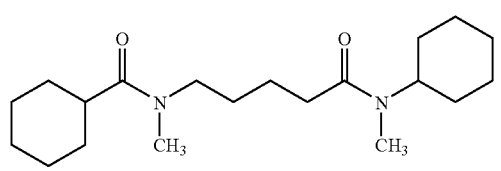

(CC-2)
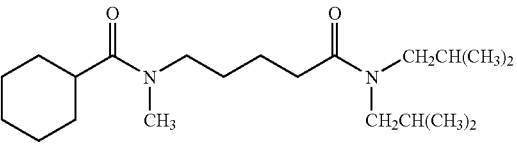

(CC-3)
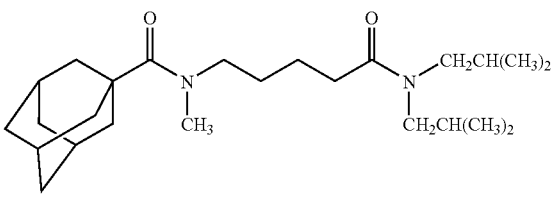

(CC-4)
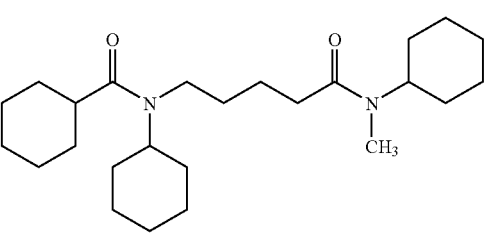

The film forming material of the invention preferably contains, as an additive, at least one of compounds having a structure represented by the following formula (9) or (10).

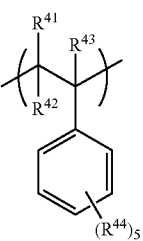
(9)

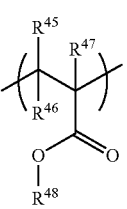
(10)

In the formula (9) or (10), $R^{41}$ to $R^{48}$ each independently represents a hydrogen atom, a halogen atom, a substituted or unsubstituted hydrocarbon group having from 1 to 30 carbon atoms which may have an oxygen-, sulfur-, nitrogen-, or silicon-containing linking group, or a polar group, $R^{44}$s may all be the same atom or group, may be different atom or group, or may be coupled together to form a carbocycle or heterocycle (the carbocycle or heterocycle may have a monocyclic structure or may be condensed with another ring to form a polycyclic structure).

The formula (9) is a structural unit available from an aromatic vinyl monomer. Specific examples of the aromatic vinyl monomer include styrene; alkyl-substituted styrenes such as α-methylstyrene, β-methylstyrene, and p-methylstyrene; halogen-substituted styrenes such as 4-chlorostyrene and 4-bromostyrene; hydroxystyrenes such as p-hydroxystyrene, α-methyl-p-hydroxystyrene, 2-methyl-4-hydroxystyrene, and 3,4-dihydroxystyrene; vinylbenzyl alcohols; alkoxy-substituted styrenes such as p-methoxystyrene, p-t-butoxystyrene, and m-t-butoxystyrene; vinylbenzoic acids such as 3-vinylbenzoic acid and 4-vinylbenzoic acid; vinylbenzoates such as methyl-4-vinylbenzoate and ethyl-4-vinylbenzoate; 4-vinylbenzyl acetate; 4-acetoxystyrene; amidostyrenes such as 2-butylamidostyrene, 4-methylamidostyrene, and p-sulfonamidostyrene; aminostyrenes such as 3-aminostyrene, 4-aminostyrene, 2-isopropenylaniline, and vinylbenzyldimethylamine; nitrostyrenes such as 3-nitrostyrene and 4-nitrostyrene; cyanostyrenes such as 3-cyanostyrene and 4-cyanostyrene; vinylphenylacetonitrile; arylstyrene such as phenylstyrene; and indenes. The invention is not limited by these specific examples. Two or more of these monomers may be employed as copolymer components. Among these aromatic vinyl monomers, styrene and α-methylstyrene are preferred because they are easily available on an industrial scale and less expensive.

The formula (10) is a structural unit available from an acrylate monomer. Examples of the acrylate monomer include methyl acrylate, ethyl acrylate, (i- or n-)propyl acrylate, (n-, i-, s- or t-)butyl acrylate, (n-, i- or s-)pentyl acrylate, (n- or i-)hexyl acrylate, (n- or i-)heptyl acrylate, (n- or i-)octyl acrylate, (n- or i-)nonyl acrylate, (n- or i-)myrystyl acrylate, (2-ethylhexyl)acrylate, (ε-caprolactone)acrylate, (2-hydroxyethyl)acrylate, (2-hydroxypropyl)acrylate, (3-hydroxypropyl)acrylate, (4-hydroxybutyl)acrylate, (2-hydroxybutyl)acrylate, (2-methoxyethyl)acrylate, (2-ethoxyethyl)acrylate, phenyl acrylate, phenyl methacrylate, (2- or 4-chlorophenyl)acrylate, (2- or 4-chlorophenyl)methacrylate, (2-, 3- or 4-ethoxycarbonylphenyl)acrylate, (2-, 3- or 4-ethoxycarbonylphenyl)methacrylate, (o-, m- or p-tolyl)acrylate, (o-, m- or p-tolyl)methacrylate, benzyl acrylate, benzyl methacrylate, phenethyl acrylate, phenethyl methacrylate, (2-naphthyl)acrylate, cyclohexyl acrylate, cyclohexyl methacrylate, (4-methylcyclohexyl)acrylate, (4-methylcyclohexyl)methacrylate, (4-ethylcyclohexyl)acrylate, and (4-ethylcyclohexyl)methacrylate and these monomers having methacrylate instead of the acrylate. The invention is however not limited by them. Two or more of these monomers may be employed as copolymer components. Of these acrylate monomers, methyl acrylate, ethyl acrylate, (i- or n-)propyl acrylate, (n-, i-, s- or t-)butyl acrylate, (n-, i- or s-)pentyl acrylate, and (n- or i-)hexyl acrylate, and these monomers having methacrylate instead of the acrylate are preferred because they are easily available on an industrial scale and less expensive.

The (co)polymer preferably contains at least one structural unit available from the aromatic vinyl monomer represented by the formula (9) and the acrylate monomer represented by the formula (10). As another structure constituting the copolymer composition, those highly copolymerizable with the above-described monomers are preferred. Examples include acid anhydrides such as maleic anhydride, citraconic anhydride, cis-1-cyclohexene-1,2-dicarboxylic anhydride, 3-methyl-cis-1-cyclohexene-1,2-dicarboxylic anhydride, and 4-methyl-cis-1-cyclohexane-1,2-dicarboxylic anhydride; nitrile-containing radical polymerizable monomers such as acrylonitrile and methacrylonitrile; amide-bond-containing radical polymerizable monomers such as acrylamide, methacrylamide and trifluoromethanesulfonylaminoethyl (meth)acrylate; fatty acid vinyls such as vinyl acetate; chlorine-containing radical polymerizable monomers such as vinyl chloride and vinylidene chloride; conjugated diolefins such as 1,3-butadiene, isoprene, and 1,4-dimethylbutadiene. The invention is however not limited by them.

When the copolymer as described above is used, the content of the structural unit represented by the formula (9) in the copolymer composition is preferably at least 30 mol %; the content of the structural unit represented by the formula (10) is preferably at least 20 mol %; and the content of another copolymer component is preferably 50 mol % or less.

The weight-average molecular weight of the compound having the structure represented by the formula (9) or (10) is preferably 500 or greater but not greater than 300000, more preferably 500 or greater but not greater than 15000 in order to obtain a film excellent in compatibility and transparency and exhibiting optical characteristics effectively, even more preferably 500 or greater but not greater than 5000.

In the invention, the weight-average molecular weight of the compound to be incorporated in the film forming material is a value obtained by measurement by GPC (developing solvent: tetrahydrofuran, based on polystyrene standards).

(Synthesis Process of Additive)

The above-described additive can also be obtained by synthesis.

For example, the additive of the formula (1) can be obtained by a condensation reaction between a sulfonyl chloride derivative and an amine derivative. The compound of the formula (2) can be obtained either by an oxidation reaction of sulfide or by a Friedel-Crafts reaction between an aromatic compound and sulfonic acid chloride.

(Amount of the Additive)

The additive represented by any of the formulas (1) to (5) is added in an amount of preferably from 0.1 to 40 mass %, more preferably from 5 to 38 mass %, even more preferably from 10 to 35 mass %, based on the cyclic polyolefin resin.

When the amount falls within the above-described range, the film of the invention used as a protective film for polarizing plate is excellent in aptitude for lamination to a polarizing plate and decreases a risk of peeling of the film after processing of the polarizing plate.

The above-described additives may be used either singly or in combination. When two or more additives are used, a total amount of them is preferably from 0.1 to 40 mass %, more preferably from 5 to 38 mass %, even more preferably from 10 to 35 mass % based on the cyclic polyolefin resin.

The compound having the structure represented by the formula (9) or (10) is added in an amount of preferably from 0.1 to 40 mass % of the cyclic polyolefin resin. In order to obtain a film excellent in transparency after formation and capable of readily exhibiting optical characteristics, the amount is more preferably from 5 to 38 mass %, even more preferably from 10 to 35 mass %.

These compounds having the structure represented by the formula (9) or (10) may be used either singly or two or more of these compounds may be used after mixed at an arbitrary ratio.

The total content of the two or more compounds having the structure represented by the formula (9) or (10) is preferably from 0.1 to 40 mass % of the cyclic polyolefin resin. In order to obtain a film excellent in transparency after formation and capable of readily exhibiting optical characteristics, the amount is more preferably from 5 to 38 mass %, even more preferably from 10 to 35 mass %.

(Adding Method of Additives)

These additives may be used either singly or two or more of these additives may be used after mixed at an arbitrary ratio.

These compounds may be added at any time during a dope preparation step and they may be added at the final stage of the dope preparation step.

(Fine Particles)

In the invention, addition of fine particles to the film forming material enables to improve film formation stability and processing apptitude of the resulting film and reduce optical unevenness of the film due to winding strain or the like. As the fine particles, fine particles of an organic or inorganic compound can be used in the invention.

As the inorganic compound, silicon-containing compounds, silicon dioxide, titanium oxide, zinc oxide, aluminum oxide, barium oxide, zirconium oxide, strontium oxide, antimony oxide, tin oxide, tin oxide/antimony, calcium carbonate, talc, clay, calcined kaolin, calcined calcium silicate, hydrated calcium silicate, aluminum silicate, magnesium silicate, and calcium phosphate are preferred, of which silicon-containing inorganic compounds and metal oxides are more preferred. In short, metal oxides or inorganic silicon compounds are preferred as the fine particles in the invention. Silicon dioxide is particularly preferred in the invention because it can provide a film having reduced turbidity. As the fine particles of silicon dioxide, products commercially available under the trade name of "AEROSIL R972", "AEROSIL R974", "AEROSIL R812", "AEROSIL 200", "AEROSIL 300", "AEROSIL R202", "AEROSIL OX50", and "AEROSIL TT600" (each, product of Nippon Aerosil). As the fine particles of zirconium oxide, products commercially available under the trade name of "AEROSIL R976" and "AEROSIL R811" (each, product of Nippon Aerosil) can be used.

Examples of the organic compound include polytetrafluoroethylene, cellulose acetate, polystyrene, polymethyl methacrylate, polypropyl methacrylate, polymethyl acrylate, polyethylene carbonate, and starch. Ground and classified products of these organic compounds are also usable. High molecular compounds synthesized by suspension polymerization method or spherical high molecular compounds obtained by spray drying or dispersion method are also usable.

The average primary particle size of the fine particles is preferably from 0.001 to 20 μm, more preferably from 0.001 to 10 μm, still more preferably from 0.002 to 1 μm, even more preferably from 0.005 to 0.5 μm from the standpoint of minimizing the haze of the resulting film. The average primary particle size of the fine particles can be determined by observation under a transmission electron microscope. Since fine particles just purchased are often agglomerated, they are preferably dispersed in a known manner before use. The secondary particle size is adjusted by dispersion to preferably from 0.2 to 1.5 μm, more preferably from 0.3 to 1 μm. The fine particles are added in an amount of preferably from 0.01 to 0.3 part by mass, more preferably from 0.05 to 0.2 part by mass, even more preferably from 0.08 to 0.12 part by mass, based on 100 parts by mass of the cyclic polyolefin resin.

Dispersed particles has an increased haze and reduced transparency so that their average particle size is preferably from 0.001 to 100 μm, more preferably from 0.01 to 10 μm, still more preferably from 0.01 to 5 μm.

The content of the fine particles in the film is preferably from 0.0001 to 10 mass %, more preferably from 0.001 to 5 mass %, still more preferably from 0.01 to 3 mass %, irrespective of whether the particles are dispersed in spherical or amorphous particle form or in molecular form.

In the invention, the film has a light transmittance of preferably 88.0% or greater, more preferably 89.0% or greater, even more preferably 90.0% or greater. The transmittance is measured using a 13 mm×40 mm specimen at 25° C. and 60% RH with a spectrophotometer ("U-3210", trade name; product of Hitachi) at a wavelength of 550 nm.

Although no particular limitation is imposed on the method of incorporating the compound into the film, examples of it include a method of casting a solution of a film forming material containing the compound, thereby forming a film; a method of applying a coating solution containing the compound to a film obtained by casting; and a multilayer casting method. In the invention, a film is obtained by either of the following two production processes.

1. A production process of a film including the steps of dissolving or dispersing the cyclic polyolefin resin B, the polymer A, and at least one of the above-described compounds in a solvent, casting the resulting solution or dispersion, drying the film obtained by casting, and taking up the dried film.
2. A production process of a film including the steps of dissolving the cyclic polyolefin resin B and the polymer A in a solvent, casting the resulting solution, drying the film obtained by casting, and taking up the film, which further includes a step of applying a coating solution containing at least one of the above-described compounds onto at least one side of the film obtained by casting.

A film excellent in flatness, uniformity, and the like and suited as an optical film can be obtained by employing either of these two processes.

According to the process 1, the solution (film forming material solution) containing the cyclic polyolefin resin B, the polymer A, and the above-described compound is cast into a film. In this process, the compound may be dissolved or dispersed at the time of preparing the film forming material solution, or a solution or dispersion of the compound may be added immediately before casting of the film forming material solution. The dispersion can be prepared in a known manner using an ordinarily-employed stirrer, high-speed stirrer for homogenizer, a disperser using media such as a ball mill, a paint shaker, or Dynomill, or an ultrasonic disperser. In dispersing the above-described compound in the film forming material solution, a small amount of a surfactant or a polymer commonly used as a dispersing aid may be added.

In the process 2, no limitation is imposed on the coating solution insofar as it contains the compound as a principal component. A solution or dispersion of the compound in an appropriate solvent may be applied simply as a coating solution onto a layer (that is, a film obtained by casting) composed mainly of the cyclic polyolefin resin B and the polymer A. The coating solution may contain a binder and by applying the resulting coating solution, a layer containing the compound may be formed.

The coating solution may be applied to either side or both sides of the layer composed mainly of the cyclic polyolefin resin B and the polymer A.

No particlar limitation is imposed on the binder for forming the layer of the compound and it may be either a lipophilic or hydrophilic binder. Examples of a lipophilic binder include known thermoplastic resins, thermosetting resins, radiation curable resins, and reactive resins, and mixtures thereof.

These resins have a Tg of preferably from 80 to 400° C., more preferably from 120 to 350° C. They have a mass average molecular weight of preferably from 10,000 to 1,000,000, more preferably from 10,000 to 500,000. When the compound is dispersed in the coating solution, a similar dispersing method to that used in the process 1 can be used. A small amount of a surfactant or a polymer commonly used as a dispersing aid may be added.

Examples of the thermoplastic resins include vinyl copolymers such as vinyl chloride/vinyl acetate copolymer, copolymers of vinyl chloride, vinyl acetate, vinyl alcohol, and maleic acid and/or acrylic acid, vinyl chloride/vinylidene chloride copolymer, vinyl chloride/acrylonitrile copolymer, and ethylene/vinyl acetate copolymer, cellulose derivatives such as nitrocellulose, cellulose acetate propionate, and cellulose acetate butyrate resin, cyclic polyolefin resins, acrylic resins, polyvinyl acetal resins, polyvinyl butyral resins, polyester polyurethane resins, polyether polyurethane resins, polycarbonate polyurethane resins, polyester resins, polyether resins, polyamide resins, amino resins, rubber resins such as styrene-butadiene resins and butadiene acrylonitrile resins, silicone resins, and fluororesins.

The thickness of the layer containing the compound is adjusted to preferably from 0.0001 to 10 μm, more preferably from 0.001 to 5 μm, still more preferably from 0.01 to 1 μm. The production process of the film of the invention will be described later in further detail.

The film of the invention may contain an Rth raising agent. The Rth raising agent is preferably selected from compounds represented by the following formulas (II), (III), (IV), and (V).

The compounds represented by the formula (II) will next be described. Formula (II):

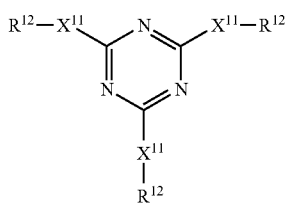

In the formula (II), $R^{12}$s each independently represents an aromatic ring or a heterocycle having a substituent at least any of ortho-, meta- and para-positions.

$X^{11}$s each independently represents a single bond or —$NR^{13}$—, in which $R^{13}$s each independently represents a hydrogen atom, a substituted or unsubstituted alkyl group, an alkenyl group, an aryl group, or a heterocyclic group.

The aromatic ring represented by $R^{12}$ is preferably phenyl or naphthyl, with phenyl being more preferred. The aromatic ring represented by $R^{12}$ may have at least one substituent at any substituting position. Examples of the substituent include halogen atoms, hydroxyl group, cyano group, nitro group, carboxyl group, alkyl groups, alkenyl groups, aryl groups, alkoxy groups, alkenyloxy groups, aryloxy groups, acyloxy groups, alkoxycarbonyl groups, alkenyloxycarbony groups, aryloxycarbonyl groups, sulfamoyl groups, alkyl-substituted sulfamoyl groups, alkenyl-substituted sulfamoyl groups, aryl-substituted sulfamoyl groups, sulfonamide groups, carbamoyl groups, alkyl-substituted carbamoyl groups, alkenyl-substituted carbamoyl groups, aryl-substituted carbamoyl groups, amide groups, alkylthio groups, alkenylthio groups, arylthio groups, and acyl groups.

The heterocyclic group represented by $R^{12}$ preferably has an aromatic property. A heterocycle having an aromatic property is usually an unsaturated heterocycle, preferably a heterocycle having the largest number of double bonds. The heterocycle is preferably a 5-, 6- or 7-membered ring, more preferably a 5- or 6-membered ring, even more preferably, a 6-membered ring. The heterocycle has, as the hetero atom thereof, preferably a nitrogen atom, a sulfur atom, or an oxygen atom, more preferably, a nitrogen atom. As the heterocycle having an aromatic property, a pyridine ring (2-pyridyl or 4-pyridyl as a heterocyclic group) is particularly preferred. The heterocyclic group may have a substituent. Examples of the substituent for the heterocyclic group are similar to those for the above-described aryl moiety.

The heterocyclic group when $X^{11}$ represents a single bond has preferably a free valence on the nitrogen atom. The heterocyclic group having a free valence on the nitrogen atom is preferably a 5-, 6- or 7-membered ring, more preferably a 5- or 6-membered ring, even more preferably, a 5-membered ring. The heterocyclic group may have a plurality of nitrogen atoms. The heterocyclic group may also have a hetero atom (such as O or S) other than a nitrogen atom. Examples of the heterocyclic group having a free valence on the nitrogen atom are shown below.

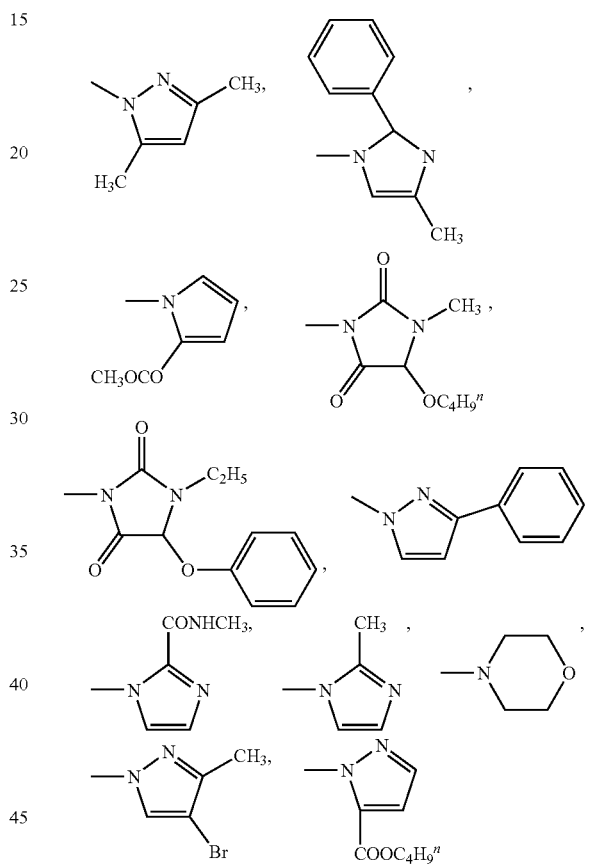

In the formula (II), $X^{11}$ represents a single bond or —$NR^{13}$—. $R^{13}$s independently represents a hydrogen atom, a substituted or unsubstituted alkyl group, an alkenyl group, an aryl group, or a heterocyclic group.

Although the alkyl group represented by $R^{13}$ may be either a cyclic alkyl group or a chain alkyl group, a chain alkyl group is preferred and a straight-chain alkyl group is more preferred over a branched-chain alkyl group. The number of carbon atoms of the alkyl group is preferably from 1 to 30, more preferably from 1 to 20, still more preferably from 1 to 10, even more preferably from 1 to 8, most preferably from 1 to 6. The alkyl group may have a substituent. Examples of the substituent include halogen atoms, alkoxy groups (such as methoxy and ethoxy) and acyloxy groups (such as acryloyloxy and methacryloyloxy).

Although the alkenyl group represented by $R^{13}$ may be either a cyclic alkenyl group or a chain alkenyl group, a chain alkenyl group is preferred and a straight-chain alkenyl group is more preferred over a branched-chain alkenyl group. The number of carbon atoms of the alkenyl group is preferably from 2 to 30, more preferably from 2 to 20, still more preferably from 2 to 10, even more preferably from 2 to 8, most preferably from 2 to 6. The alkenyl group may have a substituent. Examples of the substituent are similar to those of the alkyl group.

The aromatic ring group and heterocyclic group represented by $R^{13}$ are similar to the aromatic ring and heterocycle represented by $R^{12}$ and preferred ranges thereof are also similar. The aromatic ring group and the heterocyclic group may further have a substituent and examples of the substituent are similar to those for the aromatic ring and the heterocycle represented by $R^{12}$.

Specific examples of the retardation raising agent used in the invention and represented by the formula (II) will next be described. A plurality of Rs in the same structural formula of each exemplified compound means the same group. The formula is followed by definition for R and specific example number.

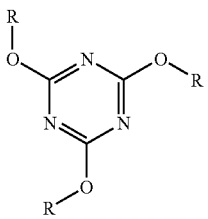

II-(1)~(66)

II-(1) phenyl
II-(2) 3-ethoxycarbonylphenyl
II-(3) 3-butoxyphenyl
II-(4) m-biphenylyl
II-(5) 3-phenylthiophenyl
II-(6) 3-chlorophenyl
II-(7) 3-benzoylphenyl
II-(8) 3-acetoxyphenyl
II-(9) 3-benzoyloxyphenyl
II-(10) 3-phenoxycarbonylphenyl
II-(11) 3-methoxyphenyl
II-(12) 3-anilinophenyl
II-(13) 3-isobutyrylaminophenyl
II-(14) 3-phenoxycarbonylaminophenyl
II-(15) 3-(3-ethylureido)phenyl
II-(16) 3-(3,3-diethylureido)phenyl
II-(17) 3-methylphenyl
II-(18) 3-phenoxyphenyl
II-(19) 3-hydroxyphenyl
II-(20) 4-ethoxycarbonylphenyl
II-(21) 4-butoxyphenyl
II-(22) p-biphenylyl
II-(23) 4-phenylthiophenyl
II-(24) 4-chlorophenyl
II-(25) 4-benzoylphenyl
II-(26) 4-acetoxyphenyl
II-(27) 4-benzoyloxyphenyl
II-(28) 4-phenoxycarbonylphenyl
II-(29) 4-methoxyphenyl
II-(30) 4-anilinophenyl
II-(31) 4-isobutyrylaminophenyl
II-(32) 4-phenoxycarbonylaminophenyl
II-(33) 4-(3-ethylureido)phenyl
II-(34) 4-(3,3-diethylureido)phenyl
II-(35) 4-methylphenyl
II-(36) 4-phenoxyphenyl
II-(37) 4-hydroxyphenyl
II-(38) 3,4-diethoxycarbonylphenyl
II-(39) 3,4-dibutoxyphenyl
II-(40) 3,4-diphenylphenyl
II-(41) 3,4-diphenylthiophenyl
II-(42) 3,4-dichlorophenyl
II-(43) 3,4-dibenzoylphenyl
II-(44) 3,4-diacetoxyphenyl
II-(45) 3,4-dibenzoyloxyphenyl
II-(46) 3,4-diphenoxycarbonylphenyl
II-(47) 3,4-dimethoxyphenyl
II-(48) 3,4-dianilinophenyl
II-(49) 3,4-dimethylphenyl
II-(50) 3,4-diphenoxyphenyl
II-(51) 3,4-dihydroxyphenyl
II-(52) 2-naphthyl
II-(53) 3,4,5-triethoxycarbonylphenyl
II-(54) 3,4,5-tributoxyphenyl
II-(55) 3,4,5-triphenylphenyl
II-(56) 3,4,5-triphenylthiophenyl
II-(57) 3,4,5-trichlorophenyl
II-(58) 3,4,5-tribenzoylphenyl
II-(59) 3,4,5-triacetoxyphenyl
II-(60) 3,4,5-tribenzoyloxyphenyl
II-(61) 3,4,5-triphenoxycarbonylphenyl
II-(62) 3,4,5-trimethoxyphenyl
II-(63) 3,4,5-trianilinophenyl
II-(64) 3,4,5-trimethylphenyl
II-(65) 3,4,5-triphenoxyphenyl
II-(66) 3,4,5-trihydroxyphenyl

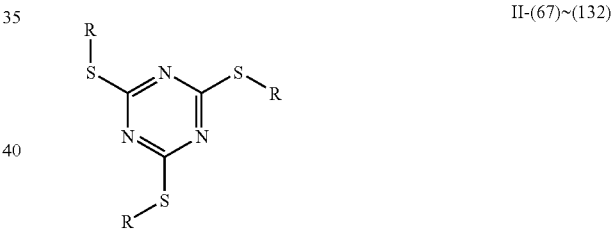

II-(67)~(132)

II-(67) phenyl
II-(68) 3-ethoxycarbonylphenyl
II-(69) 3-butoxyphenyl
II-(70) m-biphenylyl
II-(71) 3-phenylthiophenyl
II-(72) 3-chlorophenyl
II-(73) 3-benzoylphenyl
II-(74) 3-acetoxyphenyl
II-(75) 3-benzoyloxyphenyl
II-(76) 3-phenoxycarbonylphenyl
II-(77) 3-methoxyphenyl
II-(78) 3-anilinophenyl
II-(79) 3-isobutyrylaminophenyl
II-(80) 3-phenoxycarbonylaminophenyl
II-(81) 3-(3-ethylureido)phenyl
II-(82) 3-(3,3-diethylureido)phenyl
II-(83) 3-methylphenyl
II-(84) 3-phenoxyphenyl
II-(85) 3-hydroxyphenyl
II-(86) 4-ethoxycarbonylphenyl
II-(87) 4-butoxyphenyl
II-(88) p-biphenylyl
II-(89) 4-phenylthiophenyl II-(90) 4-chlorophenyl
II-(91) 4-benzoylphenyl
II-(92) 4-acetoxyphenyl
II-(93) 4-benzoyloxyphenyl
II-(94) 4-phenoxycarbonylphenyl
II-(95) 4-methoxyphenyl
II-(96) 4-anilinophenyl
II-(97) 4-isobutyrylaminophenyl
II-(98) 4-phenoxycarbonylaminophenyl
II-(99) 4-(3-ethylureido)phenyl
II-(100) 4-(3,3-diethylureido)phenyl
II-(101) 4-methylphenyl
II-(102) 4-phenoxyphenyl
II-(103) 4-hydroxyphenyl
II-(104) 3,4-diethoxycarbonylphenyl
II-(105) 3,4-dibutoxyphenyl
II-(106) 3,4-diphenylphenyl
II-(107) 3,4-diphenylthiophenyl
II-(108) 3,4-dichlorophenyl
II-(109) 3,4-dibenzoylphenyl
II-(110) 3,4-diacetoxyphenyl
II-(111) 3,4-dibenzoyloxyphenyl
II-(112) 3,4-diphenoxycarbonylphenyl
II-(113) 3,4-dimethoxyphenyl
II-(114) 3,4-dianilinophenyl
II-(115) 3,4-dimethylphenyl
II-(116) 3,4-diphenoxyphenyl
II-(117) 3,4-dihydroxyphenyl
II-(118) 2-naphthyl
II-(119) 3,4,5-triethoxycarbonylphenyl
II-(120) 3,4,5-tributoxyphenyl
II-(121) 3,4,5-triphenylphenyl
II-(122) 3,4,5-triphenylthiophenyl
II-(123) 3,4,5-trichlorophenyl
II-(124) 3,4,5-tribenzoylphenyl
II-(125) 3,4,5-triacetoxyphenyl
II-(126) 3,4,5-tribenzoyloxyphenyl
II-(127) 3,4,5-triphenoxycarbonylphenyl
II-(128) 3,4,5-trimethoxyphenyl
II-(129) 3,4,5-trianilinophenyl
II-(130) 3,4,5-trimethylphenyl
II-(131) 3,4,5-triphenoxyphenyl
II-(132) 3,4,5-trihydroxyphenyl

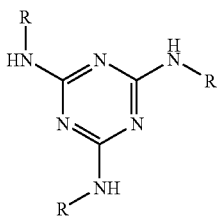

II-(133)~(330)

II-(133) phenyl
II-(134) 4-butylphenyl
II-(135) 4-(2-methoxy-2-ethoxyethyl)phenyl
II-(136) 4-(5-nonenyl)phenyl
II-(137) p-biphenylyl
II-(138) 4-ethoxycarbonylphenyl
II-(139) 4-butoxyphenyl
II-(140) 4-methylphenyl
II-(141) 4-chlorophenyl
II-(142) 4-phenylthiophenyl
II-(143) 4-benzoylphenyl
II-(144) 4-acetoxyphenyl
II-(145) 4-benzoyloxyphenyl
II-(146) 4-phenoxycarbonylphenyl
II-(147) 4-methoxyphenyl
II-(148) 4-anilinophenyl
II-(149) 4-isobutyrylaminophenyl
II-(150) 4-phenoxycarbonylaminophenyl
II-(151) 4-(3-ethylureido)phenyl
II-(152) 4-(3,3-diethylureido)phenyl
II-(153) 4-phenoxyphenyl
II-(154) 4-hydroxyphenyl
II-(155) 3-butylphenyl
II-(156) 3-(2-methoxy-2-ethoxyethyl)phenyl
II-(157) 3-(5-nonenyl)phenyl
II-(158) m-biphenylyl
II-(159) 3-ethoxycarbonylphenyl
II-(160) 3-butoxyphenyl
II-(161) 3-methylphenyl
II-(162) 3-chlorophenyl
II-(163) 3-phenylthiophenyl
II-(164) 3-benzoylphenyl
II-(165) 3-acetoxyphenyl
II-(166) 3-benzoyloxyphenyl
II-(167) 3-phenoxycarbonylphenyl
II-(168) 3-methoxyphenyl
II-(169) 3-anilinophenyl
II-(170) 3-isobutyrylaminophenyl
II-(171) 3-phenoxycarbonylaminophenyl
II-(172) 3-(3-ethylureido)phenyl
II-(173) 3-(3,3-diethylureido)phenyl
II-(174) 3-phenoxyphenyl
II-(175) 3-hydroxyphenyl
II-(176) 2-butylphenyl
II-(177) 2-(2-methoxy-2-ethoxyethyl)phenyl
II-(178) 2-(5-nonenyl)phenyl
II-(179) o-biphenylyl
II-(180) 2-ethoxycarbonylphenyl
II-(181) 2-butoxyphenyl
II-(182) 2-methylphenyl
II-(183) 2-chlorophenyl
II-(184) 2-phenylthiophenyl
II-(185) 2-benzoylphenyl
II-(186) 2-acetoxyphenyl
II-(187) 2-benzoyloxyphenyl
II-(188) 2-phenoxycarbonylphenyl
II-(189) 2-methoxyphenyl
II-(190) 2-anilinophenyl
II-(191) 2-isobutyrylaminophenyl
II-(192) 2-phenoxycarbonylaminophenyl
II-(193) 2-(3-ethylureido)phenyl
II-(194) 2-(3,3-diethylureido)phenyl
II-(195) 2-phenoxyphenyl
II-(196) 2-hydroxyphenyl
II-(197) 3,4-dibutylphenyl
II-(198) 3,4-di(2-methoxy-2-ethoxyethyl)phenyl
II-(199) 3,4-diphenylphenyl,
II-(200) 3,4-diethoxycarbonylphenyl
II-(201) 3,4-didodecyloxyphenyl
II-(202) 3,4-dimethylphenyl
II-(203) 3,4-dichlorophenyl
II-(204) 3,4-dibenzoylphenyl
II-(205) 3,4-diacetoxyphenyl
II-(206) 3,4-dimethoxyphenyl
II-(207) 3,4-di-N-methylaminophenyl
II-(208) 3,4-diisobutyrylaminophenyl
II-(209) 3,4-diphenoxyphenyl
II-(210) 3,4-dihydroxyphenyl II-(211) 3,5-dibutylphenyl
II-(212) 3,5-di(2-methoxy-2-ethoxyethyl)phenyl
II-(213) 3,5-diphenylphenyl
II-(214) 3,5-diethoxycarbonylphenyl
II-(215) 3,5-didodecyloxyphenyl
II-(216) 3,5-dimethylphenyl
II-(217) 3,5-dichlorophenyl
II-(218) 3,5-dibenzoylphenyl
II-(219) 3,5-diacetoxyphenyl
II-(220) 3,5-dimethoxyphenyl
II-(221) 3,5-di-N-methylaminophenyl
II-(222) 3,5-diisobutyrylaminophenyl
II-(223) 3,5-diphenoxyphenyl
II-(224) 3,5-dihydroxyphenyl
II-(225) 2,4-dibutylphenyl
II-(226) 2,4-di(2-methoxy-2-ethoxyethyl)phenyl
II-(227) 2,4-diphenylphenyl
II-(228) 2,4-diethoxycarbonylphenyl
II-(229) 2,4-didodecyloxyphenyl
II-(230) 2,4-dimethylphenyl
II-(231) 2,4-dichlorophenyl
II-(232) 2,4-dibenzoylphenyl
II-(233) 2,4-diacetoxyphenyl
II-(234) 2,4-dimethoxyphenyl
II-(235) 2,4-di-N-methylaminophenyl
II-(236) 2,4-diisobutyrylaminophenyl
II-(237) 2,4-diphenoxyphenyl
II-(238) 2,4-dihydroxyphenyl
II-(239) 2,3-dibutylphenyl
II-(240) 2,3-di(2-methoxy-2-ethoxyethyl)phenyl
II-(241) 2,3-diphenylphenyl
II-(242) 2,3-diethoxycarbonylphenyl
II-(243) 2,3-didodecyloxyphenyl
II-(244) 2,3-dimethylphenyl
II-(245) 2,3-dichlorophenyl
II-(246) 2,3-dibenzoylphenyl
II-(247) 2,3-diacetoxyphenyl
II-(248) 2,3-dimethoxyphenyl
II-(249) 2,3-di-N-methylaminophenyl
II-(250) 2,3-diisobutyrylaminophenyl
II-(251) 2,3-diphenoxyphenyl
II-(252) 2,3-dihydroxyphenyl
II-(253) 2,6-dibutylphenyl
II-(254) 2,6-di(2-methoxy-2-ethoxyethyl)phenyl
II-(255) 2,6-diphenylphenyl
II-(256) 2,6-diethoxycarbonylphenyl
II-(257) 2,6-didodecyloxyphenyl
II-(258) 2,6-dimethylphenyl
II-(259) 2,6-dichlorophenyl
II-(260) 2,6-dibenzoylphenyl
II-(261) 2,6-diacetoxyphenyl
II-(262) 2,6-dimethoxyphenyl
II-(263) 2,6-di-N-methylaminophenyl
II-(264) 2,6-diisobutyrylaminophenyl
II-(265) 2,6-diphenoxyphenyl
II-(266) 2,6-dihydroxyphenyl
II-(267) 3,4,5-tributylphenyl
II-(268) 3,4,5-tri(2-methoxy-2-ethoxyethyl)phenyl
II-(269) 3,4,5-triphenylphenyl
II-(270) 3,4,5-triethoxycarbonylphenyl
II-(271) 3,4,5-tridodecyloxyphenyl
II-(272) 3,4,5-trimethylphenyl
II-(273) 3,4,5-trichlorophenyl
II-(274) 3,4,5-tribenzoylphenyl
II-(275) 3,4,5-triacetoxyphenyl
II-(276) 3,4,5-trimethoxyphenyl
II-(277) 3,4,5-tri-N-methylaminophenyl
II-(278) 3,4,5-triisobutyrylaminophenyl
II-(279) 3,4,5-triphenoxyphenyl
II-(280) 3,4,5-trihydroxyphenyl
II-(281) 2,4,6-tributylphenyl
II-(282) 2,4,6-tri(2-methoxy-2-ethoxyethyl)phenyl
II-(283) 2,4,6-triphenylphenyl
II-(284) 2,4,6-triethoxycarbonylphenyl
II-(285) 2,4,6-tridecyloxyphenyl
II-(286) 2,4,6-trimethylphenyl
II-(287) 2,4,6-trichlorophenyl
II-(288) 2,4,6-tribenzoylphenyl
II-(289) 2,4,6-triacetoxyphenyl
II-(290) 2,4,6-trimethoxyphenyl
II-(291) 2,4,6-tri-N-methylaminophenyl
II-(292) 2,4,6-triisobutyrylaminophenyl
II-(293) 2,4,6-triphenoxyphenyl
II-(294) 2,4,6-trihydroxyphenyl
II-(295) pentafluorophenyl
II-(296) pentachlorophenyl
II-(297) pentamethoxyphlenyl
II-(298) 6-N-methylsulfamoyl-8-methoxy-2-naphthyl
II-(299) 5-N-methylsulfamoyl-2-naphthyl
II-(300) 6-N-phenylsulfamoyl-2-naphthyl
II-(301) 5-ethoxy-7-N-methylsulfamoyl-2-naphthyl
II-(302) 3-methoxy-2-naphthyl
II-(303) 1-ethoxy-2-naphthyl
II-(304) 6-N-phenylsulfamoyl-8-methoxy-2-naphthyl
II-(305) 5-methoxy-7-N-phenylsulfamoyl-2-naphthyl
II-(306) 1-(4-methylphenyl)-2-naphthyl
II-(307) 6,8-di-N-methylsulfamoyl-2-naphthyl
II-(308) 6-N-2-acetoxyethylsulfamoyl-8-methoxy-2-naphthyl
II-(309) 5-acetoxy-7-N-phenylsulfamoyl-2-naphthyl
II-(310) 3-benzoyloxy-2-naphthyl
II-(311) 5-acetylamino-1-naphthyl
II-(312) 2-methoxy-1-naphthyl
II-(313) 4-phenoxy-1-naphthyl
II-(314) 5-N-methylsulfamoyl-1-naphthyl
II-(315) 3-N-methylcarbamoyl-4-hydroxy-1-naphthyl
II-(316) 5-methoxy-6-N-ethylsulfamoyl-1-naphthyl
II-(317) 7-tetradecyloxy-1-naphthyl
II-(318) 4-(4-methylphenoxy)-1-naphthyl
II-(319) 6-N-methylsulfamoyl-1-naphthyl
II-(320) 3-N,N-dimethylcarbamoyl-4-methoxy-1-naphthyl
II-(321) 5-methoxy-6-N-benzylsulfamoyl-1-naphthyl
II-(322) 3,6-di-N-phenylsulfamoyl-1-naphthyl
II-(323) methyl
II-(324) ethyl
II-(325) butyl
II-(326) octyl
II-(327) dodecyl
II-(328) 2-butoxy-2-ethoxyethyl
II-(329) benzyl
II-(330) 4-methoxybenzyl

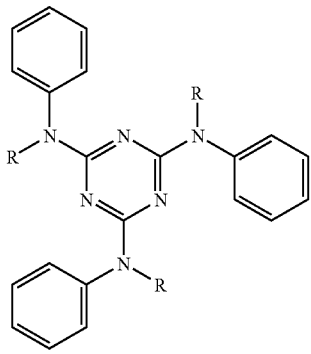

II-(331)~(333)

II-(331) methyl
II-(332) phenyl
II-(333) butyl
II-(334) a compound of the following chemical formula

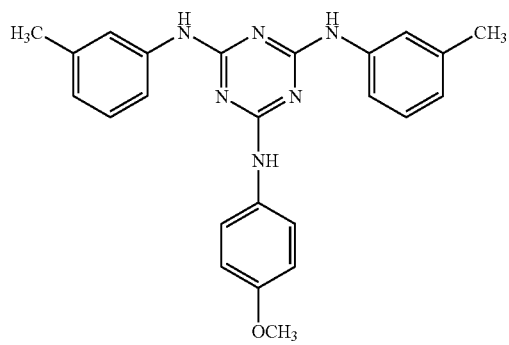

The compound represented by the formula (III) will next be described. Formula (III)

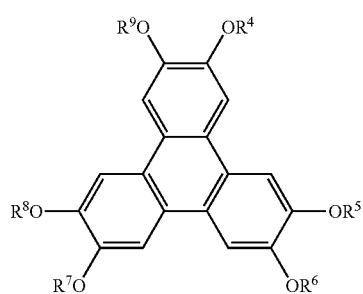

In the formula, $R^4$, $R^5$, $R^6$, $R^7$, $R^8$ and $R^9$ each independently represents a hydrogen atom or a substituent.

Examples of the substituent represented by $R^4$, $R^5$, $R^6$, $R^7$, $R^8$, or $R^9$ include alkyl groups (having preferably from 1 to 40, more preferably from 1 to 30, even more preferably from 1 to 20 carbon atoms, such as methyl, ethyl, isopropyl, tert-butyl, n-octyl, n-decyl, n-hexadecyl, cyclopropyl, cyclopentyl, and cyclohexyl), alkenyl groups (having preferably from 2 to 40, more preferably from 2 to 30, even more preferably from 2 to 20 carbon atoms, such as vinyl, allyl, 2-butenyl, and 3-pentenyl), alkynyl groups (having preferably from 2 to 40, more preferably from 2 to 30, even more preferably from 2 to 20 carbon atoms, such as propargyl and 3-pentynyl), aryl groups (having preferably from 6 to 30, more preferably from 6 to 20, even more preferably from 6 to 12 carbon atoms, such as phenyl, p-methylphenyl, and naphthyl), substituted or unsubstituted amino groups (having preferably from 0 to 40, more preferably from 0 to 30, even more preferably from 0 to 20 carbon atoms, such as unsubstituted amino, methylamino, dimethylamino, diethylamino, and anilino), alkoxy groups (having preferably from 1 to 40, more preferably from 1 to 30, even more preferably from 1 to 20 carbon atoms, such as methoxy, ethoxy and butoxy), aryloxy groups (having preferably from 6 to 40, more preferably from 6 to 30, even more preferably from 6 to 20 carbon atoms, such as phenyloxy and 2-naphthyloxy), acyl groups (having preferably from 1 to 40, more preferably from 1 to 30, even more preferably from 1 to 20 carbon atoms, such as acetyl, benzoyl, formyl, and pivaloyl), alkoxycarbonyl groups (having preferably from 2 to 40, more preferably from 2 to 30, even more preferably from 2 to 20 carbon atoms, such as methoxycarbonyl and ethoxycarbonyl), aryloxycarbonyl groups (having preferably from 7 to 40, more preferably from 7 to 30, even more preferably from 7 to 20 carbon atoms, such as phenyloxycarbonyl), acyloxy groups (having preferably from 2 to 40, more preferably from 2 to 30, even more preferably from 2 to 20 carbon atoms, such as acetoxy and benzoyloxy), acylamino groups (having preferably from 2 to 40, more preferably from 2 to 30, even more preferably from 2 to 20 carbon atoms, such as acetylamino and benzoylamino), alkoxycarbonylamino groups (having preferably from 2 to 40, more preferably from 2 to 30, even more preferably from 2 to 20 carbon atoms, such as methoxycarbonylamino), aryloxycarbonylamino groups (having preferably from 7 to 40, more preferably from 7 to 30, even more preferably from 7 to 20 carbon atoms, such as phenyloxycarbonylamino), sulfonylamino groups (having preferably from 1 to 40, more preferably from 1 to 30, even more preferably from 1 to 20 carbon atoms, such as methanesulfonylamino and benzenesulfonylamino), sulfamoyl groups (having preferably from 0 to 40, more preferably from 0 to 30, even more preferably from 0 to 20 carbon atoms, such as sulfamoyl, methylsulfamoyl, dimethylsulfamoyl, and phenylsulfamoyl), carbamoyl groups (having preferably from 1 to 40, more preferably from 1 to 30, even more preferably from 1 to 20 carbon atoms, such as unsubstituted carbamoyl, methylcarbamoyl, diethylcarbamoyl, and phenylcarbamoyl), alkylthio groups (having preferably from 1 to 40, more preferably from 1 to 30, even more preferably from 1 to 20 carbon atoms, such as phenylthio), sulfonyl groups (having preferably from 1 to 40, more preferably from 1 to 30, even more preferably from 1 to 20 carbon atoms, such as mesyl and tosyl), sulfinyl groups (having preferably from 1 to 40, more preferably from 1 to 30, even more preferably from 1 to 20 carbon atoms, such as methanesulfinyl and benzenesulfinyl), ureido groups (having preferably from 1 to 40, more preferably from 1 to 30, even more preferably from 1 to 20 carbon atoms, such as unsubstituted ureido, methylureido, and phenylureido), phosphoric acid amide groups (having preferably from 1 to 40, more preferably from 1 to 30, even more preferably from 1 to 20 carbon atoms, such as diethylphosphoric acid amide and phenylphosphoric acid amide), hydroxyl group, mercapto group, halogen atoms (such as fluorine, chlorine, bromine, and iodine), cyano group, sulfo group, carboxyl group, nitro group, hydroxamic acid group, sulfino group, hydrazine group, imino group, heterocyclic groups (having preferably from 1 to 30, more preferably from 1 to 12 carbon atoms, such as heterocyclic groups having a hetero atom such as nitrogen, oxygen, or sulfur and examples of the group include imidazolyl, pyridyl, quinolyl, furyl, piperidyl, morpholino, benzoxazolyl, benzimidazolyl, benzthiazolyl, and 1,3,5-triazyl) and silyl groups (having preferably from 3 to 40, more preferably from 3 to 30, even more preferably from 3 to 24 carbon atoms, such as trimethylsilyl and triphenylsilyl). These substituents may each be substituted further. When they have two or more substituents, these substituents may be same or different. If possible, they may be coupled to each other to form a ring.

Preferred examples of the substituent represented by $R^4$, $R^5$, $R^6$, $R^7$, $R^8$, or $R^9$ include alkyl groups, aryl groups, substituted or unsubstituted amino groups, alkoxy groups, alkylthio groups, and halogen atoms.

Specific examples of the compound represented by the formula (III) will next be described, but the invention is not limited by them.

III-1
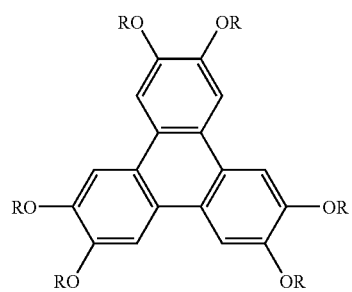
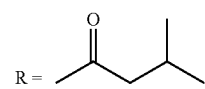

III-2
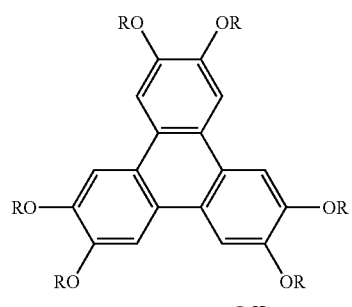
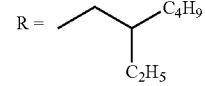

III-3
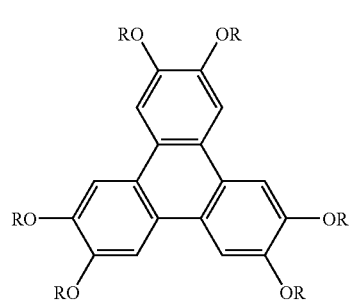
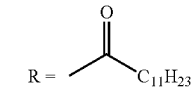

III-4
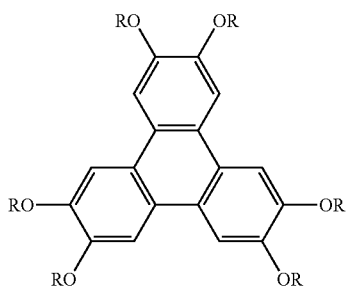

III-5
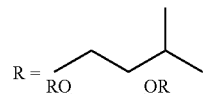
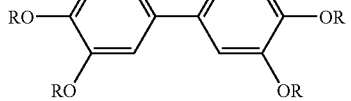
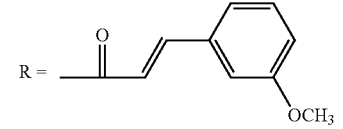

III-6
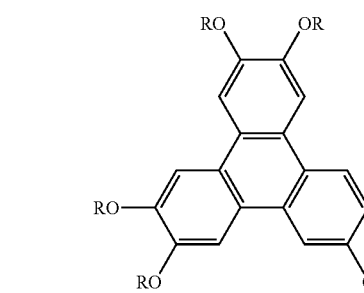
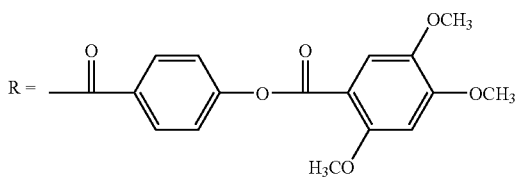

III-7
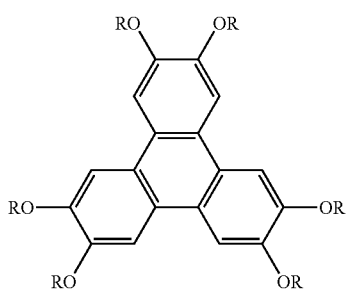
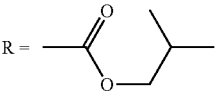

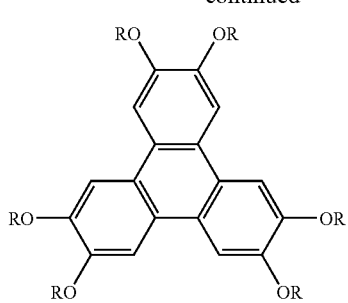

III-8

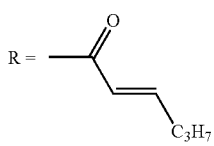

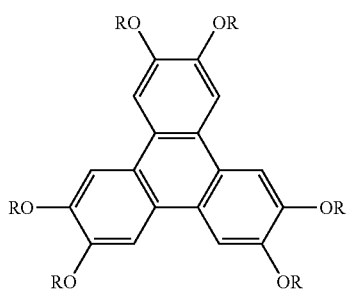

III-9

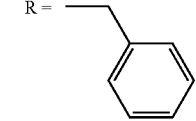

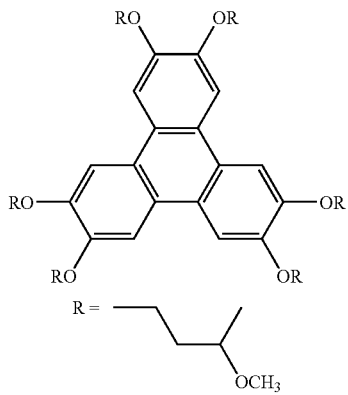

III-10

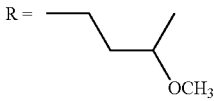

The compounds represented by the formula (IV) will next be described.

$$Q^{71}\text{-}Q^{72}\text{-OH} \qquad \text{Formula (IV)}$$

(wherein, $Q^{71}$ represents a nitrogen-containing aromatic heterocycle and $Q^{72}$ represents an aromatic ring.)

In the formula (IV), $Q^{71}$ represents a nitrogen-containing aromatic heterocycle, preferably a 5- to 7-membered nitrogen-containing aromatic heterocycle, more preferably a 5- to 6-membered nitrogen-containing aromatic heterocycle.

Preferred examples of the nitrogen-containing aromatic heterocycle include rings such as imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, and tetrazaindene, of which triazine and 5-membered nitrogen-containing aromatic heterocycles are more preferred. Specific examples include rings such as 1,3,5-triazine, imidazole, pyrazole, triazole, tetrazole, thiazole, oxazole, benzotriazole, benzothiazole, benzoxazole, thiadiazole, and oxadiazole, with 1,3,5-triazine ring and benzotriazine ring being even more preferred.

The nitrogen-containing aromatic heterocycle represented by $Q^{71}$ may have a substituent further and it may have, as the substituent, the substituent T which will be described later. When the heterocycle has a plurality of substituents, the substituents may be fused to form a ring.

$Q^{72}$ represents an aromatic ring. The aromatic ring represented by $Q^{72}$ may be either an aromatic hydrocarbon ring or an aromatic heterocycle. It may be a monocycle or may form a fused ring with another ring. The aromatic hydrocarbon ring is preferably a monocyclic or dicyclic aromatic hydrocarbon ring having from 6 to 30 carbon atoms (such as benzene ring and naphthalene ring), more preferably an aromatic hydrocarbon ring having from 6 to 20 carbon atoms, still more preferably an aromatic hydrocarbon ring having from 6 to 12 carbon atoms, even more preferably a benzene ring.

The aromatic heterocycle is preferably an aromatic heterocycle containing a nitrogen atom or sulfur atom. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole, and tetrazaindene. Preferred aromatic heterocycles include pyridine, triazine and quinoline.

The aromatic ring represented by $Q^{72}$ is preferably an aromatic hydrocarbon ring, more preferably a naphthalene ring or a benzene ring, even more preferably a benzene ring. $Q^{72}$ may have a substituent fruther and it has, as the substituent, preferably the substituent T described below.

Examples of the substituent T include alkyl groups (having preferably from 1 to 20, more preferably from 1 to 12, even more preferably from 1 to 8 carbon atoms, such as methyl, ethyl, isopropyl, t-butyl, n-octyl, n-decyl, n-hexadecyl, cyclopropyl, cyclopentyl, and cyclohexyl), alkenyl groups (having preferably gtom 2 to 20, more preferably from 2 to 12, even more preferably from 2 to 8 carbon atoms, such as vinyl, allyl, 2-butenyl, and 3-pentenyl), alkynyl groups (having preferably from 2 to 20, more preferably from 2 to 12, even more preferably from 2 to 8 carbon atoms, such as propargyl and 3-pentynyl), aryl groups (having preferably from 6 to 30, more preferably from 6 to 20, even more preferably from 6 to 12 carbon atoms, such as phenyl, biphenyl, and naphthyl), amino groups (having preferably from 0 to 20, more preferably from 0 to 10, even more preferably, from 0 to 6 carbon atoms, such as amino, methylamino, dimethylamino, diethylamino, and dibenzylamino), alkoxy groups (having preferably from 1 to 20, more preferably from 1 to 12, even more preferably from 1 to 8 carbon atoms, such as methoxy, ethoxy, and butoxy), aryloxy groups (having preferably from 6 to 20, more preferably from 6 to 16, even more preferably from 6 to 12 carbon atoms, such as phenyloxy and 2-naphthyloxy), acyl groups (having preferably from 1 to 20, more preferably from 1 to 16, even more preferably from 1 to 12 carbon atoms, such as acetyl, benzoyl, formyl, and pivaloyl), alkoxycarbonyl groups (having preferably from 2 to 20, more preferably from 2 to 16, even more preferably from 2 to 12 carbon atoms, such as methoxycarbonyl and ethoxycarbonyl), aryloxycarbonyl groups (having preferably from 7 to 20, more preferably from 7 to 16, even more preferably from 7 to 10 carbon atoms, such as phenyloxycarbonyl), acyloxy groups (having preferably from 2 to 20, more preferably from 2 to 16, even more preferably from 2 to 10 carbon atoms, such as acetoxy and benzoyloxy), acylamino groups (having preferably from 2 to 20, more preferably from 2 to 16, even more preferably from 2 to 10 carbon atoms, such as acetylamino and benzoylamino), alkoxycarbonylamino groups (having preferably from 2 to 20, more preferably from 2 to 16, even more preferably from 2 to 12 carbon atoms, such as methoxycarbonylamino), aryloxycarbonylamino groups (having preferably from 7 to 20, more preferably from 7 to 16, even more preferably from 7 to 12 carbon atoms, such as phenyloxycarbonylamino), sulfonylamino groups (having preferably from 1 to 20, more preferably from 1 to 16, even more preferably from 1 to 12 carbon atoms, such as methanesulfonylamino and benzenesulfonylamino), sulfamoyl groups (having preferably from 0 to 20, more preferably from 0 to 16, even more preferably from 0 to 12 carbon atoms, such as sulfamoyl, methylsulfamoyl, dimethylsulfamoyl, and phenylsulfamoyl), carbamoyl groups (having preferably from 1 to 20, more preferably from 1 to 16, even more preferably from 1 to 12 carbon atoms, such as carbamoyl, methylcarbamoyl, diethylcarbamoyl, and phenylcarbamoyl), alkylthio groups (having preferably from 1 to 20, more preferably from 1 to 16, even more preferably from 1 to 12 carbon atoms, such as methylthio and ethylthio), arylthio groups (having preferably from 6 to 20, more preferably from 6 to 16, even more preferably from 6 to 12 carbon atoms, such as phenylthio), sulfonyl groups (having preferably from 1 to 20, more preferably from 1 to 16, even more preferably from 1 to 12 carbon atoms, such as mesyl and tosyl), sulfinyl groups (having preferably from 1 to 20, more preferably from 1 to 16, even more preferably from 1 to 12 carbon atoms, such as methanesulfiny and benzenesulfinyl), ureido groups (having preferably from 1 to 20, more preferably from 1 to 16, even more preferably from 1 to 12 carbon atoms, such as ureido, methylureido, and phenylureido), phosphoric acid amide groups (having preferably from 1 to 20, more preferably from 1 to 16, even more preferably from 1 to 12 carbon atoms, such as diethylphosphoric acid amide and phenylphosphoric acid amide), hydroxyl group, mercapto group, halogen atoms (such as fluorine, chlorine, bromine, and iodine), cyano group, sulfo group, carboxyl group, nitro group, hydroxamic acid group, sulfino group, hydrazino group, imino group, heterocyclic groups (having preferably from 1 to 30, more preferably from 1 to 12 carbon atoms; having, as the hetero atom, a nitrogen atom, an oxygen atom, or a sulfur atom; and specifically, an imidazolyl group, a pyridyl group, a quinolyl group, a furyl group, a piperidyl group, a morpholino group, a benzoxazolyl group, a benzimidazolyl group, and a benzthiazolyl group), and silyl groups (having preferably from 3 to 40, more preferably from 3 to 30, even more preferably from 3 to 24 carbon atoms, such as trimethylsilyl and triphenylsilyl).

These substituents may be substituted further. When they have two or more substituents, these substituents may be the same or different. If possible, they may be coupled to each other to form a ring.

Specific examples of the compound represented by the formula (IV) are shown below, but the invention is not limited thereby.

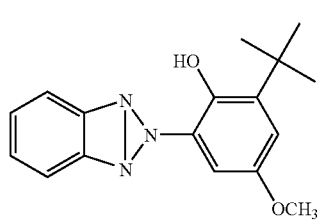

(IV-1)

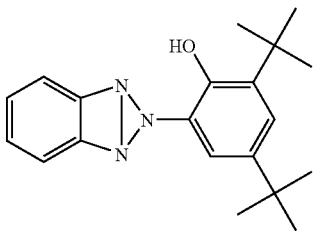

(IV-2)

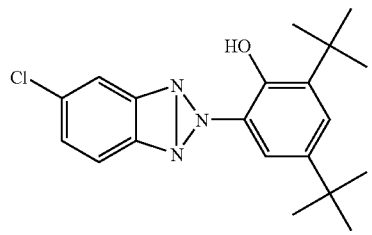

(IV-3)

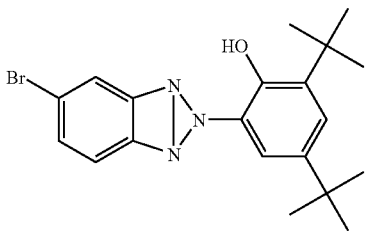

(IV-4)

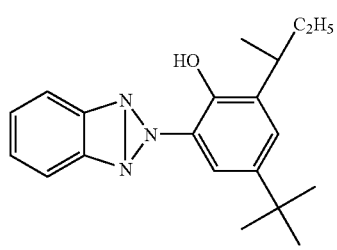

(IV-5)

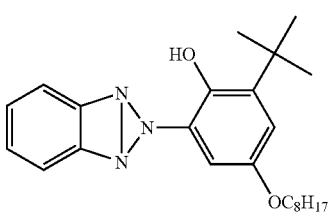

(IV-6)

-continued
(IV-7)
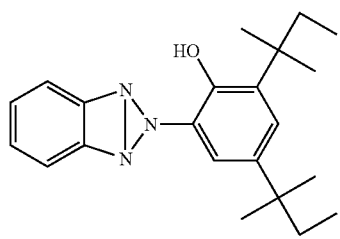
(IV-8)
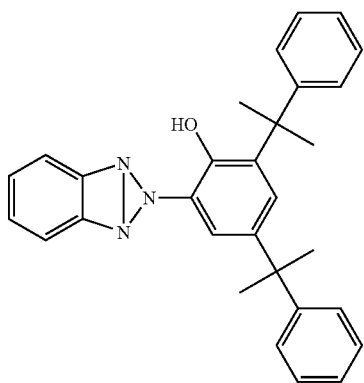
(IV-9)
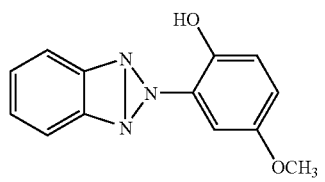
(IV-10)
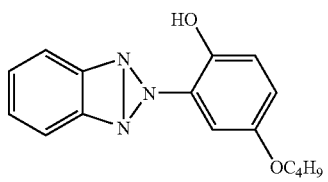
(IV-11)
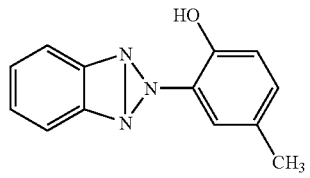
(IV-12)
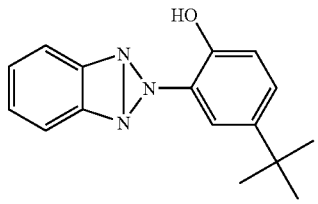
(IV-13)
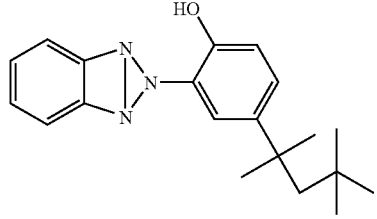
(IV-14)
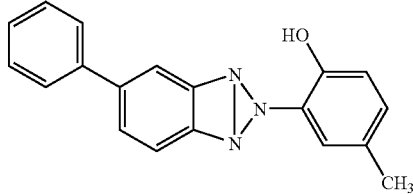
(IV-15)
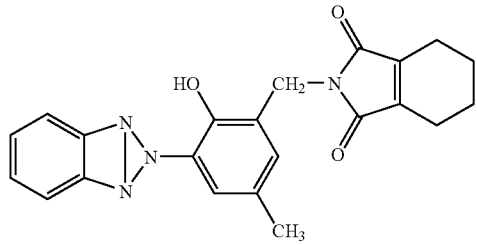
(IV-16)
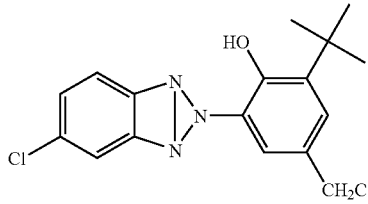
(IV-17)
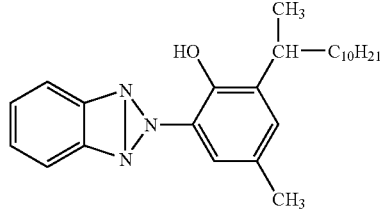
(IV-18)
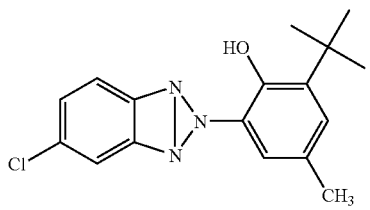
(IV-24)
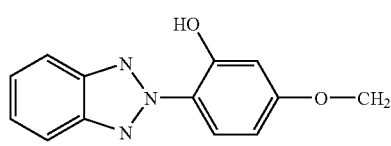

(IV-25)

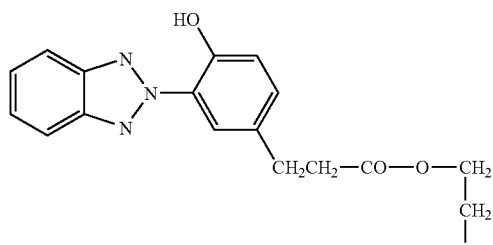

(IV-26)

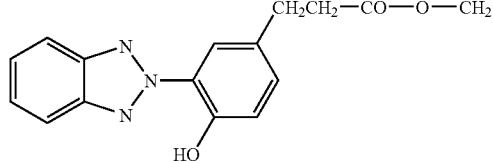

(IV-27)

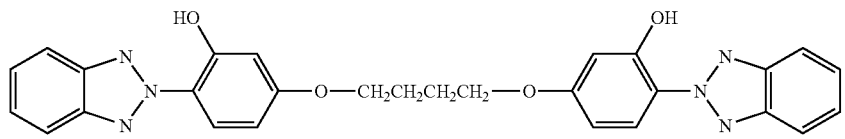

n = 6.5

(IV-28)

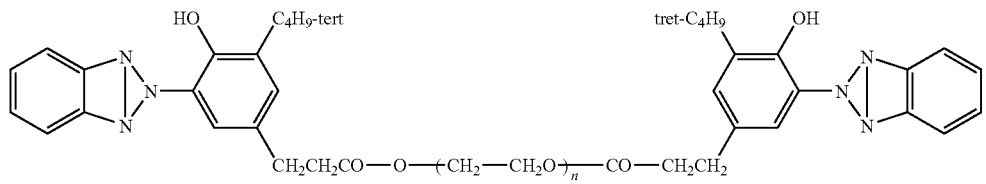

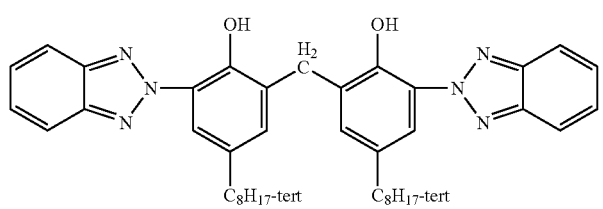

TABLE 1

| Compound No. | $R^{703}$ | $R^{701}$ |
|---|---|---|
| IV-29 | —CH$_2$CH(OH)CH$_2$OC$_4$H$_9$(-n) | —CH$_3$ |
| IV-30 | —CH$_2$CH(OH)CH$_2$OC$_4$H$_9$(-n) | —C$_2$H$_5$ |
| IV-31 | $R^{703}$ = $R^{701}$: —CH$_2$CH(OH)CH$_2$OC$_4$H$_9$(-n) | |
| IV-32 | —CH(CH$_3$)—CO—O—C$_2$H$_5$ | —C$_2$H$_5$ |

TABLE 1-continued

| Compound No. | $R^{703}$ | $R^{701}$ |
|---|---|---|
| IV-33 | $R^{703}$ = $R^{701}$: —CH(CH$_3$)—CO—O—C$_2$H$_5$ | |
| IV-34 | —C$_2$H$_5$ | —C$_2$H$_5$ |
| IV-35 | —CH$_2$CH(OH)CH$_2$OC$_4$H$_9$(-n) | —CH(CH$_3$)$_2$ |
| IV-36 | —CH$_2$CH(OH)CH$_2$OC$_4$H$_9$(-n) | —CH(CH$_3$)—C$_2$H$_5$ |
| IV-37 | $R^{703}$ = $R^{701}$: —CH$_2$CH(C$_2$H$_5$)—C$_4$H$_9$(-n) | |
| IV-38 | —C$_8$H$_{17}$(-n) | —C$_8$H$_{17}$(-n) |
| IV-39 | —C$_3$H$_7$(-n) | —C$_3$H$_7$(-n) |
| IV-40 | —C$_3$H$_7$(-i) | —C$_2$H$_5$ |
| IV-41 | —C$_4$H$_9$(-n) | —CH$_3$ |
| IV-42 | —C$_4$H$_9$(-n) | —C$_2$H$_5$ |
| IV-43 | —C$_4$H$_9$(-n) | —C$_4$H$_9$(-n) |
| IV-44 | —CH$_2$CH(CH$_3$)$_2$ | —CH$_2$CH(CH$_3$)$_2$ |
| IV-45 | —C$_6$H$_{13}$(-n) | —C$_2$H$_5$ |
| IV-46 | —C$_8$H$_{17}$(-n) | —CH$_3$ |
| IV-47 | —CH$_2$CH$_2$CH(CH$_3$)$_2$ | —CH$_2$CH$_2$CH(CH$_3$)$_2$ |
| IV-48 | —C$_5$H$_{11}$(-n) | —C$_5$H$_{11}$(-n) |
| IV-49 | —CH$_2$—CO—O—C$_2$H$_5$ | —CH$_2$—CO—O—C$_2$H$_5$ |

The compounds represented by the formula (V) will next be described.

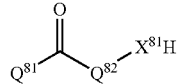
Formula (V)

In the formula (V), $Q^{81}$ and $Q^{82}$ each independently represents an aromatic ring; and $X^{81}$ represents $NR^{81}$ (in which $R^{81}$ represents a hydrogen atom or a substituent), an oxygen atom, or a sulfur atom.

An aromatic hydrocarbon ring represented by $Q^{81}$ or $Q^{82}$ is a monocyclic or bicyclic aromatic hydrocarbon ring having preferably from 6 to 30 carbon atoms (such as a benzene ring or a naphthalene ring), more preferably from 6 to 20 carbon atoms, still more preferably from 6 to 12 carbon atoms, even more preferably a benzene ring.

An aromatic heterocycle represented by $Q^{81}$ or $Q^{82}$ is preferably an aromatic heterocycle having at least any one of an oxygen atom, a nitrogen atom and a sulfur atom. Specific examples of the aromatic heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, benzotriazole, and tetrazaindene. Of these, pyridine, triazine and quinoline rings are preferred as the aromatic heterocycle.

The aromatic ring represented by $Q^{81}$ or $Q^{82}$ is preferably the aromatic hydrocarbon ring, more preferably the aromatic hydrocarbon ring having from 6 to 10 carbon atoms, still more preferably a substituted or unsubstituted benzene ring.

$Q^{81}$ and $Q^{82}$ may each have a substituent further. Although it has, as the substituent, preferably the substituent T described above, it does not include any of carboxylic acid, sulfonic acid and quaternary ammonium salt as the substituent. If possible, the substituents may be coupled to each other to form a ring structure.

$X^{81}$ represents $NR^{81}$ (in which $R^{81}$ represents a hydrogen atom or a substituent and it has, as the substituent, the substituent T as described above), an oxygen atom or a sulfur atom. $X^{81}$ is preferably $NR^{81}$ (in which $R^{81}$ is preferably an acyl group or a sulfonyl group and the substituent may be substituted further) or an oxygen atom, even more preferably an oxygen atom.

Specific examples of the compound represented by the formula (V) will be described below, but the invention is not limited by these specific examples at all.

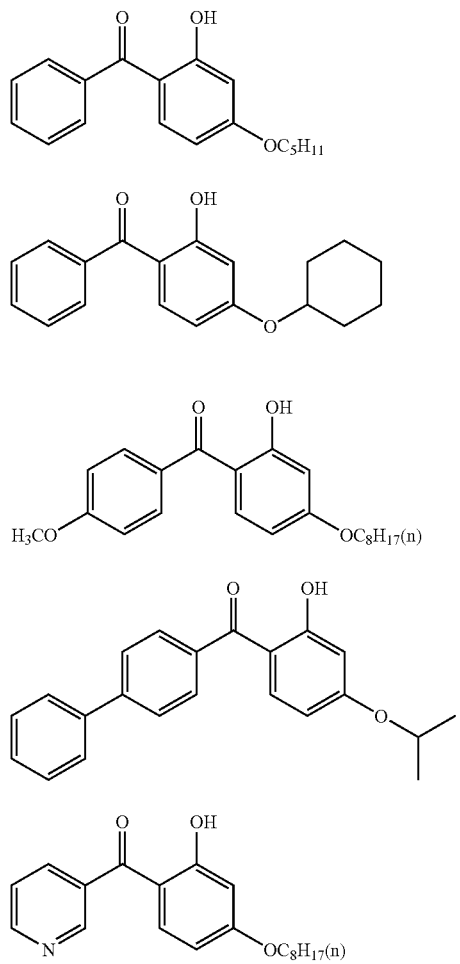

-continued
(V-11)
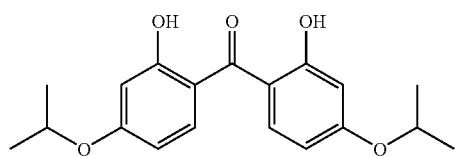
(V-12)
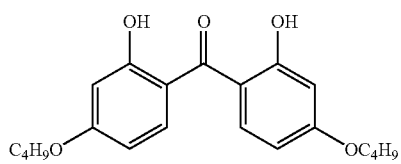
(V-13)
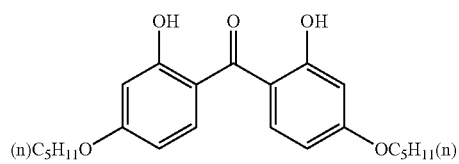
(V-14)
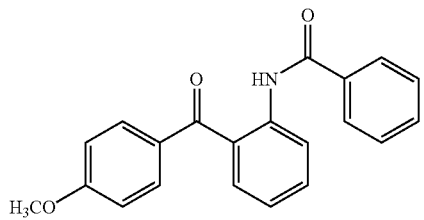
(V-15)
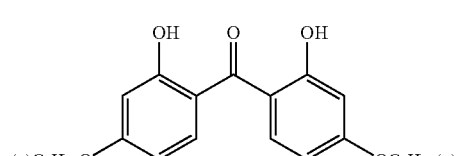
(V-16)
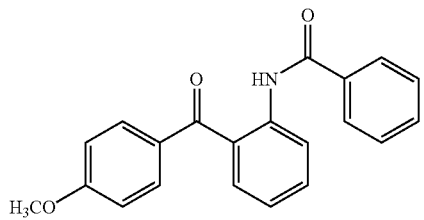
(V-17)
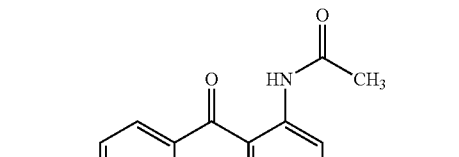
(V-18)
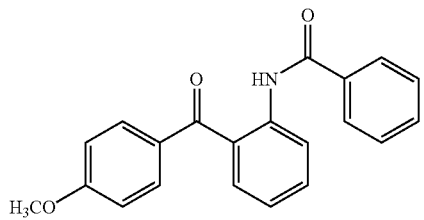
(V-19)
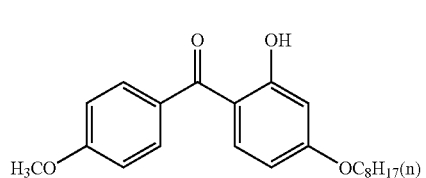
(V-20)
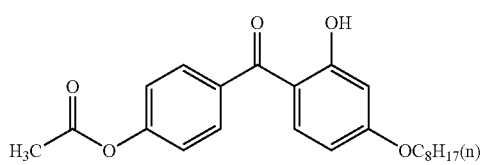
(V-21)
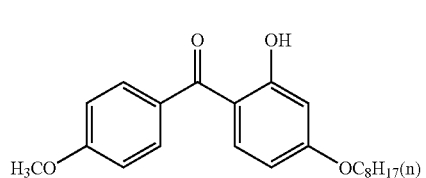
(V-22)
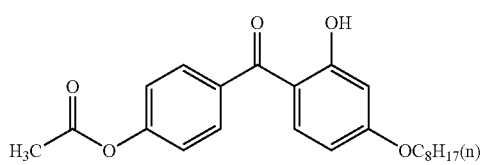
(V-23)
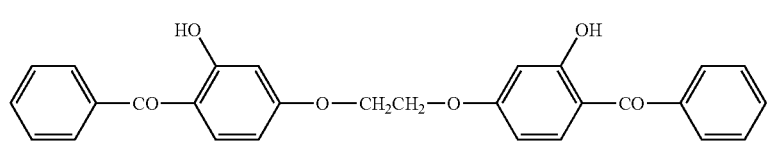
(V-24)
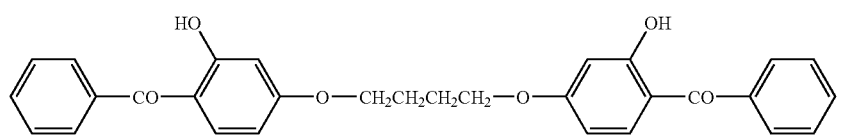
(V-25)
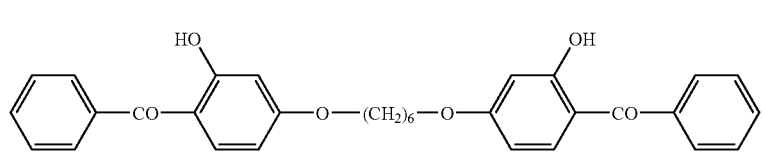

-continued

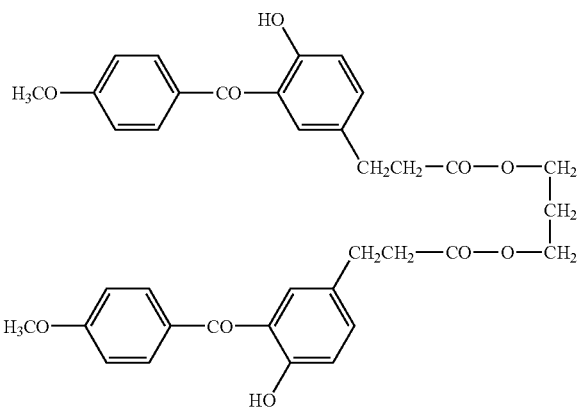
(V-26)

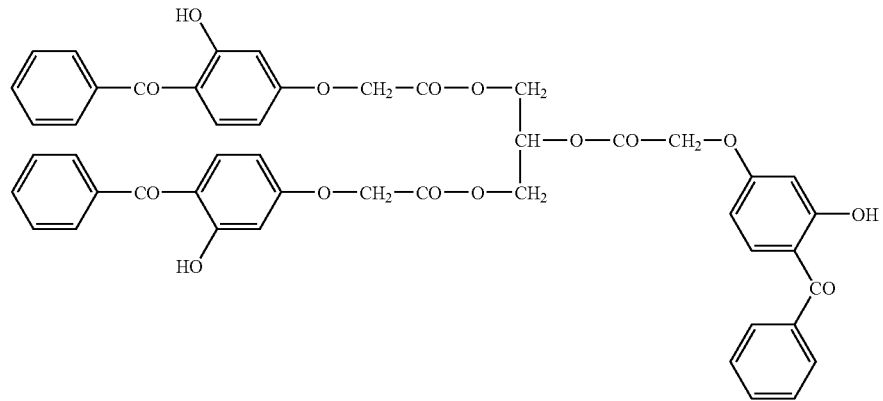
(V-27)

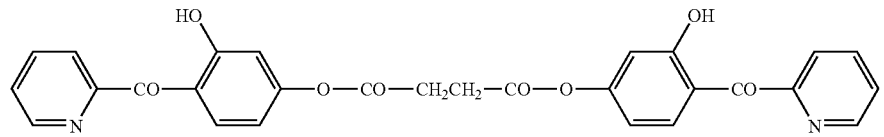
(V-28)

The Rth raising agent to be used in the invention is more preferably the compound represented by the formula (II) or (III). A mixture of the compound represented by the formula (II) or (III) with the compound represented by the formula (IV) is also preferred.

The Rth raising agent and the retardation developer (the compound represented by the formula (II) to (IV)) to be used in the invention are each added in an amount of preferably from 0.1 to 30 mass %, more preferably from 0.5 to 20 mass %, even more preferably from 1 to 10 mass % relative to a base material polymer of the film. When two or more agents or developers are used, their total amount preferably satisfies the above-described range.

The Rth raising agent to be used in the invention preferably shows liquid crystallinity, more preferably shows liquid crystallinity by heating (having a thermotropic liquid crystallinity) and it preferably shows liquid crystallinity within a temperature range of from 100 to 300° C. The liquid crystal phase is preferably a columnar phase, a nematic phase or a smectic phase, more preferably a columnar phase.

The Rth raising agent may be added simultaneously with the dissolution of the base material polymer of the film or may be added to the dope obtained by dissolution. It is more preferred to add a ultraviolet absorber solution to the dope by using a static mixer or the like immediately before casting, because it facilitates adjustment of the spectral absorption characteristics.

(Other Additives)

Various additives (for example, deterioration inhibitors, anti-UV agents, release aids, plasticizers, and infrared absorbers) may be added, depending on the intended use of the film in any step of film formation. They may be either in solid form or oil form. In other words, they are not limited by their melting point or boiling point. For example, a UV absorbing material having a melting point of 20° C. or less may be mixed with another UV absorber having a melting point of 20° C. or greater. The same applies to a combination of deterioration inhibitors. Infrared absorbing dyes are described for example in JP-A-2001-194522. The additives may be added at any stage during a preparation step of the film forming material solution (dope). A step of adding the additives may be provided as a final stage of the dope preparation step. No particular limitation is imposed on the amount of each additive insofar as it is enough for producing its effect. When the film is made of multiple layers, the kinds and amounts of the additives may differ among layers.

(Deterioration Inhibitor)

In the invention, known deterioration inhibitors (antioxidants) may be added to the film forming material solution. Examples of them include phenol or hydroquinone antioxidants such as 2,6-di-t-butyl-4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), 2,5-dit-butylhydroquinone, and pentaerythrityl tetrakis[3-(3,5-di-t-butyl-4-hydroxyphenyl)propionate]. Addition of a phosphorus antioxidant such as tris(4-methoxy-3,5-diphenyl)phosphite, tris(nonylphenyl)phosphite, tris(2,4-di-t-butylphenyl)phosphite, bis(2,6-di-t-butyl-4-methylphenyl)pentaerythritol diphosphite, and bis(2,4-di-t-butylphenyl) pentaerythritol diphosphite is also preferred. The antioxidant is added in an amount of from 0.05 to 5.0 parts by mass based on 100 parts by mass of the cyclic polyolefin resin.

(UV Absorber)

In the invention, a UV absorber may be added to the film forming material solution from the standpoint of protecting a polarizing plate, liquid crystal, or the like from deterioration. UV absorbers excellent in absorption of UV light having a wavelength of 370 nm or less and, from the viewpoint of a good liquid crystal display quality, absorbing little visible light having a wavelength of 400 nm or greater are preferred. Specific examples of UV absorbers suited for use in the invention include hindered phenol compounds, oxybenzophenone compounds, benzotriazole compounds, salicylate ester compounds, benzophenone compounds, cyanoacrylate compounds, and nickel complex compounds. Examples of the hindered phenol compounds include 2,6-di-tert-butyl-p-cresol, pentaerythritol tetrakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-t-butyl-4-hydroxybenzyl)benzene, and tris-(3,5-di-t-butyl-4-hydroxybenzyl)isocyanurate. Examples of the benzotriazole compounds include 2-(2'-hydroxy-5'-methylphenyl)benzotriazole, 2,2-methylenebis(4-(1,1,3,3-tetramethylbutyl)-6-(2H-benzotriazol-2-yl)phenol), 2,4-bis(n-octylthio)-6-(4-hydroxy-3,5-di-tert-butylanilino)-1,3,5-triazine, triethylene glycol bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl tetrakis[3-(3,5-di-tert-butyl-4-hydroxyphenyl)propionate]. The UV absorber is added in an amount of preferably from 1 ppm to 1.0%, more preferably from 10 to 1000 ppm based on the film.

(Plasticizer)

Cyclic polyolefin resins are generally less flexible than cellulose acetate. Films made of a cyclic polyolefin resin therefore easily cracks by a flexural or shear stress applied thereon. Furthermore, when an optical film is formed using a cyclic polyolefin resin, cracks tend to appear at a cut area to generate cutting dust. The cutting dust of the film thus generated contaminates the optical film and causes optical defects. In order to overcome these problems, a plasticizer can be added. Specific examples of the plasticizer include phthalate esters, trimellitate esters, aliphatic dibasic acid esters, orthophosphate esters, acetate esters, polyester epoxidized esters, ricinoleate esters, polyolefins, and polyethylene glycol compounds.

The plasticizer usable in the invention is preferably selected from compounds which are in liquid form at normal temperature and normal pressure and have a boiling point of 200° C. or greater. The following are specific examples of such plasticizers. Examples include aliphatic dibasic acid esters such as dioctyl adipate (230° C./760 mmHg), dibutyl adipate (145° C./4 mmHg), di-2-ethylhexyl adipate (335° C./760 mmHg), dibutyl diglycol adipate (from 230 to 240° C./2 mmHg), di-2-ethylhexyl azelate (from 220 to 245° C./4 mmHg), and di-2-ethylhexyl sebacate (377° C./760 mmHg); phthalate esters such as diethyl phthalate (298° C./760 mmHg), diheptyl phthalate (from 235 to 245° C./10 mmHg), di-n-octyl phthalate (210° C./760 mmHg), and diisodecyl phthalate (420° C./760 mmHg); and polyolefins such as paraffin waxes (having an average molecular weight of from 330 to 600 and a melting point of 45 to 80° C.), e.g., normal paraffin, isoparaffin, and cycloparaffin, liquid paraffins (as specified in JIS K2231; e.g., ISO VG8, VG15, VG32, VG68, and VG100), paraffin pellets (e.g., those having a melting point of from 56 to 58° C., from 58 to 60° C., and from 60 to 62° C.), paraffin chloride, low molecular weight polyethylene, low molecular weight polypropylene, low molecular weight polyisobutene, hydrogenated polybutadiene, hydrogenated polyisoprene, and squalane.

The plasticizer is added in an amount of from 0.5 to 40.0 parts by mass, preferably from 1.0 to 30.0 parts by mass, more preferably from 3.0 to 20.0 parts by mass, based on 100 parts by weight of the cyclic polyolefin resin. Amounts of the plasticizer less than the above-described range produce insufficient plasticizing effect and do not improve the processing aptitude. Amounts exceeding the above-described range, on the other hand, sometimes result in bleeding of the plasticizer after long term storage, causing optical unevenness and contamination of other parts. Amounts outside the above-described range are therefore not preferred.

The production process of the film of the invention will hereinafter be described in detail.

For producing a film, the solution casting method is employed in the invention. The solution casting method has at least a step of casting a film forming material solution onto a support. Modes of producing a film containing additives suited for the invention will next be described. Such a film is preferably produced by either one of the following two processes using the above-described solution casting method.

1. A production process of a film including the steps of dissolving or dispersing the cyclic polyolefin resin B, the polymer A, and at least one of the compounds in a solvent, casting the resulting solution or dispersion, drying the film obtained by casting, and taking up the film.

2. A production process of a film including the steps of dissolving the cyclic polyolefin resin B and the polymer A in a solvent, casting the resulting solution, drying the film obtained by casting, and taking up the film, further including a step of applying a coating solution containing at least one of the compounds onto at least one side of the film obtained by casting.

It is preferred that the casting step be followed by stretching.

The production processes 1 and 2 are different in the manner of incorporating the compound into the film. In the process 1, the compound is dissolved or dispersed in a layer composed mainly of the cyclic polyolefin resin B and the polymer A, while in the process 2, a coating solution containing the compound is applied to a layer composed mainly of the cyclic polyolefin resin B and the polymer A. Although each of the steps from a "step of dissolving the compound to prepare a dope" to a "step of drying and taking up the film" will hereinafter be described, the production process 1 is similar to the production process 2 except that in the former process, the compound is dissolved or dispersed in a solvent prior to addition in the "step of dissolving the compound to prepare a dope".

(Step of Dissolving the Compound to Prepare a Dope)

First, a film forming material solution (dope) is prepared by dissolving material components in a solvent which will be described later. The dope can be prepared by any of the following methods: a method of dissolving while stirring at room temperature; a cooling dissolving method in which the cyclic polyolefin resin and the like are dissolved in a solvent by swelling them therewith by stirring at room temperature, cooling the resulting mixture to from −20 to −100° C. and then heating to from 20 to 100° C.; a high-temperature dissolving method in which the material components in a hermetically sealed vessel are heated to the boiling point of a main solvent or greater to dissolve the mixture therein; and a method of dissolving the components in a solvent by raising the temperature and pressure of the solvent to a critical point. The room-temperature dissolving method is suited for the cyclic polyolefin resin having good solubility, but the cyclic polyolefin resin having poor solubility is dissolved by heating in a hermetically sealed vessel. It is efficient to select a temperature as low as possible when the polymer does not have poor solubility.

In the invention, the film forming material solution has a viscosity at 25° C. of preferably from 10 to 100 Pa·s, more preferably from 20 to 80 Pa·s, even more preferably from 25 to 70 Pa·s. The viscosity is measured in the following manner. The measurement is made on 1 ml of a sample solution with a rheometer "CSL 500" and "Steel Cone" having a diameter of 4 cm and angle of 2° (each, trade name; product of TA Instruments Inc.).

The measurement is started after the sample solution is kept until its temperature becomes fixed at a measurement initiation temperature.

The solvents to be used for preparation of the dope will next be described. No particular limitation is imposed on the solvent to be used in the invention insofar as it can dissolve the cyclic polyolefin resin and the like therein and the resulting solution can be cast into a film, and thus it can achieve the purpose of it. In the invention, chlorine-containing solvents such as dichloromethane and chloroform, and chain hydrocarbons, cyclic hydrocarbons, aromatic hydrocarbons, esters, ketones, and ethers, each having from 3 to 12 carbon atoms are preferred as the solvent. The esters, ketones and ethers may each have a cyclic structure. The chain hydrocarbons having from 3 to 12 carbon atoms include hexane, octane, isooctane, and decane. The cyclic hydrocarbons having from 3 to 12 carbon atoms include cyclopentane and cyclohexane, and derivatives thereof. The aromatic hydrocarbons having from 3 to 12 carbon atoms include benzene, toluene, and xylene. The esters having from 3 to 12 carbon atoms include ethyl formate, propyl formate, pentyl formate, methyl acetate, ethyl acetate, and pentyl acetate. The ketones having from 3 to 12 carbon atoms include acetone, methyl ethyl ketone, diethyl ketone, diisobutyl ketone, cyclopentanone, cyclohexanone, and methylcyclohexanone. The ethers having from 3 to 12 carbon atoms include diisopropyl ether, dimethoxymethane, dimethyloxyethane, 1,4-dioxane, 1,3-dioxolane, tetrahydrofuran, anisole, and phenetole. Examples of organic solvents having two or more functional groups include 2-ethoxyethyl acetate, 2-methoxyethanol, and 2-butoxyethanol. The organic solvent has a boiling point of preferably 35° C. or greater but not greater than 150° C.

In addition, the vapor pressure of the solvent at 25° C. is preferably 250 mmHg or greater. The solvent having a vapor pressure falling within this range evaporates readily so that it is effective for curing the cyclic polyolefin resin B and the polymer A while keeping a uniformly mixed state thereof. The vapor pressure (25° C.) is more preferably from 300 mmHg to 600 mmHg.

A mixture of two or more of the solvents may be used in order to control the physical properties of the solution such as drying properties and viscosity. It is also possible to add a poor solvent insofar as it does not hinder the dissolution of the cyclic polyolefin resin and the like in the mixed solvent.

The poor solvent to be used preferably is selected as needed, depending on the kind of the polymer to be employed. When a chlorine-containing organic solvent is used as a good solvent, use of an alcohol is preferred. The alcohol may be any of straight-chain, branched or cyclic, with a saturated aliphatic hydrocarbon being more preferred. The hydroxyl group of the alcohol may be any of primary, secondary or tertiary. Examples of the alcohol include methanol, ethanol, 1-propanol, 2-propanol, 1-butanol, 2-butanol, t-butanol, 1-pentanol, 2-methyl-2-butanol, and cyclohexanol. A fluoroalcohol is also usable as the alcohol. Examples include 2-fluoroethanol, 2,2,2-trifluoroethanol, and 2,2,3,3-tetrafluoro-1-propanol. Of these poor solvents, monohydric alcohols are particularly preferred because they are effective for reducing resistance to peeling. A choice of a particularly preferred alcohol as a poor solvent depends on the good solvent selected. In consideration of drying load, alcohols having a boiling point of 120° C. or less are preferred, of which monohydric alcohols having from 1 to 6 carbon atoms are more preferred and those having from 1 to 4 carbon atoms are even more preferred. A particularly preferred mixed solvent for preparing a solution of the cyclic polyolefin resin and the like has dichloromethane as a main solvent and at least one alcohol selected from methanol, ethanol, propanol, isopropanol, or butanol as the poor solvent.

The film forming material solution is charaterized by that it becomes a high-concentration dope by using a solvent selected as needed. Even without depending on a concentrating means, the film forming material solution becomes highly concentrated and has excellent stability. To facilitate the dissolving operation, after preparation of a low-concentration solution of the material components, it may be concentrated with a concentrating means. Although no particular limitation is imposed on the concentrating method, concentration may be performed, for example, by introducing a low-concentration solution between a cylinder body and a rotary locus of the outer circumference of a rotary blade turning in a circumferential direction inside the cylinder body while causing the solvent to evaporate from the solution by making use of an evaporation temperature difference therebetween (for example, JP-A-4-259511); or by spraying a heated low-concentration solution from a nozzle into a vessel, causing flash evaporation of the solvent in a zone between the nozzle and the inner wall of the vessel to which the solution is brought into contact, driving out the solvent vapor from the vessel, and obtaining a high-concentration solution from the bottom of the vessel (the method described, for example, in U.S. Pat. Nos. 2,541,012, 2,858,229, 4,414,341, and 4,504,355).

The solution is preferably filtered through an appropriate filter media such as a metal wire or cotton flannel to remove insoluble matters and foreign matters such as dust and impurity prior to casting. For the filtration of the film forming material solution, a filter having an absolute filtration accuracy of preferably from 0.1 to 100 μm, more preferably from 0.5 to 25 μm is employed. The filter has a thickness of preferably from 0.1 μm to 10 mm, more preferably from 0.2 to 2 mm. When the filter has such a thickness, the filtration pressure is preferably 1.6 MPa or less, more preferably 1.3 MPa or less, still more preferably 1.0 MPa or lower, even more preferably 0.6 MPa or lower. As the filter media, conventionally known materials such as glass fiber, cellulose fiber, filter paper, and fluororesins such as tetrafluoroethylene are preferred. Filter media made of ceramics or metals are also preferred.

In the invention, the film forming material solution stored in a storage tank and immediately before casting preferably satisfies the following requirement (1).

(1) The film forming material solution has a moisture content not greater than half of the moisture content of the film at a relative humidity of 80%.

In the requirement (1), the moisture content of the film forming material solution is more preferably 0.4 time or less of the moisture content of the film at a relative humidity of 80%. The above-described moisture content can be achieved by drying materials to be added (material components), dehydrating a solvent to be used, or the like.

No particular limitation is imposed on the drying conditions. The materials may be dried either at normal pressure or under reduced pressure and drying temperature is selected freely from a temperature range of from 30 to 250° C. When the temperature of the material to be added in solid form is from 30 to 250° C., the drying may be achieved by sending air thereto. Alternatively, the material may be dried by exposing it to electron beams such as ultrasonic waves. The drying time is preferably as short as possible in view of productivity. It is preferably from 0.1 to 1000 hours, more preferably from 1 to 100 hours. When the drying is performed under reduced pressure, the pressure is preferably from 100 to 50000 Pa, more preferably from 1000 to 30000 Pa. Pressure reduction may be achieved mechanically or with a water jet pump.

No particular limitation is imposed on the dehydration of the solvent and a dehydration method suited for the solvent is preferably employed.

The moisture content of the film forming material solution can be measured using 1 $cm^3$ of the solution in accordance with the Karl Fischer method, while using a water content meter and a sample drier ("CA-03" and "VA-05", trade name, each product of Mitsubishi Chemical).

The moisture content of the film can be measured using a 7 mm×35 mm sample in accordance with the Karl Fischer method while using a water content meter and a sample drier ("CA-03 " and "VA-05", trade name, each product of Mitsubishi Chemical).

The viscosity of the film forming material solution immediately before film formation is not limited insofar as it permits casting upon film formation. It is preferably from 10 to 100 Pa·s in terms of complex viscosity. When the viscosity falls within this range, a whitening phenomenon can be suppressed effectively. It is more preferably from 20 to 80 Pa·s, even more preferably from 25 to 70 Pa·s. The viscosity can be measured using 1 ml of a sample solution and a rheometer "CSL 500" and "Steel Cone" having a diameter of 4 cm and angle of 2° (each, trade name; product of TA Instruments).

The measurement is started after the sample solution is kept until its temperature becomes fixed at the measurement initiation temperature (25° C.). Although no particular limitation imposed on the temperature at this time insofar as it is the temperature at the time of casting, it is preferably from −5 to 70° C., more prefereably from −5 to 35° C.

For the production of the film, a solution casting film formation process and a solution casting film formation apparatus similar to those employed conventionally for the production of a cellulose triacetate film are employed, respectively. A dope (film forming material solution) prepared in a dissolving vessel is once stored in a storage tank and it is subjected to final adjustment by removing bubbles from the dope. From the dope outlet of the tank, the dope is fed to a pressure die via a metering pressure gear pump capable of feeding it with high accuracy, for example, based on the revolution number thereof, and then uniformly cast onto an endlessly-running metal support at a casting member from the cap (slit) of the pressure die. At a peel point to which the metal support makes nearly one revolution, the wet dope film (which may be also be called "web") is released from the metal support. While both ends of the resulting web are clipped, the web is conveyed with a tenter and dried, and then further conveyed with rolls of a drier. After completion of the drying, the dried web is then wound up around a winder to a predetermined width. The combination of the tenter and the drier with rolls may vary depending on the intended use of the film. In the solution casting film formation process to be employed for obtaining functional protective films for electronic device display, the solution casting film formation apparatus is often equiped with coating apparatuses for surface processing of a film into an undercoat layer, an antistatic layer, an antihalation layer and a protective layer. Each of the production steps will be briefly described below, but the invention is not limited thereby.

The film forming material solution (dope) thus prepared is preferably cast onto an endless metallic support, for example, a metal drum or a metal support (band or belt), and the solvent is then evaporated to form a film. The dope before casting is preferably adjusted to have a cyclic polyolefin content of from 10 to 35 mass %. The drum or band has preferably a mirror finished surface. The dope is preferably cast onto a drum or band having a surface temperature of preferably 30° C. or less. The metal support temperature is particularly preferably from −50 to 20° C.

Further, the invention can employ the cellulose acylate film forming techniques described in JP-A-2000-301555, 2000-301558, 7-032391, 3-193316, 5-086212, 62-037113, 2-276607, 55-014201, 2-111511, and 2-208650.

(Casting and Multiple Layer Casting)

The film forming material solution may be cast as a single layer solution onto a flat and smooth band or drum serving as a metal support or a plurality of the film forming material solutions may be cast in two or more layers.

When a plurality of the film forming material solutions is cast, a film may be formed by casting the solutions from a plurality of casting ports provided at intervals in the advancing direction of the metal support and stacking the resulting films in layers. For example, methods described in JP-A-61-158414, 1-122419, and 11-198285 can be employed. Alternatively, the films may be formed by casting the film forming material solutions from two casting ports. For example, methods described in Japanese Patent Application No. 27562/1985 and JP-A-61-94724, 61-947245, 61-104813, 61-158413, and 6-134933 can be employed. Still alternatively, a film casting method described in JP-A-56-162617 can also be used, in which a flow of a high viscosity film forming material solution is wrapped with a low viscosity film forming material solution, and the high and low viscosity film forming material solutions are extruded simultaneously. Methods described in JP-A-61-94724 and 61-94725 are also preferred, in which the content of an alcohol component which is a poor solvent is made higher in the outside solution than in the inside solution. A film formation method described, for example, in Japanese Patent Application No. 20235/1969 can also be employed, in which a film formed on a metal support using a first casting port, of two casting ports, is peeled and second casting is performed on the film on the side contiguous to the surface of the metal support. No particular limitation is imposed on the film forming material solutions to be cast and they may be the same or different. In order to form a plurality of cyclic polyolefin layers having different functions, film forming material solutions suited for these functions may be extruded from respective casting ports. It is also possible to co-cast the film forming material solution and another functional layer (for example, adhesive layer, dye layer, antistatic layer, anti-halation layer, matting agent layer, UV absorbing layer, and polarizing layer).

In the case of a single layer solution, a film forming material solution having a high concentration and a high visosity should be extruded in order to achieve a required film thickness, but the film forming material solution, due to its poor stability, tends to generate solids, which may cause machine troubles or result in formation of a film with poor surface planarity. Casting of a plurality of film forming material solutions from respective casting ports can overcome the above-described problem, because not only it contributes to production of a film having improved surface planarity and excellent surface conditions but also use of a concentrated film forming material solution enables to reduce a drying load, thereby raising a production speed of the film.

When co-casting is performed, although no particular limitation is imposed on the thicknesses of the inside film and the outside film, the thickness of the outside film is from 1 to 50%, more preferably 2 to 30%, of the total thickness. In the case of co-casting of three or more layers, the total film thickness of the layer contiguous to the metal support and the layer contigous to the atmosphere is defined as "outside thickness". Film forming material solutions different from each other in concentration of the above-described additive can be co-cast to form a film having a stacked structure. For example, a film having a skin layer/core layer/skin layer structure can be obtained. In this layer structure, a deterioration inhibitor and a UV absorber may be added in larger amounts to the core layer than to the skin layer or added only to the core layer. The kind of deterioration inhibitors or UV absorbers may be changed between the core layer and the skin layer. For example, a less volatile deterioration inhibitor and/or UV absorber may be added to the skin layer, while a plasticizer having excellent plasticity or a UV absorber showing high UV absorption may be added to the core layer. It is also preferred to add a release accelerator only to the skin layer on the side of the metal support. It is also preferred to add an alcohol which is a poor solvent in a larger amount to the skin layer than to the core layer in order to cool the metal support to gel the solution in accordance with the cool drum method. The skin layer and the core layer may have different Tg and the Tg of the skin layer is preferably lower than the Tg of the core layer. The skin layer and the core layer may also be different, at the time of casting, in the viscosity of the solution containing the cyclic polyolefin. Although the viscosity of the skin layer is preferably smaller than that of the core layer, the viscosity of the core layer may be smaller than that of the skin layer.

(Casting)

The solution is cast, for example by a method in which the thus-prepared dope is uniformly extruded from a pressure die onto a metal support, a method in which a dope once cast on a metal support is leveled with a doctor blade to control the film thickness, or a method using a reverse roll coater in which the film thickness is controlled by a roll rotating in the reverse direction. The method using a pressure die is preferred. As the pressure die, either a coat hanger type die or a T-die type die is preferred. In addition to the methods described above, various conventionally known film formation methods in which a cellulose triacetate solution is cast into a film can be employed. Similar effects to those described in each publication can be obtained by setting conditions in consideration of a difference in boiling point of solvents and the like. As the endlessly-running metal support to be used for film formation, a drum having the surface mirror finished by chrome plating or a stainless steel belt (which may also be called "band") having the surface mirror finished by surface polishing is employed. One or more pressure dies to be used for film formation are provided above the metal support. The number of the pressure dies is preferably one or two. When two or more pressure dies are used, the dope to be cast may be divided for these dies at any ratio or the dope may be fed to the dies in predetermined amounts by using respective precise metering gear pumps. The temperature of the film forming material solution to be cast is preferablyl from −10 to 55° C., more preferably from 25 to 50° C. The dope temperature may be maintained constant throughout the process or vary from step to step. In the latter case, the temperature should be a desired one immediately before casting.

In the casting step, the dew point in the ambient atmosphere is preferably 5° C. or less, more preferably from −20 to 3° C. The dew points within this range are preferred because they reduce a whitening phenomenon of the film and precipitation of a hydrophobic substance on the surface.

(Drying)

Drying of the dope on the metal support in forming a film is usually performed by blowing hot air to the surface side of the metal support (for example, drum or belt), that is, to the surface of the web on the metal support or to the back side of the drum or band or by the liquid heat-transfer method in which a temperature-controlled liquid is brought into contact with the back side of the drum or belt, i.e., the side opposite to the dope casting side to heat the drum or the band by transferred heat and control the surface temperature. The liquid heat-transfer method by bringing the liquid into contact with the back side is preferred. No limitation is imposed on the surface temperature of the metal support before casting insofar as it is below the boiling point of the solvent used in the dope. It is however preferred to set the surface temperature of the metal support to from 1 to 10° C. lower than the boiling point of the solvent having the lowest boiling point among the solvents in order to promote drying or cause the web to lose its fluidity on the metal support. This however does not apply to the method in which the cast dope is cooled and then, peeled without drying.

(Peeling)

When a peeling resistance (peeling load) upon peeling of a half-dried film from the metal support is high, the film is stretched irregularly in the machine direction to develop optically anisotropic unevenness. When a peeling load is particularly high, there appear stretched portions and unstretched portions alternately in the machine direction, resulting in distribution of retardation. When a film with such distribution of retardation is loaded on a liquid crystal display device, linear or band-like unevenness comes to appear. In order to avoid such a problem, the peeling load of the film is preferably reduced to 0.25 N or less per cm of the peel width of the film. The peeling load is more preferably 0.2 N/cm or less, still more preferably 0.15 N/cm or less, even more preferably 0.10 N/cm or less. When the peeling load of a film is 0.2 N/cm or less, unevenness due to peeling does not appear at all in even a liquid crystal display device in which unevenness is likely to appear. The peeling load can be reduced by addition of a release agent as described above or by selection of the solvent having a proper composition.

A peeling load is measured in the following manner. A dope is dropped on a metal plate made of the same material and having the same surface roughness as the metal support of a film forming apparatus. The dope is then spread to a uniform thickness with a doctor blade and dried. Cuts of the same width are made in the film with a cutter knife. The end of the film is peeled from the plate manually and held by a clip connected to a strain gauge. A change in the load is measured while lifting the strain gauge obliquely in the direction of 45°. A volatile content in the peeled film is also measured. The same measurements are performed several times while varying the drying time in order to obtain a peeling load at the time when the volatile content becomes equal to the residual volatile content upon peeling in the actual film formation step. Since the peeling load tends to increase with an increase of peeling speed, the measurement is preferably conducted at a peeling speed close to an actual speed.

The concentration of a residual volatile content upon peeling is preferably from 5 to 60 mass %, more preferably from 10 to 50 mass %, even more preferably from 20 to 40 mass %. Peeling at a high volatile content is preferred because it allows an increase in the drying speed, thereby improving productivity. A film having a high volatile content, however, has small strength and elasticity and is therefore easily broken or stretched by peeling. In addition, owing to poor self-retaining power after peeling, it easily causes deformation, wrinkles, or knicks. In addition, the poor self-retaining power becomes a cause for distribution of retardation.

(Stretching)

Stretching of the film, if any, is preferably performed immediately after peeling when a sufficient amount of the solvent remains in the film. The general purpose of stretching is (1) to provide a film with excellent planarity free from wrinkles or deformation and having uniform in-plane retardation and/or (2) to provide a film having increased in-plane retardation.

In stretching, the concentration of a residual volatile content in the half-dried film at the starting time of stretching is preferably from 15 to 60 mass %, more preferably from 20 to 50 mass %, even more preferably from 25 to 40 mass %. The film is stretched preferably with a draw ratio of from 0.5 to 300%, more preferably from 1 to 200%, still more preferably from 1 to 100%. A cyclic olefin resin film however exhibits large optical anistropy when stretched so that it is stretched preferably with a draw ratio of from 1 to 30%, more preferably from 3 to 25%, even more preferably from 5 to 20% from the standpoint of practical use. The residual solvent content in the film is preferably 15 mass % or greater, because such a film is not rigid but flexible so that the residual solvent content within this range enables uniform stretching in the in-plane direction of the film and in addition, the orientation of cyclic olefin molecules in the film is relaxed effectively to reduce variations in the distribution of the in-plane retardation. The residual solvent amount is, on the other hand, preferably 60 mass % or less, because such a film has high strength and elasticity so that unexpected breakage or elongation does not occur easily and variations in the distribution in the in-plane retardation do not occur easily. Further, an optical film having a residual solvent content within the above-described range is advantageous because it has a sufficient self-retaining power and therefore does not cause deformation, wrinkles, or knicks.

The stretching may be either uniaxial stretching in a machine direction or a transverse direction relative to the film coyveying direction or simultaneous or sequential biaxial stretching. Simultaneous or sequential biaxial stretching is preferred from the standpoint of development of optical characteristics and control of uniformity. With regards to birefringence of a retardation film for a VA liquid crystal cell or an OCB liquid crystal cell, a refractive index in the width direction is preferably larger than that in the length direction. Accordingly, it is preferred to stretch the film more in the width direction (transverse direction).

After stretching, the resulting film is preferably relaxed and contracted. In the relax step, the stretched film is preferably contracted, for example, by retaining a transversely stretched thermoplastic resin film for a predetermined period of time at a predetermined temperature. A relaxing percentage is preferably within 20%, more preferably within 15%, even more preferably within 10%. Too high relaxing percentages may relax the film during conveyance, which deteriorates not only traveling and handling of the film but also causes variations in conveynace tension and enhaces variations in optical characteristics. The film is retained preferably at 100° C. or greater because too low temperatures freeze the molecular orientation during the stretching procedure, making it difficult to attain a uniform retardation value. The temperature is more preferably 120° C. or greater. The retention time is preferably from 10 to 300 seconds, more preferably from 30 to 180 seconds. When the retention time is too short, a stress relaxing effect is not sufficient and a uniform retardation value cannot be obtained. When the retention time is too long, on the other hand, variations in retardation value increase in the film thickness direction.

(Post-Drying and Take-Up Step)

The stretched film is then dried to reduce the residual volatile content to 2% or less and then, taken up.

The thickness of the finished film (after drying) of the invention varies depending on the intended use, but usually ranges from 20 to 500 µm, preferably from 30 to 150 µm. When the film is particularly for a liquid crystal display device, it is preferably from 40 to 110 µm.

A film having a desired thickness can be obtained by adjusting the solid concentration of the dope, the slit gap of the die cap, the extrusion pressure from the die, the moving speed of the metal support, and the like. The width of the film thus obtained is preferably from 0.5 to 3 m, more preferably from 0.6 to 2.5 m, still more preferably from 0.8 to 2.2 m. When the film width is 0.5 m or greater, productivity does not decrease. When the film width is 3 m or less, on the other hand, deterioration in web handling properties or in optical uniformity of the film does not occur and unfavorable phenomena such as film twisting or streaking do not occur. The width within the above-described range is therefore preferred. The length of the film wound per roll is preferably from 100 to 10000 m, more preferably from 500 to 7000 m, still more preferably from 1000 to 6000 m. When the film length is 100 m or greater, reduction in the productivity due to an increase in the frequency of roll exchange does not occur. The film length not greater than 10000 m causes neither deterioration in web handling properties nor reduction in the optical uniformity of the film. Moreover, the film is free from undesirable phenomena such as film twisting and streaking. The length within the above-described range is therefore preferred. At the time of taking up, the film is preferably knurled at at least one end thereof. The knurling width is preferably from 3 to 50 mm, more preferably from 5 to 30 mm, and the knurling height is preferably from 0.5 to 500 µm, more preferably from 1 to 200 µm. Knurling may be given to the film either from one side or both sides. The variations in Re in the overall width direction are preferably within ±5 nm, more preferably ±3 nm. The variations in Rth are preferably ±10 nm, more preferably ±5 nm. The variations in Re and Rth are also preferably within the variations in Re and Rth in the width direction.

(Optical Characteristics of Film)

The film of the invention has a haze of preferably from 5% or less, more preferably 3% or less, still more preferably 1% or less. The term "haze" as used herein means a value obtained by measuring a 40 mm×80 mm sample at 25° C. and 60% RH by using a haze meter ("HGM-2DP", trade name; product of Suga Test Instruments) in accordance with JIS K-6714.

Other preferred optical characteristics of the film vary according to the intended use of the film. Each of the optical characteristics of the film for use as a protective film for polarizing plate and as an optical compensation film will be described.

The film can have desired optical characteristics by adjusting as needed the structure of the cyclic polyolefin resin and the like, the kind and amount of additives, and the process conditions such as draw ratio and residual volatile content at the time of peeling.

In this specification, Re (λ) and Rth (λ) represent in-plane retardation and retardation in the thickness direction, each at wavelength λ. Re (λ) is measured by causing light having a wavelength of λ nm incident in the normal direction of the film with "KOBRA 21ADH" (trade name; product of Oji Scientific Instruments). The Rth (λ) is calculated by KOBRA 21ADH based on six retardation values measured by making light having a wavelength of λ nm incident to a film from six directions tilted at 0 to 50 degrees with 10 degrees interval to the film normal line by using an in-plane slow axis (detected by KOBRA 21ADH) as a tilt axis (a rotation axis) (or by using an arbitrary in-plane axis as a rotation axis when the film has no slow axis), an assumed value of average refractive index, and an inputted thickness. Alternatively, the Rth may be calculated in accordance with the following equations (1) and (2) based on two retardation values measured in any two directions by using a slow axis as a tilt axis (a rotation axis) (or by using an arbitrary in-plane axis as a rotation axis when the film has no slow axis), an assumed value of average refractive index, an inputted thickness. As the assumed value of an average refractive index, the values described in *Polymer Handbook* (John Wiley & Sons, Inc.) and catalogues of various optical films can be used. The average refractive index of various optical films whose average refractive refractive index is unknown can be measured using an Abbe refractometer. The following are average refractive indices of main optical films: cellulose acylate (1.48), cycloolefin polymer (1.52), polycarbonate (1.59), polymethyl methacrylate (1.49), and polystyrene (1.59). When such an assumed value of the average refractive index and the film thickness are input, KOBRA 21ADH calculates nx, ny and nz and from these calculated nx, ny and nz, Nz=(nx−nz)/(nx−ny) is further calculated.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equation (1)

Re(θ) represents a retardation value in a direction tilted at an angle θ to the normal line, and d represents film thickness.

$$Rth = ((nx+ny)/2 - nz) \times d$$

Equation (2)

The average refractive index n is necessary as a parameter. A value obtained by measurement with an Abbe refractometer ("Abbe refractometer 2-T", trade name; product of Atago Co., Ltd.) was used as the average refractive index.

A protective film for polarizing plate and an optical compensation film, each having the above-described film; and a polarizing plate characterized by having the protective film for polarizing plate will next be described.

(Retardation Film-Optical Compensation Film)

When the film of the invention is used as a retardation film, the range of each of Re and Rth differs, depending on the kind of the retardation film. There are a variety of needs for the film. The film is used preferably as an optical compensation film. The optical compensation film of the invention may be the film itself or may have another constituent layer which will be described later. It is also desired that the film has, in the molecule thereof, a substituent having a large polarity at an adequate proportion.

(Protective Film for Polarizing Plate)

When the film is used as a protective film for polarizing plate, it has an in-plane retardation (Re) of 5 nm or less, more preferably 3 nm or less. In addition, it has preferably a thickness-direction retardation (Rth) of 50 nm or less, more preferably 35 nm or less, even more preferably 10 nm or less.

The protective film for polarizing plate according to the invention may the film itself or may have another constituent layer which will be described later.

(Polarizing Plate)

A polarizing plate usually has a polarizer and two transparent protective films disposed on both sides of the polarizer. The polarizing plate of the invention has, as both or one of the protective films thereof, the protective film for polarizing plate according to the invention. When the protective film for polarizing plate according to the invention is used on one side, an ordinarily used cellulose acetate film or the like may be used as the protective film on the other side. Polarizers include an iodine polarizer, a dye polarizer using a dichroic dye, and a polyene polarizer. The iodine polarizer and the dye polarizer are generally prepared using a polyvinyl alcohol (PVA) film. PVA is a polymeric material obtained by saponification of polyvinyl acetate. It may contain a component copolymerizable with vinyl acetate, such as an unsaturated carboxylic acid, an unsaturated sulfonic acid, an olefin or a vinyl ether. A modified PVA containing an acetoacetyl group, a sulfonic acid group, a carboxyl group, an oxyalkylene group, or the like can also be used. Although no particular limitation is imposed on the saponification degree of PVA, it is preferably from 80 to 100 mol %, more preferably from 90 to 100 mol % from the standpoint of solubility. Although no particular limitation is imposed on the degree of polymerization of the PVA, it is preferably from 1000 to 10000, more preferably from 1500 to 5000.

The PVA has preferably a syndiotacticity of 55% or greater in order to have improved durability as described in Japanese Patent 2978219, but PVA having a syndiotacticity of from 45 to 52.5% as described in Japanese Patent 3317494 is also preferred.

When the film of the invention is used as a protective film for polarizing plate or retardation film, it is preferred that the film is subjected to surface treatment as described below and then the treated surface of the film and a polarizer are laminated with an adhesive. The polarizing plate has the polarizer and protective films protecting both sides thereof and it has a protective film on one side of the polarizing plate and a separate film on the other surface. The protective film and separate film are used for protecting the polarizing plate during shipment or inspection of the polarizing plate. The protective film is adhered to protect the surface of the polarizing plate and is used on the side opposite to the surface of the polarizing plate to be adhered to a liquid crystal panel, while the separate film is used for covering an adhesive layer to be adhered to a liquid crystal panel and used on the side of the surface of the polarizing plate which is adhered to the liquid crystal panel.

The protective film for polarizing plate according to the invention is preferably adhered to the polarizer in such a manner that a slow axis of the protective film for polarizing plate is made coincident with the transmission axis of the polarizer. Evaluation of a polarizing plate fabricated under polarizing plate crossed nicols has revealed that, if qudrature accuracy between the slow axis of the protective film for polarizing plate according to the invention and the absorption axis of the polarizer (axis orthogonal to the transmission axis) exceeds 1°, the polarizing performance under polarizing plate crossed nicols reduces to cause light leakage. When the film is used in combination with a liquid crystal cell, such a polarizing plate would fail to provide a sufficient black level or contrast. The deviation between the direction of the main refractive index nx of the protective film for polarizing plate according to the invention and the transmission axis of the polarizing plate is preferably within 1°, more preferably within 0.5°.

The single transmittance TT, parallel transmittance PT, and cross transmittance CT of the polarizing plate are measured using "UV3100PC" (trade name; product of Shimadzu Corporation). The measurement is performed in the range of from 380 to 780 nm, and an average of 10 measurements is used for all of single transmittance, parallel transmittance and cross transmittance.

The durability test of the polarizing plate is performed as follows in two modes, that is, (1) a polarizing plate alone and (2) a polarizing plate adhered to glass via a pressure-sensitive adhesive. In the measurement of a polarizing plate alone, the protective film for polarizing plate is sandwiched between two polarizers, and two same samples are prepared and arranged to be normal to each other for the measurement. In the measurement of a polarizing plate adhered to glass, a sample (about 5 cm×5 cm) was prepared by adhering a polarizing plate onto glass so that the protective film for polarizing plate was on the side of the glass, and two same samples were prepared. The single transmittance is measured by placing the film on the side of this sample to face a light source. An average of the values determined by measuring two samples is taken as the single transmittance. With regards to the polarization performance, the single transmittance TT, the parallel transmittance PT and the cross transmittance CT satisfy preferably the following ranges: $40.5 \leq TT \leq 45$, $32 \leq PT \leq 39.5$ and $CT \leq 1.5$, respectively, more preferably $41.0 \leq TT \leq 44.5$, $34 \leq PT \leq 39.0$ and $CT \leq 1.3$, respectively.

In the durability test of the polarizing plate, the variation is preferably smaller before and after the test. For example, with regards to the polarizing degree of the polarizing plate, two polarizing plates are arranged under crossed nicols at 60° C. and 90% RH and the light transmittance after an elapsed time of 500 hours is compared with a light transmittance before the test. Based on the comparison results, the durability can be evaluated.

A change in the transmittance, that is, {(light transmittance under crossed nicols after durability test of polarizing plate)–(light transmittance under crossed nicols before durability test of polarizing plate)}/(light transmittance under cross nicols before durability test of polarizing plate)×100 (%) is preferably as small as possible and 5% or less.

(Surface Treatment of Film)

The protective film for polarizing plate according to the invention is preferably subjected to surface treatment for enhancing the adhesion to a polarizer. Any method is usable for surface treatment insofar as it can enhance the adhesion.

Glow discharge treatment, exposure treatment to ultraviolet rays, corona treatment, and flame treatment are preferred. The glow discharge treatment as described herein is so-called low-temperature plasma treatment under a low gas pressure. In the invention, plasma treatment under an atmospheric pressure is also preferred. Further details of the glow discharge treatment are described in U.S. Pat. Nos. 3,462,335, 3,761,299, and 4,072,769 and British Patent 891469. The method described in JP-A-59-556430 is also usable, in which the gas composition in the discharge atmosphere is limited to only a gas species generated in the container as a result of the glow discharge treatment of the polyester support itself. The method described in Japanese Patent Publication No. 16614/1985 can also be employed, in which vacuum glow discharge treatment is conducted by controlling the surface temperature of the film to fall within a range of 80° C. or greater but not greater than 180° C.

The glow discharge treatment is preferably carried out under vacuum of from 0.5 to 3000 Pa, more preferably from 2 to 300 Pa and at a voltage of from 500 to 5000 V, more preferably from 500 to 3000 V. A discharge frequency to be employed is from direct current to several thousands of megahertzs, more preferably from 50 Hz to 20 MHz, still more preferably from 1 KHz to 1 MHz. The discharge treatment intensity is preferably from 0.01 to 5 kV-A-min/m$^2$, more preferably from 0.15 to 1 kV-A-min/m$^2$.

The exposure treatment to ultraviolet rays is also preferred in the invention as the surface treatment method. It can be performed, for example, by the methods described in Japanese Patent Publication Nos. 2603/1968, 2604/1968, and 3828/1970. As a mercury lamp, a high-pressure mercury lamp composed of a quartz tube and having a ultraviolet ray wavelength of from 180 to 380 nm is preferred. For the exposure to ultraviolet rays, a high pressure mercury lamp having a main wavelengh of 365 nm can be used as a light source unless the performance of the support is not impaired by an increase in the surface temperature of the protective film to around 150° C. When low-temperature treatment is required, a low pressure mercury lamp having a dominant wavelength of 254 nm is preferred. An ozoneless type high pressure or low pressure mercury lamp is also usable. The greater the light intensity used for treatment, the higher the adhesion between the thermoplastic polymer resin film having a saturated alicyclic structure and the polarizer. With an increase in the light intensity, however, the film becomes colored and brittle. When a high-pressure mercury lamp having a dominant wavelength of 365 nm is used, an irradiation light intensity is from 20 to 10000 mJ/cm$^2$, preferably from 50 to 2000 mJ/cm$^2$. When a low pressure mercury lamp having a dominant wavelength of 254 nm is used, on the other hand, an irradiation light intensity is from 100 to 10000 mJ/cm$^2$, preferably from 300 to 1500 mJ/cm$^2$.

In the invention, the corona discharge treatment is also preferred as the surface treatment. It can be carried out in accordance with the methods described, for example, in Japanese Patent Publication No. 12838/1964 and JP-A-47-19824, 48-28067, and 52-42114. Examples of a corona discharge treatment apparatus include a solid state corona treater manufactured by Pillar Technologies, a LEPEL type surface treater, and a VETAPHON type treater. The treatment can be conducted in air at normal pressure. The discharge frequency at the time of treatment is preferably from 5 to 40 kHz, more preferably from 10 to 30 kHz. The waveform is preferably an alternating current sine wave. The gap clearance between an electrode and a dielectric roll is preferably from 0.1 to 10 mm, more preferably from 1.0 to 2.0 mm. The discharge treatment is performed above a dielectric support roller disposed in a discharge zone and the film is subjected to the treatment preferably of from 0.34 to 0.4 kV·A·min/m², more preferably from 0.344 to 0.38 kV·A·min/m².

In the invention, the flame treatment is also preferred as the surface treatment. Although any of a natural gas, a liquefied propane gas, and a city gas can be used, a mixing ratio with air is of importance because the effect of flame treatment is presumed to be brought about by plasma containing active oxygen. The activity (temperature) of plasma, which is an important property of a flame, and a large oxygen content are key factors. These key factors are governed by a gas/oxygen ratio. When they react with each other without deficiency and excess, an energy density reaches its highest level, resulting in enhancement of plasma activity. Specifically, a natural gas/air mixing ratio by volume is preferably from 1/6 to 1/10, more preferably from 1/7 to 1/9; a liquefied propane gas/air mixing ratio is preferably from 1/14 to 1/22, more preferably from 1/16 to 1/19; and a city gas/air mixing ratio is preferably from 1/2 to 1/8, more preferably from 1/3 to 1/7. The amount of flame treatment is preferably from 1 to 50 kcal/m², more preferably from 3 to 20 kcal/m². The distance between the tip of the inner flame of a burner and the film is adjusted to from 3 to 7 cm, more preferably from 4 to 6 cm. The shape of the nozzle of the burner is preferably a ribbon type manufactured by Flynn Burner (USA), a multi-hole type manuactured by Wise (USA), a ribbon type manufactured by Aerogen (UK), a staggered multi-hole type manufactured by Kasuga Electric (Japan), and a staggered multi-hole type manufactured by Koike Oxygen (Japan). The back-up roll for holding the film during flame treatment is preferably a hollow roll which is water-cooled by cooling water passed therethrough and enables treatment at a constant temperature within from 20 to 50° C.

Although the preferred degree of the surface treatment varies depending on the kind of the surface treatment or the kind of the cyclic polyolefin, the surface treatment to give a contact angle, between the surface of the protective film subjected to the surface treatment and pure water, of less than 50°, preferably 25° or greater but less than 45° C. is preferred. The contact angle between the surface of the protective film and pure water within the above range improves adhesion strength between the protective film and the polarizing film.
(Adhesive)

An adhesive containing a water soluble polymer is preferably used for adhering a polarizer made of a polyvinyl alcohol film and the surface treated protective film for polarizing plate. Examples of the water soluble polymer used preferably for the adhesive include homo- or co-polymers containing, as a constituent, an ethylenically unsaturated monomer such as N-vinylpyrrolidone, acrylic acid, methacrylic acid, maleic acid, β-hydroxyethyl acrylate, β-hydroxyethyl methacrylate, vinyl alcohol, methyl vinyl ether, vinyl acetate, acrylamide, methacrylamide, diacetonacrylamide and vinylimidazole; polyoxyethylene, polyoxypropylene, poly-2-methyloxazoline, methyl cellulose, hydroxyethyl cellulose, hydroxypropyl cellulose, and gelatin. Of these, PVA and gelatin are preferred in the invention.

The desired properties of PVA to be used as an adhesive are similar to those of PVA to be used for the polarizer. In the invention, use of a crosslinking agent in combination with PVA is more preferred. Examples of the crosslinking agent suited for use in combination with a PVA adhesive include boric acid, polyaldehydes, polyfunctional isocyanate compounds, and polyfunctional epoxy compounds, with boric acid being particularly preferred. When gelatin is used as the adhesive, so-called lime processed gelatin, acid processed gelatin, enzyme processed gelatin, gelatin derivatives, and modified gelatin can be used. Of these, lime processed gelatin and acid processed gelatin are preferred. Examples of the crosslinking agent preferably used in combination with gelatin used as an adhesive include active halogen compounds (such as 2,4-dichloro-6-hydroxy-1,3,5-triazine and sodium salt thereof), active vinyl compounds (such as 1,3-bis(vinylsulfonyl)-2-propanol, 1,2-bis(vinylsulfonylacetamido)ethane, bis(vinylsulfonylmethyl)ether, and vinyl polymers having a vinylsulfonyl group in the side chain), N-carbamoylpyridinium salts (such as (1-morpholinocarbonyl-3-pyridinio)methanesulfonate); and haloamidinium salts (such as 1-(1-chloro-1-pyridinomethylene)pyrrolidinium 2-naphthalenesulfonate). The active halogen compounds and the active vinyl compounds are particularly preferred in the invention.

When the crosslinking agent is used in combination, it is added in an amount of preferably 0.1 part by mass or greater but less than 40 parts by mass, more preferably 0.5 part or greater but less than 30 parts by mass, based on 100 parts by mass of the water soluble polymer in the adhesive. The adhesive is preferably applied to at least one of the protective film and the polarizer to form an adhesive layer, with which they are bonded. More preferably, the adhesive is applied to the surface-treated side of the protective film to form an adhesive layer, which is bonded to the surface of the polarizer. The thickness of the adhesive layer is preferably from 0.01 to 5 μm, more preferably from 0.05 to 3 μm, on dry basis.
(Anti-Reflective Layer)

It is preferred to provide a functional layer such as an anti-reflective layer on the transparent protective film disposed on the polarizing plate on the opposite side of a liquid crystal cell. In particular, an anti-reflective layer obtained by stacking a light scattering layer and a low refractive index layer in the order of mension on the transparent protective film or an anti-reflective layer obtained by stacking a medium refractive index layer, a high refractive index ayer, and a low refractive index layer in order of mention on the transparent protective film is suited for use in the invention. This means that use of the transparent protective film as a transparent support over which the anti-reflective layer is stacked is preferred. The following are preferred examples of it.

A preferred example of an anti-reflective layer having a light scattering layer and a low refractive index layer on a transparent protective film will next be described. The light scattering layer has preferably matte particles scattered therein. The light scattering layer may have both an antiglare function and a hard coat function. The light scattering layer may be composed of either a single layer or multiple layers, for example, two to four layers.

The surface profile of the anti-reflective layer is preferably designed so that the center line average roughness Ra is from 0.08 to 0.40 μm, the 10 point average roughness Rz is 10 times the Ra or less, the average peak-valley distance Sm is from 1 to 100 μm, the standard deviation of the height of the peak from the deepest valley is 0.5 μm or less, the standard deviation of the average peak-valley distance Sm with the center line as a standard is 20 μm or less, and the plane with an inclined angle of 0 to 5° accounts for 10% or greater. The anti-reflective layer having such a design is preferred because it can achieve a sufficient antiglare property and, when visually observed, uniform matt appearance.

In addition, by controlling a color tint of a reflected light under a light source C to from −2 to 2 in a* value and from −3 to 3 in b* value and a minimum reflectance/maximum reflectance ratio within a range between 380 nm and 780 nm to from 0.5 to 0.99, the resulting anti-reflective layer can make the color tint of a reflected light neutral and is therefore preferred.

Further, by controlling the b* value of the transmission light under the light source C to from 0 to 3, the resulting anti-reflective layer can reduce a yellowish tint of white display of a display device and is therefore preferred.

Still further, the standard deviation of luminance distribution as measured on the film while inserting a 120 μm×40 μm lattice between a plane light source and the anti-reflective layer is preferably 20 or less, because within this range, dazzling of a highly fine panel to which the film of the invention is applied can be reduced.

The anti-reflective layer having, as optical characteristics thereof, a mirror reflectivity of 2.5% or less, a transmittance of 90% or greater, and a 60° surface gloss of 70% or less is preferred because it can suppress reflection of an external light and improve viewability. In particular, the mirror reflectivity is more preferably 1% or less, even more preferably 0.5% or less. By controlling the haze of the anti-reflective layer to from 20% to 50%, an internal haze/total haze (ratio) to from 0.3 to 1, a reduction in haze value from formation of the light scattering layer to formation of the low-refractive-index layer to within 15%, a transmission image definition under an optical comb width of 0.5 mm to from 20% to 50% and a transmission ratio of a vertical transmission light/light inclined 2° from the vertical direction to from 1.5 to 5.0, glaring on a highly fine LCD panel can be prevented and unsharpness of letters can be reduced. Such an anti-reflective layer is therefore preferred.

(Low-Refractive-Index Layer)

The low refractive-index layer of the anti-reflective layer has a refractive index of preferably from 1.20 to 1.49, more preferably from 1.30 to 1.44. Further, the low-refractive-index layer preferably satisfies the following inequality from the standpoint of reducing the refractive index:

$$(m/4)\lambda \times 0.7 < n1d1 < (m/4)\lambda \times 1.3$$

wherein, m represents a positive odd number; n1 represents a refractive index of the low refractive index layer; d1 represents the thickness (nm) of the low refractive index layer; λ represents a wavelength and is a value within a range of from 500 to 550 nm.

Materials forming the low refractive-index layer will hereinafter be described below.

The low-refractive-index layer preferably contains a fluorine-containing polymer as a low refractive-index binder. The fluorine-containing polymer preferably has a kinetic friction coefficient of from 0.03 to 0.20, a contact angle to water of from 90 to 120° and a pure water-dropping angle of 70° or less and crosslinks by heat or ionizing radiation. When the anti-reflective layer is installed on an image display device, a peeling force from a commercially available adhesive tape is preferably as small as possible, because it facilitates peeling of a seal or a memo adhered thereto. Such peeling force is preferably 500 gf or less, more preferably 300 gf or less, even more preferably 100 gf or less. A higher surface hardness measured with a microhardness tester provides a less scratchable surface, and the surface hardness is preferably 0.3GPa or greater, more preferably 0.5GPa or greater.

Examples of the fluorine-containing polymer to be used for the low refractive index layer include hydrolyzates and dehydration condensates of a perfluoroalkyl-containing silane compound {such as (heptadecafluoro-1,1,2,2-tetrahydrodecyl)triethoxysilane} and fluorine-containing copolymers having, as the constituent thereof, a fluorine-containing monomer unit and a constituent unit for imparting crosslinking reactivity.

Specific examples of the fluorine-containing monomer include fluoroolefins (such as fluoroethylene, vinylidene fluoride, tetrafluoroethylene, perfluorooctylethylene, hexafluoropropylene, and perfluoro-2,2-dimethyl-1,3-dioxol), partially or completely fluorinated alkyl ester derivatives of (meth)acrylic acid {such as "Viscoat 6FM" (trade name; product of Osaka Organic Chemical Industry) and "M-2020" (trade name; product of Daikin Kogyo)}, and partially or completely fluorinated vinyl ethers, with perfluoroolefins being preferred. In view of refractive index, solubility, transparency and availability, hexafluoropropylene is particularly preferred.

Examples of the constituent unit for imparting crosslinking reactivity include constituent units available by polymerization of a monomer having, in the molecule thereof, a self-crosslinkable functional group in advance such as glycidyl (meth)acrylate and glycidyl vinyl ether, constituent units available by polymerization of a monomer having a carboxyl group, a hydroxyl group, an amino group, or a sulfo group {such as (meth)acrylic acid, methylol(meth)acrylate, hydroxyalkyl(meth)acrylate, allyl acrylate, hydroxyethyl vinyl ether, hydroxybutyl vinyl ether, maleic acid, and crotonic acid), and constituent units available by introducing a crosslinking reactive group such as (meth)acryloyl group into the above-described constituent units by a high molecular reaction (introducing, for example, by acting acrylic acid chloride on a hydroxyl group).

In addition to the fluorine-containing monomer unit and the constituent unit for imparting crosslinking reactivity, a fluorine-free monomer may also be copolymerized as needed in view of solubility in a solvent and transparency of the film. No particular limitation is imposed on the monomer unit usable in combination. Examples include olefins (such as ethylene, propylene, isoprene, vinyl chloride, and vinylidene chloride), acrylates (such as methyl acrylate, ethyl acrylate, and 2-ethylhexyl acrylate), methacrylates (such as methyl methacrylate, ethyl methacrylate, butyl methacrylate, and ethylene glycol dimethacrylate), styrene derivatives (such as styrene, divinylbenzene, vinyltoluene, and α-methylstyrene), vinyl ethers (such as methyl vinyl ether, ethyl vinyl ether, and cyclohexyl vinyl ether), vinyl esters (such as vinyl acetate, vinyl propionate, and vinyl cinnamate), acrylamides (such as N-tert-butylacrylamide and N-cyclohexylacrylamide), methacrylamides, and acrylonitrile derivatives. A curing agent may be used in combination with the above polymers as described in JP-A-10-25388 and 10-147739.

(Light Scattering Layer)

A light scattering layer is formed for the purpose of imparting light diffusion properties caused by surface scattering and/or internal scattering and hard coat properties for improving scratch resistance of the film. It is therefore formed by incorporating a binder for imparting hard coat properties, matte particles for imparting light diffusion properties and, if necessary, an inorganic filler for increasing a refractive index, preventing contraction due to crosslinking and increasing strength. The thickness of the light scattering layer is preferably from 1 to 10 μm, more preferably from 1.2 to 6 μm from the standpoint of imparting hard coat properties and preventing the film from curling and becoming brittle.

The binder for the light scattering layer is preferably a polymer having, as the main chain thereof, a saturated hydrocarbon chain or a polyether chain, more preferably a polymer having, as the main chain thereof, a saturated hydrocarbon chain. Also, the binder polymer preferably has a crosslinked structure. The binder polymer having, as the main chain thereof, a saturated hydrocarbon chain is preferably a polymer of an ethylenically unsaturated monomer. The binder polymer having, as the main chain thereof, a saturated hydrocarbon chain and at the same time, having a crosslinked structure is preferably a (co)polymer of a monomer having two or more ethylenically unsaturated groups. In order to obtain a binder polymer having a high refractive index, a monomer of it may contain, in the structure thereof, an aromatic ring or at least one atom selected from halogen atoms other than a fluorine atom, a sulfur atom, a phosphorus atom, and a nitrogen atom.

Examples of the monomer having two or more ethylenically unsaturated groups include esters between a polyhydric alcohol and (meth)acrylic acid (such as ethylene glycol di(meth)acrylate, butanediol di(meth)acrylate, hexanediol di(meth)acrylate, 1,4-cyclohexane diacrylate, pentaerythritol tetra(meth)acrylate), pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, dipentaerythritol hexa (meth)acrylate, pentaerythritol hexa(meth)acrylate, 1,2,3-cyclohexane tetramethacrylate, polyurethane polyacrylate, and polyester polyacrylate), ethylene oxide-modified products of the above-described esters, vinylbenzene and derivatives thereof (such as 1,4-divinylbenzene, 4-(vinylbenzoic acid)-2-acryloylethyl ester and 1,4-divinylcyclohexanone), vinylsulfones (such as divinylsulfone), acrylamides (such as methylenebisacrylamide) and methacrylamide. Two or more of these monomers may be used in combination.

Specific examples of the high refractive index monomer include bis(4-methacryloylthiophenyl)sulfide, vinylnaphthalene, vinylphenylsulfide, and 4-methacryloxyphenyl-4'-methoxyphenyl thioether. Two or more of these monomers may also be used in combination.

The monomer having an ethylenically unsaturated group can be polymerized by exposure to ionizing radiation or heating in the presence of a photo radical initiator or a heat radical initiator.

The anti-reflective layer can therefore be formed by preparing a coating solution containing the monomer having an ethylenically unsaturated group, the photo radical or heat radical initiator, matte particles, and an inorganic filler, applying the coating solution onto a transparent support, and curing the solution by a polymerization reaction caused by ionizing radiation or by heat. As the photo radical initiator, known ones may be used.

The polymer having, as the main chain thereof, a polyether is preferably a ring-opening polymer of a polyfunctional epoxy compound. The ring-opening polymerization of a polyfunctional epoxy compound can be conducted by exposure to ionizing radiation or by heating in the presence of a photoacid generator or a heat acid generator.

The anti-reflective layer can therefore be formed by preparing a coating solution containing the polyfunctional epoxy compound, the photoacid generator or heat acid generator, matte particles, and an inorganic filler, applying the coating solution onto a transparent support, and curing the solution by a polymerization reaction caused by ionizing radiation or by heat.

A crosslinkable functional group may be introduced into a polymer by using a monomer having the crosslinkable functional group instead of or in addition to the monomer having two or more ethylenically unsaturated groups and by utilizing a reaction of this crosslinkable functional group, the crosslinked structure may be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group, and an active methylene group. Vinylsulfonic acid, acid anhydrides, cyanoacrylate derivatives, melamine, etherified methylol, esters, urethane and metal alkoxides such as tetramethoxysilane can also be utilized as the monomer for introducing a crosslinked structure. A functional group exhibiting crosslinkability as a result of a decomposition reaction such as block isocyanate group may also be used. In short, the crosslinkable functional group in the invention does not necessarily show a reactivity immediately but may show a reactivity as a result of decomposition.

These binder polymers having the cross-linkable functional group can form a crosslinked structure by heating after application.

The light scattering layer may preferably contain matte particles larger than filler particles and having an average particle size of from 1 to 10 μm, preferably from 1.5 to 7.0 μm, for example, particles of an inorganic compound or resin particles for the purpose of imparting antiglare properties.

Preferred specific examples of the matte particles include particles of an inorganic compound such as silica particles and $TiO_2$ particles; and resin particles such as acrylic particles, crosslinked acrylic particles, polystyrene particles, crosslinked styrene particles, melamine resin particles, and benzoguanamine resin particles. Of these, crosslinked styrene particles, crosslinked acrylic particles, crosslinked acrylstyrene particles, and silica particles are preferred. As the matte particles, those either in spherical form or amorphous form may be used.

Two or more matte particles different in particle size may be used in combination. Matte particles of a greater particle size impart an antiglare property, while matte particles of a smaller particle size impart another optical characteristic.

Further, the matte particles have most preferably a monodisperse particle size distribution, and the particle sizes of the particles are preferably as near as possible to each other. For example, when particles having a particle size greater than the average particle size by at least 20% are defined as coarse particles, a proportion of the coarse particles is preferably 1% or less, more preferably 0.1% or less, still more preferably 0.01% or less in number based on the total number of the particles. Matte particles having such a particle size distribution can be obtained by classification after a usual synthesis reaction. Fine particles having a preferable distribution can be obtained by raising the number of times of classification or by intensifying the degree of classification.

The matte particles are incorporated in the light scattering layer so that the amount of matte particles in the light scattering layer becomes preferably from 10 to 1000 mg/m$^2$, more preferably from 100 to 700 mg/m$^2$. The particle size distribution of the matte particles is measured using the coulter counter method, and the distribution thus measured is converted into particle number distribution.

In order to raise the refractive index of the light scattering layer, in addition to the matte particles, an inorganic filler composed of an oxide of at least one metal selected from titanium, zirconium, aluminum, indium, zinc, tin, and antimony and having an average particle size of 0.2 μm or less, preferably 0.1 μm or less, more preferably 0.06 μm or less may be incorporated in the light scattering layer.

To the contrary, in the light scattering layer using highly refractive matte particles, in order to raise a difference from the refractive index of the matte particles, silicon oxide is preferably used to keep the refractive index of the layer at a low level. The preferable particle size is similar to that of the inorganic filler.

Specific examples of the inorganic filler to be incorporated in the light scattering layer include $TiO_2$, $ZrO_2$, $Al_2O_3$, $In_2O_3$, ZnO, $SnO_2$, $Sb_2O_3$, ITO and $SiO_2$, with $TiO_2$ and $ZrO_2$ being particularly preferred because they can raise a refractive index. The surface of the inorganic filler may preferably be subjected to silane coupling treatment or titanium coupling treatment. The surface of the filler is preferably treated with a surface treatment agent having a functional group reactive with the binder species. The amount of the inorganic filler is preferably from 10 to 90%, more preferably from 20 to 80%, even more preferably from 30 to 75%, based on the total mass of the light scattering layer. Since such a filler has a particle size enough smaller than the wavelength of light, it does not cause scattering, and the dispersion of the filler in the binder polymer behaves as an optically uniform substance.

The bulk of a mixture of the binder and the inorganic filler of the light scattering layer has a refractive index of preferably from 1.48 to 2.00, more preferably from 1.50 to 2.00, still more preferably from 1.50 to 1.80. In order to adjust the refractive index to fall within the above-described range, the kind and amount of the binder and the inorganic filler may be selected as needed. The way how to select the kind or amount can be known easily in advance through experiments.

In the light scattering layer, in order to keep surface uniformity free of coating unevenness, drying unevenness and spot defects, a fluorine type surfactant, a silicone type surfactant, or both of them is preferably added to a coating composition for forming an antiglare layer. In particular, the fluorine type surfactant is preferred because addition of even a smaller amount of it is effective for removing the surface troubles such as coating unevenness, drying unevenness and spot defects of the anti-reflective layer. The surfactant is added for the purpose of imparting high-speed coating aptitude, thereby heightening the productivity, while raising surface uniformity.

Next, an anti-reflective layer obtained by stacking a medium-refractive-index layer, a high-refractive-index layer, and a low-refractive-index layer in order of mention on the transparent protective film will be described.

The anti-reflective layer having a structure wherein at least a medium-refractive-index layer, a high-refractive-index layer, and a low- refractive-index layer (outermost layer) are stacked in order of mention is preferably designed to have refractive indexes satisfying the following relation:

Refractive index of high-refractive-index
    layer>refractive index of medium-refractive-
    index layer>refractive index of transparent
    support>refractive index of low-refractive-index
    layer.

A hard coat layer may be inserted between the transparent support and the medium-refractive-index layer. Further, the anti-reflective layer may be composed of a medium-refractive-index hard coat layer, a high-refractive-index layer, and a low-refractive-index layer (refer to, for example, JP-A-8-122504, 8-110401, 10-300902/, 2002-243906, and 2000-111706). Further, each layer may have another function and examples of such a layer include a stain-resistant low-refractive-index layer and an antistatic high-refractive-index layer (such as those described in JP-A-10-206603 and 2002-243906).

The anti-reflective layer has a haze of preferably 5% or less, more preferably 3% or less. In addition, it has a film strength of preferably H or greater, more preferably 2H or greater, even more preferably 3H or greater, as a result of the pencil hardness test according to JIS K-5400.

(High-Refractive-Index Layer and Medium-Refractive-Index Layer)

A high refractive index layer constituting the anti-reflective layer is preferably composed of a curable film containing at least inorganic compound ultrafine particles having an average particle size of 100 nm or less and having a high refractive index and a matrix binder.

As the inorganic compound fine particles having a high refractive index, inorganic compounds having a refractive index of 1.65 or greater, preferably 1.9 or greater are usable. Examples of them include oxides of Ti, Zn, Sb, Sn, Zr, Ce, Ta, La and In and composite oxides containing these metal atoms.

Examples of the method for obtaining such ultrafine particles include a method of treating the surface of the fine particles with a surface treatment agent (such as a silane coupling agent described in JP-A-11-295503, 11-153703 or 2000-9908 and an anionic compound or organometallic coupling agent described in JP-A-2001-310432), a method of forming a core-shell structure while having high-refractriveindex particles as a core (JP-A-2001-166104, 2001-310432, or the like), and a method of using a specific dispersing agent in combination (described in, for example, JP-A-11-153703, U.S. Pat. No. 6,210,858 and JP-A-2002-2776069).

As a material for forming the matrix, conventionally known thermoplastic resins and curable resin films can be used. Further, at least one composition selected from polyfunctional-compound-containing compositions having at least 2 radical and/or cationic polymerizable groups and compositions containing an organometallic compound having a hydrolysable group or partial condensate of the compound. Examples include JP-A-2000-47004, 2001-315242, 2001-31871, and 2001-296401.

Also, a curable film available from a colloidal metal oxide obtained from a hydrolysis condensate of a metal alkoxide and a metal alkoxide composition is preferred, which is described in, for example, JP-A-2001-293818.

The refractive index of the high-refractive-index layer is preferably from 1.70 to 2.20. Its thickness is preferably from 5 nm to 10 µm, more preferably from 10 nm to 1 µm. The refractive index of the medium-refractive-index layer is adjusted to fall between the refractive index of the low-refractive-index layer and that of the high-refractive-index layer. The refractive index of the medium-refractive-index layer is preferably from 1.50 to 1.70. It has a thickness of preferably from 5 nm to 10 µm, more preferably from 10 nm to 1 µm.

(Low-Refractive-Index Layer)

The low-refractive-index layer is stacked over the high-refractive-index layer. The refractive index of the low-refractive-index layer is preferably from 1.20 to 1.55, more preferably from 1.30 to 1.50.

The low-refractive-index layer is preferably constructed as the outermost layer having scratch resistance and stain resistance. For improving the scratch resistance largely, it is effective to impart lubricity to the surface of the layer and for this purpose, conventionally known methods of introducing silicone or fluorine to form a thin-film layer can be employed.

The refractive index of the fluorine-containing compound is preferably from 1.35 to 1.50, more preferably from 1.36 to 1.47. The fluorine-containing compound preferably contains a crosslinkable or polymerizable functional group having a fluorine atom content of from 35 to 80 mass %. Examples of such a compound include those described in paragraphs from [0018] to [0026] of JP-A-9-222503, paragraphs from [0019] to [0030] of JP-A-11-38202, paragraphs from [0027] to [0028] of JP-A-2001-40284, and JP-A-2000-284102.

The silicone compound is preferably a compound having a polysiloxane structure. It preferably has, in the high molecular chain thereof, a curable functional group or a polymerizable functional group to form a crosslinked structure in the film. Examples include reactive silicones (such as "SILA- PLANE", trade name; product of Chisso Corporation) and polysiloxanes having a silanol group on each end (JP-A-11-258403).

The crosslinking or polymerization reaction of the fluorine-containing and/or siloxane polymer having a cross-linkable or a polymerizable group is preferably conducted by applying a coating composition for forming an outermost layer which composition contains a polymerization initiator, sensitizer, etc., and simultaneously with or after the application, exposing it to light or heat.

A sol/gel curable film which cures by a condensation reaction between an organometallic compound such as a silane coupling agent and a silane coupling agent having a specific fluorine-containing hydrocarbon group in the presence of a catalyst is also preferred.

Examples include polyfluoroalkyl-containing silane compounds or partially hydrolyzed condensates thereof (compounds described in JP-A-58-142958, 58-147483, 58-147484, 9-157582 and 11-06704) and silyl compounds having a poly(perfluoroalkyl ether) group which is a fluorine-containing long-chain group (compounds described in JP-A-2000-117902, 2001-48590 and 2002-53804).

The low-refractive-index layer may contain, in addition to the above-described additives, a filler (such as low-refractive-index inorganic compounds having a primary particle average size of from 1 to 150 nm such as silicon dioxide (silica) and fluorine-containing particles (such as magnesium fluoride, calcium fluoride and barium fluoride) and organic fine particles described in paragraphs from [0020] to [0038] of JP-A-11-3820), a silane coupling agent, a sliding agent, and a surfactant.

The low-refractive-index layer located below the outermost layer may be formed by a gas phase process (such as vacuum deposition, sputtering, ion plating or plasma CVD). The process of application is preferred because it enables preparation of the layer at a low cost. The thickness of the low-refractive-index layer is preferably from 30 to 200 nm, more preferably from 50 to 150 nm, even more preferably from 60 to 120 nm.

(Layers Other Than Anti-Reflective Layer)

In addition, layers such as hard coat layer, a forward scattering layer, a primer layer, an antistatic layer, an undercoat layer, a protective layer, or the like may be provided.

(Hard Coat Layer)

The hard coat is provided on the surface of the transparent support in order to impart physical strength to the transparent protective film having the anti-reflective layer thereon. It is particularly preferred to provide the hard coat layer between the transparent support and the high-refractive-index layer. The hard coat layer is preferably formed by crosslinking reaction or polymerization reaction of a photo-curable and/or heat-curable compound. The curable functional group is preferably a photo-polymerizable functional group and an organometallic compound having a hydrolyzable functional group is preferably an organic alkoxysilyl compound.

Specific examples of these compounds are similar to those described in the high-refractive-index layer. Specific examples of the composition constituting the hard coat layer include those described in JP-A-2002-144913 and 2000-9908 and WO00/46617. The high-refractive-index layer can also function as the hard coat layer. Such a layer is preferably formed by finely dispersing fine particles in accordance with the method described in the high-refractive-index layer and incorporating the resulting particles in the hard coat layer.

The hard coat layer can also function as an antiglare layer by incorporating particles having an average particle size of from 0.2 to 10 μm, thereby imparting an antiglare function to the hard coat layer.

The thickness of the hard coat layer can properly be designed according to intended use. The thickness of the hard coat layer is preferably from 0.2 to 10 μm, more preferably from 0.5 to 7 μm.

The hard coat layer has a strength of preferably H or greater, more preferably 2H or greater, even more preferably 3H or greater, as a result of the pencil hardness test according to JIS K5400. In addition, in the Taber test in accordance with JIS K5400, an abrasion amount of a test piece after the test is preferably as small as possible.

(Antistatic Layer)

When an antistatic layer is provided, a conductivity of $10^{-8}$ $\Omega cm^{-3}$ or less in terms of volume resistivity is preferably imparted thereto. A volume resistivity of $10^{-8}$ $\Omega cm^{-3}$ can be imparted by using a hygroscopic substance, a water-soluble inorganic salt, a cetain surfactant, a cation polymer, an anion polymer or colloidal silica. They have however large dependence on temperature and humidity so that sufficient conductivity cannot be imparted at a low humidity. As the material for the antistatic layer, metal oxides are therefore preferred. Some metal oxides are colored and use of such metal oxide as a material for the antistatic layer causes coloration of the whole film. Use of such metal oxides is therefore not preferred. A metal capable of forming a metal oxide not colored is, for example, Zn, Ti, Sn, Al, In, Si, Mg, Ba, Mo, W or V. Use of metal oxides composed mainly of any of them is preferred. Specific examples include $ZnO$, $TiO_2$, $SnO_2$, $Al_2O_3$, $In_2O_3$, $SiO_2$, $MgO$, $BaO$, $MoO_3$, and $V_2Os$ and composite oxides thereof, with $ZnO$, $TiO_2$ and $SnO_2$ being particularly preferred. Foreign-atom-containing metal oxides obtained by adding Al, In or the like to $ZnO$, those obtained by adding Sb, Nb, halogen element or the like to $SnO_2$, and those obtained by adding Nb, Ta, or the like to $TiO_2$ are effective. Further, as is described in Japanese Patent Publication No. 6235/1984, materials obtained by depositing the metal oxide onto other crystalline metal particles or fibrous materials (such as titanium oxide) may also be used. Although volume resistivity and surface resistivity are different physical properties and cannot be compared simply with each other, the antistatic layer may have a surface resistivity of roughly about $10^{-10}$ $\Omega/sq$ or less, more preferably $10^{-8}$ $\Omega/sq$ or less in order to ensure a conductivity of $10^{-8}$ $\Omega cm^{-3}$ or less in terms of volume resistivity. The surface resistivity of the antistatic layer should be measured as a value when the antistatic layer is formed as an outermost layer and it can be measured during the formation of the film stack as described herein.

The liquid crystal display device of the invention characterized by having at least one of the above-described film, the protective film for polarizing plate, the optical compensation film, and the polarizing plate will next be described.

(Liquid Crystal Display Device)

The film, the optical compensation film having the film, and the polarizing plate using the film can be used for liquid crystal cells or liquid crystal display devices of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), HAN (Hybrid Aligned Nematic), and ECB (Electrically Controlled Birefringence) are proposed. They are preferably used for IPS mode, ECB mode, OCB mode or VA mode.

(IPS Mode Liquid-Crystal Display Device and ECB Mode Liquid-Crystal Display Device)

The film is very advantageously used as a support for an optical compensation sheet or protective film of a polarizing plate of an IPS mode liquid crystal display device and an ECB mode liquid crystal display device having an IPS mode and EBC mode liquid crystal cell, respectively. In these modes, liquid crystal materials are aligned substantially in parallel during black display. Liquid crystal molecules are aligned in parallel to a substrate surface while applying no voltage, whereby black display is performed. In these modes, a polarizing plate using the film conributes to widening of a viewing angle and improvement in constrast.

(OCB Mode Liquid Crystal Display Device)

An OCB mode liquid crystal cell is a liquid crystal display device using a bend alignment mode crystal cell in which rod-shaped liquid crystalline molecules in the upper parts of the liquid crystal cell are aligned in a direction substantially opposite (symmetrically) to those in the lower parts of the liquid crystal cell. The OCB mode liquid crystal cell is disclosed in U.S. Pat. Nos. 4,583,825 and 5,410,422. Since the rod-shaped liquid crystalline molecules are aligned symmetrically between the upper part and lower part of the liquid crystal cell, the bend alignment-mode liquid crystal cell has a self-compensatory function. This liquid crystal mode is therefore called also "OCB (Optically Compensatory Bend)" liquid crystal mode. The bend alignment-mode liquid crystal display device has an advantage of a high response speed.

(VA Mode Liquid Crystal Display Device)

In the VA mode liquid crystal cell, rod-shaped liquid crystal molecules are aligned substantially vertically when no voltage is applied thereto.

The VA mode liquid crystal cell includes (1) a VA mode liquid crystal cell in the narrow sense in which rod-shaped liquid crystal molecules are aligned substantially vertically when no voltage is applied thereto and are aligned substantially horizontally when a voltage is applied thereto (described in Japanese Patent Laid-Open No. 176625/1990), (2) an (MVA mode) liquid crystal cell in which the VA mode is modified into multi-domain mode so as to widen the viewing angle {described in SID97, Digest of tech. Papers (Abstracts), 28 (1997), p. 845}, (3) a (n-ASM mode) liquid crystal cell in which rod-like liquid crystal molecules are aligned substantially vertically when no voltage is applied thereto and oriented in twisted multi-domain alignment when a voltage is applied thereto {described in Abstracts of Japanese Forum of Liquid Crystal, 58 to 59(1998), and (4) a SURVAIVAL mode liquid crystal cell (announced at LCD International 98).

The VA mode liquid crystal display device has a liquid crystal cell and two polarizing plates disposed on both sides thereof. The liquid crystal cell supports a liquid crystal between two electrode substrates. In an embodiment of the transmission type liquid crystal display device of the invention, one optical compensation film of the invention is inserted between the liquid crystal cell and one of the polarizing plates or two optical compensation films are inserted between the liquid crystal cell and the two polarizing plates.

In another embodiment of the transmission type liquid crystal display device of the invention, an optical compensation film having a film as a transparent protective film of the polarizing plate placed between the liquid crystal cell and the polarizing plate. This means that the transparent protective film of the polarizing plate serves also as an optical compensation film. The optical compensation film may be used only for the transparent protective film of one of the polarizing plates (between the liquid crystal cell and the polarizer) or the optical compensation film may be used for the two transparent protective films of the two polarizing plates (between the liquid crystal cell and the polarizer). When the optical compensation film is used only for one of the polarizing plates, it is particularly preferred to use it as a protective film on the side of the liquid crystal cell of the backlight side polarizing plate of the liquid crystal cell. The film is adhered to the liquid crystal cell preferably on the VA cell side. As another protective film, a cellulose acylate film ordinarily used therefor is usable. The cellulose acylate film has a thickness of preferably from 40 to 80 μm. Examples thereof include, but not limited to, commercially available "KC4UX2M" (trade name; product of Konica Opto; 40 μm), "KC5UX" (trade name; product of Konica Opto; 60 μm) and "TD80" (trade name; product of Fuji Photo Film).

In OCB mode liquid-crystal display devices or TN liquid-crystal display devices, an optical compensation film is used for widening a viewing angle. As the optical compensation film for OCB cell, a film obtained by disposing, over an optically monoaxial or biaxial film, an optical anisotropic layer obtained by fixing discotic liquid crystals subjected to hybrid alignment. As the optical compensation film for TN cells, a film obtained by disposing, over a film having an optical axis in an optically isotropic direction or thickness direction, an optically anisotropic layer obtained by fixing discotic liquid crystals subjected to hybrid alignment. The film is also useful for the formation of the optical compensation film for OCB cell or optical compensation film for TN cell.

EXAMPLES

The invention will hereinafter be described specifically based on Examples, but the invention is not limited thereby.

First, a synthesis process of each of the cyclic olefins (cyclic olefin resin B) P-1, P-2, P-3, P-4, and P-5 used in Examples and Comparative Examples are described.

(Synthesis of Cyclic Polyolefin Polymer P-1)

A reactor was charged with 100 parts by mass of purified toluene and 100 parts by mass of methyl norbornenecarboxylate ester. Then, 25 mmol % (relative to the mass of the monomers) ethylhexanoate-Ni dissolved in toluene, 0.225 mol % (relative to the mass of the monomers) tri(pentafluorophenyl)boron, and 0.25 mol % (relative to the mass of the monomers) triethylaluminum dissolved in toluene were charged in the reactor. The resulting mixture was allowed to react for 18 hours while stirring at room temperature. After completion of the reaction, the reaction mixture was charged in excess ethanol to precipitate the polymerization product thus prepared. A cyclic polyolefin polymer (P-1) obtained by purifying the resulting precipitate was vacuum dried at 65° C. for 24 hours. The resulting polymer was found to have a Tg of 270° C., SP value of 21.4, molecular weight Mn of 90,000, and Mw of 250,000.

(Synthesis of Cyclic Polyolefin Polymer P-2)

| | |
|---|---|
| Dichloromethane | 900 parts by mass |
| Methanol | 100 parts by mass |
| P-1 | 100 parts by mass |
| 28 wt. % Solution of NaOMe/MeOH | 1 part by mass |

The composition was allowed to react for 2 hours while stirring at room temperature. After completion of the reaction, the reaction mixture was charged in excess ethanol to form a polymer precipitate. A cyclic polyolefin polymer (P-2) obtained by purifying the precipitate was vacuum dried at 65°

C. for 24 hours. The resulting polymer was found to have Tg of 275° C., SP value of 22.6, molecular weight Mn of 80,000, and Mw of 215,000.

(Synthesis of Cyclic Polyolefin Polymer P-3)

A reactor was charged with 100 parts by mass of purified toluene, 30 parts by mass of methyl norbornenecarboxylate ester, and 70 parts by mass of butyl carboxylate. Then, 25 mmol % (relative to the mass of the monomers) ethylhexanoate-Ni dissolved in toluene, 0.225 mol % (relative to the mass of the monomers) tri(pentafluorophenyl)boron, and 0.25 mol % (relative to the mass of the monomers) triethylaluminum dissolved in toluene were charged in the reactor. The resulting mixture was allowed to react for 18 hours while stirring at room temperature. After completion of the reaction, the reaction mixture was charged in excess ethanol to precipitate the polymerization product thus prepared. A cyclic polyolefin polymer (P-3) obtained by purifying the resulting precipitate was vacuum dried at 65° C. for 24 hours. The resulting polymer was found to have a Tg of 230° C., SP value of 19.6, molecular weight Mn of 90,000, and Mw of 240,000.

(Synthesis of Cyclic Polyolefin Polymer P-4)

A reactor were charged with 100 parts by mass of purified toluene, 20 parts by mass of methyl norbornenecarboxylate ester, and 80 parts by mass of butyl carboxylate. Then, 25 mmol % (relative to the mass of the monomers) ethylhexanoate-Ni dissolved in toluene, 0.225 mol % (relative to the mass of the monomers) tri(pentafluorophenyl)boron, and 0.25 mol % (relative to the mass of the monomers) triethylaluminum dissolved in toluene were charged in the reactor. The resulting mixture was allowed to react for 18 hours while stirring at room temperature. After completion of the reaction, the reaction mixture was charged in excess ethanol to precipitate the polymer thus prepared. A cyclic polyolefin polymer (P-4) obtained by purifying the precipitate was vacuum dried at 65° C. for 24 hours. The resulting polymer was found to have a Tg of 210° C., SP value of 19.4, molecular weight Mn of 90,000, and Mw of 245,000.

(Synthesis of Cyclic Polyolefin Polymer P-5)

| Dichloromethane | 900 parts by mass |
| Methanol | 100 parts by mass |
| P-1 | 100 parts by mass |
| 28 wt. % Solution of NaOMe/MeOH | 1 part by mass |

The composition was allowed to react for 5 hours while stirring at room temperature. After completion of the reaction, the reaction mixture was charged in excess ethanol to precipitate a polymerization product. A cyclic polyolefin polymer (P-5) obtained by purifying the precipitate was vacuum dried at 65° C. for 24 hours. The resulting polymer was found to have a Tg of 280° C., SP value of 23.1, molecular weight Mn of 80,000, and Mw of 210,000.

Example 1

The composition shown below was charged in a mixing tank and components were dissolved by stirring. The resulting solution was filtered through a filter paper having a pore size of 34 μm and a sintered metal filter having an average pore size of 10 μm to prepare a film forming dope. With regards to the components described below, "Appear 3K" (trade name; product of Ferrania) had a Tg of 270° C., SP value of 20.1, molecular weight Mn of 95,000, and Mw of 250,000; cellulose triacetate had a degree of aceteyl substitution of 2.94, intrinsic birefringence of 0.0002, SP value of 21.7, molecular weight Mn of 80,000, and Mw of 220,000; dichloromethane had a vapor pressure of (25° C.) of 440 mmHg; methanol had a vapor poressure (25° C.) of 120 mmHg; a mixed solvent had a vapor pressure (25° C.) of 400 mmHg.

| Appear 3K (product of Ferrania) | 5 parts by mass |
| Cellullose triacetate | 100 parts by mass |
| Dichloromethane | 322 parts by mass |
| Methanol | 28 parts by mass |

The dope thus obtained was cast using a band caster. The film having a residual solvent content of 30 mass % was peeled from the band and dried with hot air of 140° C. while supporting it with a tenter. After conveyance means was changed from tenter to roll, the film was dried further at from 120° C. to 140° C. to obtain a film having a width of 1440 mm. The film had a thickness of 80 μm.

The Re and Rth of the film thus obtained were studied at λ of 590 nm. In addition, the film was visually observed using a Schaukasten. Visual observation using a Schaukasten was performed by arranging polarizing plates in crossed nicols, placing them on a light source, inserting a film between these polarizing plates, and visually evaluating unevenness while leaving the power source of the light source on. Evaluation was made on the following criteria: A: no unevenness can be recognized, B: slight unevenness can be recognized, C: unevenness can be recognized; and D: severe unevennss can be recognized. The haze of the film was measured in the method described below. The results are shown in Table 2.

(Haze of Film)

The haze of a 40 mm×80 mm sample was meausred at 25° C. and 60% RH by using a haze meter ("HGM-2DP", product of Suga Tester) in accordance with JIS K-6714.

Examples 2 to 54, and Comparative Examples 1 to 3

Similar to Example 1, a film having a thickness of 80 μm was prepared under the conditions shown in Table 2. The amount of the cyclic olefin resin B in Table 1 is an amount expressed by mass % relative to the polymer A. The company from which each additive is purchased and the molecular weight thereof are shown in Table 3. The amount of the additive in Table 2 is an amount expressed by mass % relative to the polymer A. Stretching employed here is tenter stretching and draw ratio (%) in table is a value obtained by calculation in accordance with the following equation:

$$\{(\text{film length after stretching} - \text{film length before stretching})/\text{film length before stretching}\} \times 100$$

The results are shown in Table 2.

TABLE 2

| No. | Polymer A | Degree of substitution (Polymer A) | Intrinsic birefringence (Polymer A) | SP value (Polymer A) | Cyclic olefin resin B | Amount | SP value (cyclic olefin resin B) | Another additive | Amount | Draw ratio | Re (nm) | Rth (nm) | Haze | Schaukasten Visual observation |
|---|---|---|---|---|---|---|---|---|---|---|---|---|---|---|
| Ex. 1 | Cellulose triacetate | 2.94 | 0.0002 | 21.7 | Appear 3k | 5 | 20.1 | — | 0 | 0 | 1 | 38 | 0.3 | B |
| Ex. 2 | Cellulose triacetate | 2.94 | 0.0002 | 21.7 | Appear 3k | 10 | 20.1 | — | 0 | 0 | 2 | 64 | 0.4 | B |
| Ex. 3 | Cellulose triacetate | 2.94 | 0.0002 | 21.7 | Appear 3k | 15 | 20.1 | — | 0 | 0 | 1 | 82 | 0.5 | B |
| Ex. 4 | Cellulose triacetate | 2.94 | 0.0002 | 21.7 | Appear 3k | 20 | 20.1 | — | 0 | 0 | 0 | 98 | 0.8 | B |
| Ex. 5 | Cellulose triacetate | 2.94 | 0.0002 | 21.7 | Appear 3k | 25 | 20.1 | — | 0 | 0 | 2 | 112 | 1.1 | B |
| Ex. 6 | Cellulose triacetate | 2.86 | 0.0005 | 21.9 | Appear 3k | 5 | 20.1 | — | 0 | 0 | 1 | 65 | 0.3 | B |
| Ex. 7 | Cellulose triacetate | 2.86 | 0.0005 | 21.9 | Appear 3k | 10 | 20.1 | — | 0 | 0 | 2 | 90 | 0.3 | B |
| Ex. 8 | Cellulose triacetate | 2.86 | 0.0005 | 21.9 | Appear 3k | 15 | 20.1 | — | 0 | 0 | 0 | 108 | 0.5 | B |
| Ex. 9 | Cellulose triacetate | 2.86 | 0.0005 | 21.9 | Appear 3k | 20 | 20.1 | — | 0 | 0 | 1 | 119 | 0.7 | B |
| Ex. 10 | Cellulose triacetate | 2.86 | 0.0005 | 21.9 | Appear 3k | 20 | 20.1 | SMA2000 | 10 | 0 | 1 | 102 | 0.4 | B |
| Ex. 11 | Cellulose triacetate | 2.86 | 0.0005 | 21.9 | Appear 3k | 20 | 20.1 | SMA1000 | 10 | 0 | 1 | 101 | 0.4 | B |
| Ex. 12 | Cellulose triacetate | 2.86 | 0.0005 | 21.9 | Appear 3k | 20 | 20.1 | T-1 | 10 | 0 | 1 | 97 | 0.3 | B |
| Ex. 13 | Cellulose triacetate | 2.86 | 0.0005 | 21.9 | Appear 3k | 20 | 20.1 | UH2180 | 5 | 0 | 1 | 110 | 0.5 | B |
| Ex. 14 | Cellulose triacetate | 2.8 | 0.009 | 22.1 | Appear 3k | 5 | 20.1 | — | 0 | 0 | 2 | 102 | 0.5 | B |
| Ex. 15 | Cellulose triacetate | 2.8 | 0.009 | 22.1 | Appear 3k | 10 | 20.1 | — | 0 | 0 | 2 | 119 | 0.9 | B |
| Ex. 16 | Cellulose triacetate | 2.8 | 0.009 | 22.1 | Appear 3k | 15 | 20.1 | SMA2000 | 10 | 0 | 1 | 130 | 0.3 | B |
| Ex. 17 | Cellulose triacetate | 2.86 | 0.0005 | 21.9 | Appear 3k | 20 | 20.1 | T-1 | 10 | 3 | 2 | 68 | 0.3 | B |
| Ex. 18 | Cellulose triacetate | 2.86 | 0.0005 | 21.9 | Appear 3k | 20 | 20.1 | T-1 | 10 | 10 | 7 | 68 | 0.3 | B |
| Ex. 19 | Cellulose triacetate | 2.86 | 0.0005 | 21.9 | Appear 3k | 20 | 20.1 | T-1 | 10 | 17 | 11 | 68 | 0.3 | B |
| Ex. 20 | Cellulose triacetate | 2.86 | 0.0005 | 21.9 | Appear 3k | 20 | 20.1 | T-1 | 10 | 20 | 13 | 64 | 0.5 | B |
| Ex. 21 | Cellulose triacetate | 2.86 | 0.0005 | 21.9 | Appear 3k | 20 | 20.1 | T-1 | 10 | 27 | 16 | 68 | 0.4 | A |
| Ex. 22 | Cellulose triacetate | 2.86 | 0.0005 | 21.9 | Appear 3k | 20 | 20.1 | T-1 | 10 | 30 | 17 | 69 | 0.7 | A |
| Ex. 23 | Cellulose triacetate | 2.86 | 0.0005 | 21.9 | Appear 3k | 20 | 20.1 | — | 0 | 5 | 5 | 96 | 0.4 | B |
| Ex. 24 | Cellulose triacetate | 2.86 | 0.0005 | 21.9 | Appear 3k | 20 | 20.1 | — | 0 | 10 | 10 | 107 | 0.3 | B |
| Ex. 25 | Cellulose triacetate | 2.86 | 0.0005 | 21.9 | Appear 3k | 20 | 20.1 | — | 0 | 15 | 14 | 110 | 0.3 | B |
| Ex. 26 | Cellulose triacetate | 2.86 | 0.0005 | 21.9 | Appear 3k | 20 | 20.1 | — | 0 | 20 | 15 | 113 | 0.5 | B |
| Ex. 27 | Cellulose triacetate | 2.86 | 0.0005 | 21.9 | Appear 3k | 20 | 20.1 | — | 0 | 64 | 51 | 123 | 0.5 | A |
| Ex. 28 | Cellulose triacetate | 2.8 | 0.009 | 22.1 | P-2 | 20 | 22.6 | — | 0 | 0 | 1 | 110 | 0.3 | B |
| Ex. 29 | Cellulose triacetate | 2.8 | 0.009 | 22.1 | P-2 | 20 | 22.6 | — | 0 | 10 | 25 | 115 | 0.4 | B |
| Ex. 30 | Cellulose triacetate | 2.8 | 0.009 | 22.1 | P-2 | 20 | 22.6 | — | 0 | 20 | 43 | 118 | 0.4 | B |
| Ex. 31 | Cellulose triacetate | 2.8 | 0.009 | 22.1 | P-2 | 20 | 22.6 | — | 0 | 30 | 55 | 124 | 0.5 | A |
| Ex. 32 | Cellulose triacetate | 2.86 | 0.0005 | 21.9 | P-1 | 5 | 21.4 | — | 0 | 30 | 8 | 65 | 0.3 | A |
| Ex. 33 | Cellulose triacetate | 2.86 | 0.0005 | 21.9 | P-1 | 10 | 21.4 | — | 0 | 30 | 32 | 90 | 0.3 | A |

TABLE 2-continued

| No. | Polymer A | Degree of substitution (Polymer A) | Intrinsic birefringence (Polymer A) | SP value (Polymer A) | Cyclic olefin resin B | Amount | SP value (cyclic olefin resin B) | Another additive | Amount | Draw ratio | Re (nm) | Rth (nm) | Haze | Schaukasten Visual observation |
|---|---|---|---|---|---|---|---|---|---|---|---|---|---|---|
| Ex. 34 | Cellulose triacetate | 2.86 | 0.0005 | 21.9 | P-1 | 15 | 21.4 | — | 0 | 30 | 38 | 108 | 0.7 | A |
| Ex. 35 | Cellulose triacetate | 2.86 | 0.0005 | 21.9 | P-1 | 20 | 21.4 | — | 0 | 30 | 43 | 119 | 0.8 | A |
| Ex. 36 | Cellulose triacetate | 2.94 | 0.0002 | 21.7 | P-3 | 20 | 19.6 | — | 0 | 0 | 1 | 45 | 0.3 | B |
| Ex. 37 | Cellulose acetate propionate | 2.65 | 0.018 | 20.49 | Appear 3k | 5 | 20.1 | — | 0 | 50 | 25 | 109 | 0.3 | A |
| Ex. 38 | Cellulose acetate propionate | 2.65 | 0.018 | 20.49 | Appear 3k | 10 | 20.1 | — | 0 | 50 | 35 | 110 | 0.3 | A |
| Ex. 39 | Cellulose acetate propionate | 2.65 | 0.018 | 20.49 | Appear 3k | 15 | 20.1 | — | 0 | 50 | 55 | 118 | 0.3 | A |
| Ex. 40 | Cellulose acetate propionate | 2.65 | 0.018 | 20.49 | Appear 3k | 20 | 20.1 | — | 0 | 50 | 65 | 130 | 0.3 | A |
| Ex. 41 | Cellulose acetate butylate | 2.65 | 0.019 | 20.88 | Appear 3k | 5 | 20.1 | — | 0 | 50 | 31 | 108 | 0.3 | A |
| Ex. 42 | Cellulose acetate butylate | 2.65 | 0.019 | 20.88 | Appear 3k | 10 | 20.1 | — | 0 | 50 | 43 | 112 | 0.3 | A |
| Ex. 43 | Cellulose acetate butylate | 2.65 | 0.019 | 20.88 | Appear 3k | 15 | 20.1 | — | 0 | 50 | 61 | 125 | 0.3 | A |
| Ex. 44 | Cellulose acetate butylate | 2.65 | 0.019 | 20.88 | Appear 3k | 20 | 20.1 | — | 0 | 50 | 67 | 143 | 0.3 | A |
| Ex. 45 | Cellulose acetate butylate | 2.65 | 0.019 | 20.88 | Appear 3k | 25 | 20.1 | — | 0 | 50 | 67 | 167 | 4.7 | B |
| Comp. Ex. 1 | Appear 3k | — | 0.08 | 20.1 | — | 0 | — | — | 0 | 10 | 60 | 310 | 0.3 | C |
| Comp. Ex. 2 | Cellulose triacetate | 2.94 | 0.0002 | 21.7 | P-4 | 20 | 19.4 | — | 0 | 0 | — | — | 10.2 | D: Whitening of film |
| Comp. Ex. 3 | Cellulose triacetate | 2.8 | 0.009 | 22.1 | P-5 | 20 | 23.1 | — | 0 | 0 | — | — | 15.2 | D: Whitening of film |
| Ex. 46 | Cellulose triacetate | 2.8 | 0.009 | 22.1 | Appear 3k | 10 | 20.1 | T-2 | 2 | 0 | 3 | 165 | 0.65 | B |
| Ex. 47 | Cellulose triacetate | 2.8 | 0.009 | 22.1 | Appear 3k | 10 | 20.1 | T-2 | 2 | 10 | 20 | 168 | 0.45 | B |
| Ex. 48 | Cellulose triacetate | 2.8 | 0.009 | 22.1 | Appear 3k | 10 | 20.1 | T-2 | 2 | 20 | 35 | 169 | 0.77 | B |
| Ex. 49 | Cellulose triacetate | 2.8 | 0.009 | 22.1 | Appear 3k | 10 | 20.1 | T-2 | 4 | 0 | 5 | 211 | 0.54 | B |
| Ex. 50 | Cellulose triacetate | 2.8 | 0.009 | 22.1 | Appear 3k | 10 | 20.1 | T-2 | 4 | 10 | 35 | 215 | 0.65 | B |
| Ex. 51 | Cellulose triacetate | 2.8 | 0.009 | 22.1 | Appear 3k | 10 | 20.1 | T-2 | 4 | 20 | 55 | 216 | 0.55 | B |
| Ex. 52 | Cellulose triacetate | 2.8 | 0.009 | 22.1 | Appear 3k | 10 | 20.1 | T-2 | 6 | 0 | 4 | 260 | 0.45 | B |
| Ex. 53 | Cellulose triacetate | 2.8 | 0.009 | 22.1 | Appear 3k | 10 | 20.1 | T-2 | 6 | 10 | 48 | 262 | 0.66 | B |
| Ex. 54 | Cellulose triacetate | 2.8 | 0.009 | 22.1 | Appear 3k | 10 | 20.1 | T-2 | 6 | 20 | 65 | 266 | 0.54 | B |

TABLE 3

| Additive | Available from | Molecular weight |
|---|---|---|
| SMA2000 | Sartomer | 7500 |
| SMA1000 | Sartomer | 5500 |
| UH2180 | Toa Gosei | 8000 |

T-1

Molecular weight: 247.07

Synthesis Example 2

Synthesis of T-2

A 100-ml three-necked flask equipped with a stirrer and a thermometer was charged with 8.1 g (25 mmol) of 2,4-di-m-toluidino-6-chloro-1,3,5-triazine and 3.1 g (25 mmol) of p-anisidine. The resulting mixture was dissolved in 20 mL of DMF. Then, 5.2 g of (37.5 mmol) of potassium carbonate was added and the resulting mixture was allowed to react at 120° C. for 2 hours. After cooling, the reaction mixture was extracted with 100 mL of ethyl acetate. The extract was dried over anhydrous sodium sulfate. Ethyl acetate was distilled off under reduced pressure. The resulting residue was isolated by silica gel chromatography (eluent: 5/1 (volume ratio) n-hexane/ethyl acetate) to yield an intended product (yield: 9.1 g, yield: 88%). The chemical structure was confirmed by NMR spectrum, MS spectrum, and elemental analysis.

The invention provides a polymer blend film having low hygroscopicity or moisture permeability, an adequate hardness, and optical characteristics permitting easy control. The polymer blend film of the invention is particularly useful for protecting a polarizing plate.

What is claimed is:

1. A polymer blend film comprising:
   a film forming material comprising at least a polymer having an absolute value of an intrinsic birefringence of 0.02 or less, and a cyclic olefin resin, wherein
   the film has a haze of 5% or less;
   wherein the cyclic olefin resin has a solubility parameter value of 19.5 or greater but not greater than 23.0;
   wherein the film forming material satisfies a following formula:

$0 \leq |\Delta SP| \leq 4.5$ wherein $\Delta SP$ represents an absolute value of a difference in the solubility parameter value between the cyclic olefin resin and the polymer.

2. The polymer blend film according to claim 1, wherein the cyclic olefin resin contains at least one repeating unit represented by following formula:

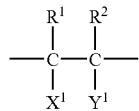

wherein, $R^1$ and $R^2$ represents a hydrogen atom or a hydrocarbon group having from 1 to 10 carbon atoms, $X^1$ and $Y^1$ each represents a hydrogen atom, a hydrocarbon group having from 1 to 10 carbon atoms, a halogen atom, a halogen-substituted hydrocarbon group having from 1 to 10 carbon atoms, $-(CH_2)_nCOOR^{11}$, $-(CH_2)_nOCOR^{12}$, $-(CH_2)_nNCO$, $-(CH_2)_nNO_2$, $-(CH_2)_nCN$, $-(CH_2)_nCONR^{13}R^{14}$, $-(CH_2)_nNR^{13}R^{14}$, $-(CH_2)_nOZ$, or $-(CH_2)_nW$; or $X^1$ and $Y^1$ are taken together to form $(-CO)_2O$ or $(-CO)_2NR^{15}$, where $R^{11}$, $R^{12}$, $R^{13}$, $R^{14}$, and $R^{15}$ each represents a hydrogen atom or a hydrocarbon group having from 1 to 20 carbon atoms; Z represents a hydrocarbon group or a halogen-substituted hydrocarbon group; W represents $SiR^{16}{}_pD_{3-p}$, where $R^{16}$ represents a hydrocarbon group having from 1 to 10 carbon atoms, D represents a halogen atom, $-OCOR^{15}$ or $-OR^{16}$, and p stands for an integer of 0 to 3; and n represents an integer of from 0 to 10.

3. The polymer blend film according to claim 1, wherein the polymer is cellulose triacetate, cellulose acetate propionate or cellulose acetate butylate.

4. The polymer blend film according to claim 1, wherein the polymer blend film is formed from a film forming material solution obtained by dissolving the polymer and the cyclic olefin resin in a solvent and the solvent has a vapor pressure at 25° C. of 250 mmHg or greater.

5. The polymer blend film according to claim 1, wherein the film forming material satisfies a following formula:

$0 \leq |\Delta SP| \leq 2.5.$

6. The polymer blend film according to claim 2, wherein the film forming material satisfies a following formula:

$0 \leq |\Delta SP| \leq 2.5.$

7. The polymer blend film according to claim 5, wherein the film forming material satisfies a following formula:

$0 \leq |\Delta SP| \leq 2.5.$

8. The polymer blend film according to claim 4, wherein the film forming material satisfies a following formula:

$0 \leq |\Delta SP| \leq 2.5.$

* * * * *